US009087437B2

(12) United States Patent
Kroeckel et al.

(10) Patent No.: US 9,087,437 B2
(45) Date of Patent: Jul. 21, 2015

(54) APPARATUS FOR PROVIDING AMUSEMENT

(71) Applicant: Bally Gaming, Inc., Las Vegas, NV (US)

(72) Inventors: John G. Kroeckel, Pleasanton, CA (US); Gennady I. Soliterman, Pleasanton, CA (US); Bryan M. Kelly, Alamo, CA (US); Dennis Lockard, Pleasanton, CA (US); Jeffery C. Tallcott, Modesto, CA (US); Jeffrey Allen, Pleasanton, CA (US); Robert Luciano, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 155 days.

(21) Appl. No.: 13/684,074

(22) Filed: Nov. 21, 2012

(65) Prior Publication Data

US 2013/0165196 A1 Jun. 27, 2013

Related U.S. Application Data

(60) Continuation of application No. 12/849,022, filed on Aug. 3, 2010, now Pat. No. 8,317,588, which is a division of application No. 11/651,918, filed on Jan. 9, 2007, now Pat. No. 7,976,373.

(51) Int. Cl.

*G06F 17/00* (2006.01)
*G07F 17/32* (2006.01)
*G07F 17/34* (2006.01)

(52) U.S. Cl.

CPC ............ *G07F 17/3295* (2013.01); *G07F 17/32* (2013.01); *G07F 17/3244* (2013.01); *G07F 17/3248* (2013.01); *G07F 17/3293* (2013.01); *G07F 17/34* (2013.01)

(58) Field of Classification Search

USPC .................................................... 463/16–25
See application file for complete search history.

(56) References Cited

U.S. PATENT DOCUMENTS

| | | | | |
|---|---|---|---|---|
| 6,174,237 | B1 * | 1/2001 | Stephenson | 463/42 |
| 6,550,768 | B2 * | 4/2003 | Jordan | 273/138.3 |
| 7,766,739 | B2 * | 8/2010 | Kane et al. | 463/17 |
| 7,959,502 | B2 * | 6/2011 | Kane et al. | 463/17 |
| 2007/0167223 | A1 * | 7/2007 | Bleich et al. | 463/25 |

* cited by examiner

*Primary Examiner* — Ronald Laneau
(74) *Attorney, Agent, or Firm* — Paul Hickman; Marvin A. Hein; Philip J. Anderson

(57) ABSTRACT

Certain non-limiting exemplary embodiments are taught which include a game comprising, a digital processor, digital storage coupled to the digital processor for storing instructions, a display coupled to the digital processor displaying a first plurality of indicia arranged in a plurality of rows and a plurality of columns such that there are a plurality of paylines through a contiguous plurality of indicia, a user interface coupled to the digital processor to select a subset of the first plurality of indicia taken along at least one column and to initiate a display of a second plurality of indicia which includes the selected subset of the first plurality of indicia on the display, and an award dispenser providing an award which is at least as large as the largest award associated with the plurality of paylines.

19 Claims, 51 Drawing Sheets

Symbol Distribution

| Symbol | Reel #1 | Reel #2 | Reel #3 | Reel #4 | Reel #5 |
|---|---|---|---|---|---|
| Cherry | 3 | 2 | 2 | 2 | 2 |
| 1Bar | 3 | 3 | 2 | 2 | 4 |
| 2Bar | 2 | 2 | 3 | 3 | 3 |
| 3Bar | 3 | 3 | 3 | 2 | 4 |
| Pink 7 | 6 | 4 | 6 | 7 | 2 |
| Green 7 | 6 | 2 | 3 | 8 | 4 |
| Yellow 7 | 3 | 5 | 2 | 2 | 2 |
| Blue 7 | 3 | 2 | 5 | 3 | 3 |
| Red 7 | 2 | 5 | 4 | 2 | 5 |
| Dice | 3 | 4 | 4 | 3 | 4 |
| Car | 1 | 3 | 1 | 1 | 2 |
| Extended Spin | 3 | 2 | 2 | 2 | 2 |
| Total | 36 | 36 | 35 | 36 | 36 |

FIG. 35

APPARATUS FOR PROVIDING AMUSEMENT

CROSS REFERENCE TO RELATED APPLICATIONS

This application is a continuation of U.S. Ser. No. 12/849,022, filed Aug. 3, 2010, which is a divisional of U.S. Ser. No. 11/651,918, filed Jan. 9, 2007, and is related to U.S. Ser. No. 11/651,951, filed Jan. 9, 2007, and to U.S. Ser. No. 11/651,917, filed Jan. 9, 2007, all of which are incorporated herein by reference.

BACKGROUND

Throughout history, mankind has engaged in various forms of amusement which has taken innumerable forms over the years. Games of chance have been introduced which provide enjoyment to the players while not requiring skillful decisions to be made. Games of chance can thus be very relaxing because they require very little activity to play and win or lose. If one plays a game of chance for a long period of time, one will eventually witness rare occurrences, such as "streaks" which provide a great sense of excitement to the players. Also, such games of chance are as easily won by novice players as they are by more experienced players. Such games are very approachable for novices. An example of a game of chance is a slot machine.

Games of skill have also been introduced, which require skillful play for optimal performance. Players of these games use knowledge, experience, and in some cases, great effort to achieve superior performance. Games of skill often attract people who wish to be challenged to attain greater levels of skill. Some people dedicate their lives to such games. Thus games of skill are often very engaging in the long term. An example of a game of skill is chess.

Still other games require elements of skill, but also have an element of chance. These games offer the best of both worlds because they are very approachable for beginners due to the chance element, and are very engaging in the long term due to the skill element. An example of a game with both the element of chance and the element of skill is video poker.

A diverse range of players will play these games. Because of this diverse appeal, a group of people with disparate skill levels with be able to play such games together. Games are often considered more fun when played in groups. Also, the individuals can reinforce each other's participation.

SUMMARY

Certain non-limiting exemplary embodiments are disclosed which teach a method for playing a game comprising initiating a game play, displaying a first plurality of indicia arranged in a plurality of rows and a plurality of columns such that there are a plurality of paylines through a contiguous plurality of indicia, selecting a subset of the first plurality of indicia taken along one or more columns, displaying a second plurality of indicia which includes the selected subset of the first plurality of indicia, achieving an award at least as large as the largest award associated with the plurality of paylines. A payline can be selectively displayed to the user. Legal tender, a token, and a non-legal tender prize are non-limiting examples of the kinds of awards that may be awarded. The columns of indicia for the game are, for example, arranged as visually spillable reels. In certain embodiments a video display may be utilized to display the indicia.

Further non-limiting exemplary embodiments include initiating a game in exchange for a monetary value wherein the monetary value may be derived from a legal tender, or derived from a token representing monetary value. Some examples of a token include a non-electronic token, or an electronic token.

In some cases, the display of a first plurality of indicia includes a randomization of indicia for their selection to be displayed, and may further include providing the randomization by either random selection or pseudorandom selection. Still further an inverse relationship between the size of an award associated with a payline and the likelihood of a selection of a set of indicia associated with the payline is disclosed. In certain embodiments, it is optional to select and display a second subset of indicia and an award may be achieved based on the first plurality of indicia, rather than on a subsequent subset.

An additional non-limiting exemplary embodiment includes a method for playing an enhanced game comprising, initiating a game play, displaying a plurality of indicia arranged in a plurality of rows and a plurality of columns such that there are a plurality of paylines through a contiguous plurality of indicia and providing a game enhancement when the indicia along at least one of the paylines are of a predetermined pattern. Some non-limiting examples of a game enhancement include a bonus award, extended play, additional play and a first award payable in a current game play, and an additional award payable in at least one additional subsequent game play.

Still further exemplary embodiments include a method for playing a game comprising initiating a game play, displaying a plurality of indicia arranged in a plurality of rows and a plurality of columns such that there are a plurality of paylines through a contiguous plurality of indicia, and providing feedback concerning the play of the game. Some non-limiting examples of feedback include an indication of a level of success in playing the game, advice on how to play the game, which may be derived from an analysis of previous game play, which may include background game play not visible to a user.

Certain non-limiting exemplary embodiments are taught which include a game comprising, a digital processor, digital storage coupled to the digital processor for storing instructions, a display coupled to the digital processor displaying a first plurality of indicia arranged in a plurality of rows and a plurality of columns such that there are a plurality of paylines through a contiguous plurality of indicia, a user interface coupled to the digital processor to select a subset of the first plurality of indicia taken along at least one column and to initiate a display of a second plurality of indicia which includes the selected subset of the first plurality of indicia on the display, and an award dispenser providing an award which is at least as large as the largest award associated with the plurality of paylines.

The digital processor may, by way of non-limiting example, include a microprocessor, and wherein the digital storage includes a read-only memory. The user interface includes a monetary interface and a game play interface. The monetary interface accepts for example, legal tender or a token (which may be, for example, a non-electronic token, or an electronic token). In some embodiments, the token may be, for example, a ticket including printed indicia, or an electronic token. The award dispenser dispenses, for example, legal tender, a token, which may be, for example, a non-electronic token, a ticket including printed indicia or an electronic token.

Further non-limiting exemplary embodiments include a game comprising means for initiating a game play, means for displaying a first plurality of indicia arranged in a plurality of rows and a plurality of columns such that there are a plurality of paylines through a contiguous plurality of indicia, means for selecting a subset of the first plurality of indicia taken along one or more columns, means for displaying a second plurality of indicia which includes the selected subset of the first plurality of indicia, and means for achieving an award at least as large as the largest award associated with the plurality of paylines.

In some embodiments, the game may be initiated in exchange for a monetary value. The columns of indicia may be arranged as visually spinnable reels. The display may be, for example, a video display or a mechanical display. Some embodiments provide means for selectively displaying a playline. The means for displaying of a first plurality of indicia may include means for a randomization of indicia for their selection to be displayed. The randomization may be, for example, provided by at least one of random selection and pseudorandom selection.

Still further exemplary embodiments disclosed herein include an enhanced game comprising means for initiating a game play, means for displaying a plurality of indicia arranged in a plurality of rows and a plurality of columns such that there are a plurality of paylines through a contiguous plurality of indicia, and means for providing a game enhancement when the indicia along at least one of the paylines are of a predetermined pattern. The game enhancement may include, for example, a bonus award, extended play, or additional play, means for paying a first award in a current game play, and means for paying an additional award in at least one additional subsequent game play. These examples are given by way of non-limiting example.

Certain embodiments include a game comprising means initiating a game play, means displaying a plurality of indicia arranged in a plurality of rows and a plurality of columns such that there are a plurality of paylines through a contiguous plurality of indicia, and means providing feedback concerning the play of the game, which may include an indication of a level of success in playing the game or advice on how to play the game. The advice may be derived from an analysis of previous game play. The previous game play may include background game play not discernable to a user.

Certain further non-limiting exemplary embodiments disclosed herein teach a game system comprising a wide area network, a game unit coupled to the wide area network and capable of uploading game data concerning game play, and a server coupled to the wide area network and capable of receiving the game data and storing the game data in a database with other game data. According to certain non-limiting exemplary embodiments, the wide area network is the Internet. Encryption may be used to protect game data before it is uploaded. The game unit may be, for example, directly coupled to the Internet via an Internet Service Provider, or coupled to a local area network which may be coupled to the wide area network.

In some exemplary embodiments, the server performs an analysis of the game data stored in the database. The server may download, according to certain non-limiting exemplary embodiments, at least one of data and executable code to the game unit as a result of the analysis. The game unit may be one of a plurality of game units, each of which may be coupled to the wide area network and capable of uploading game data concerning game play to be stored in the database of the server.

In further non-limiting exemplary embodiments, the plurality of game units may be coupled to a local area network, which may be coupled to a wide area network. The local area network may be one of a plurality of local area networks which are coupled to the wide area network, where each of the local area networks includes a plurality of game units. The server may perform an analysis of the game data stored in the database.

According to certain embodiments, the server downloads at least one of data and executable code to at least one of the plurality of game units as a result of the analysis. The server may download game software updates to at least one of the plurality of game units.

The server may download, for example, award information related to game play to at least one of the plurality of game units, game data to at least one of the plurality of game units, game parameters to at least one of the plurality of game units. The server may be one of a plurality of servers. The database may be a distributed database. The game play may be, for example an actual game play with a user of the game unit or a virtual game play independent of a user of the game unit.

Further non-limiting exemplary embodiments include method for providing feedback to multiple game system comprising, accumulating game data concerning game play from a plurality of game systems to create a game data database, analyzing the game data database and updating at least one of the plurality of game systems based upon the analyzing the game data database.

Still further non limiting exemplary embodiments teach a game system comprising means for accumulating game data concerning game play from a plurality of game systems to create a game data database means for analyzing the game data database, and means for updating at least one of the plurality of game systems based upon the analyzing the game data database.

These and other embodiments will become apparent to those skilled in the art upon a reading of the following descriptions and a study of the drawings.

BRIEF DESCRIPTION OF THE DRAWINGS

The various figures of the drawing and the following brief descriptions are of certain exemplary embodiments that have been set forth by way of example, not limitation.

FIG. 35 a table of symbol distribution for an exemplary multi-reel game;

DETAILED DESCRIPTION

Figure 1:
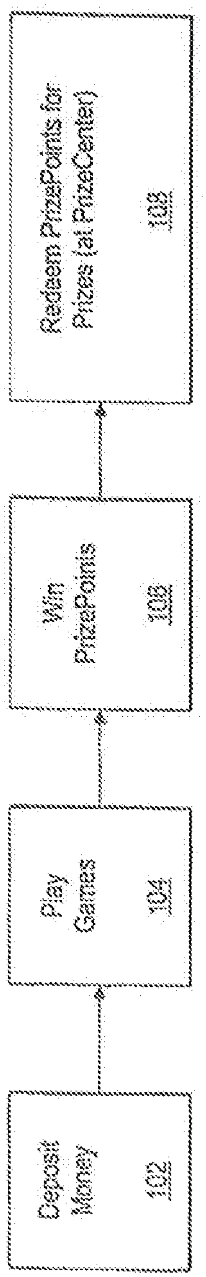
FIG. 1 is a block diagram that illustrates a play cycle of an amusement system with multiple reels and multiple prizelines, according to certain exemplary embodiments.

FIG. 1 is a block diagram that illustrates a play cycle of an amusement system with multiple reels and multiple pay-lines or prize-lines, according to certain exemplary embodiments. At block 102, the player can insert cash or cash equivalent currency into a player terminal of the amusement system to obtain game credits. At block 104, the player can play a game at the player terminal and at block 106, the player can win prize-points.

According to certain non-limiting exemplary embodiments, cash awards may be awarded in lieu of or in addition to prize-points. According to certain non-limiting exemplary embodiments, players are allowed to replay winnings by converting them back into game credits with or without user interaction.

The game begins when the player activates the game terminal. One or more game credits are deducted for each game played. On multi-denomination game machines the player can select the credit value. Otherwise the credit value is fixed and can be configured when the software is installed or configuration changes are downloaded from the server.

At block 108, the player can redeem the prize-points for prizes. The player may choose either to redeem the prize-points for prizes immediately or elect to print a prize-points voucher. The prize-points vouchers can be used to redeem prizes at a later time. Prizes can take the form of merchandise, according to certain non-limiting exemplary embodiments.

According to other non-limiting exemplary embodiments, the prizes can be in the form of cash currency. According to certain other non-limiting exemplary embodiments, prizes can be in the form of services or opportunities to enter into a sweepstakes or opportunities to participate in promotional offers. According to certain non-limiting exemplary embodiments, prizes may be in the form of electronic or paper prize redemption tickets that can be used for redeeming prizes at a prize redemption facility or machine.

Other non-limiting exemplary embodiments allow the player to save their winnings to storage media that is capable of storing a value representative of these winnings. This storage media can be any read/write memory not limited to: flash memory, smart cards, file server storage devices, a removable storage device, a player database account, RAM, electronic wallet, etc. . .

Alternate non-limiting exemplary embodiments may be used in regulated class 3 gaming markets, such as Nevada and New Jersey, Class 2 markets, and various lottery markets.

Figure 2A:
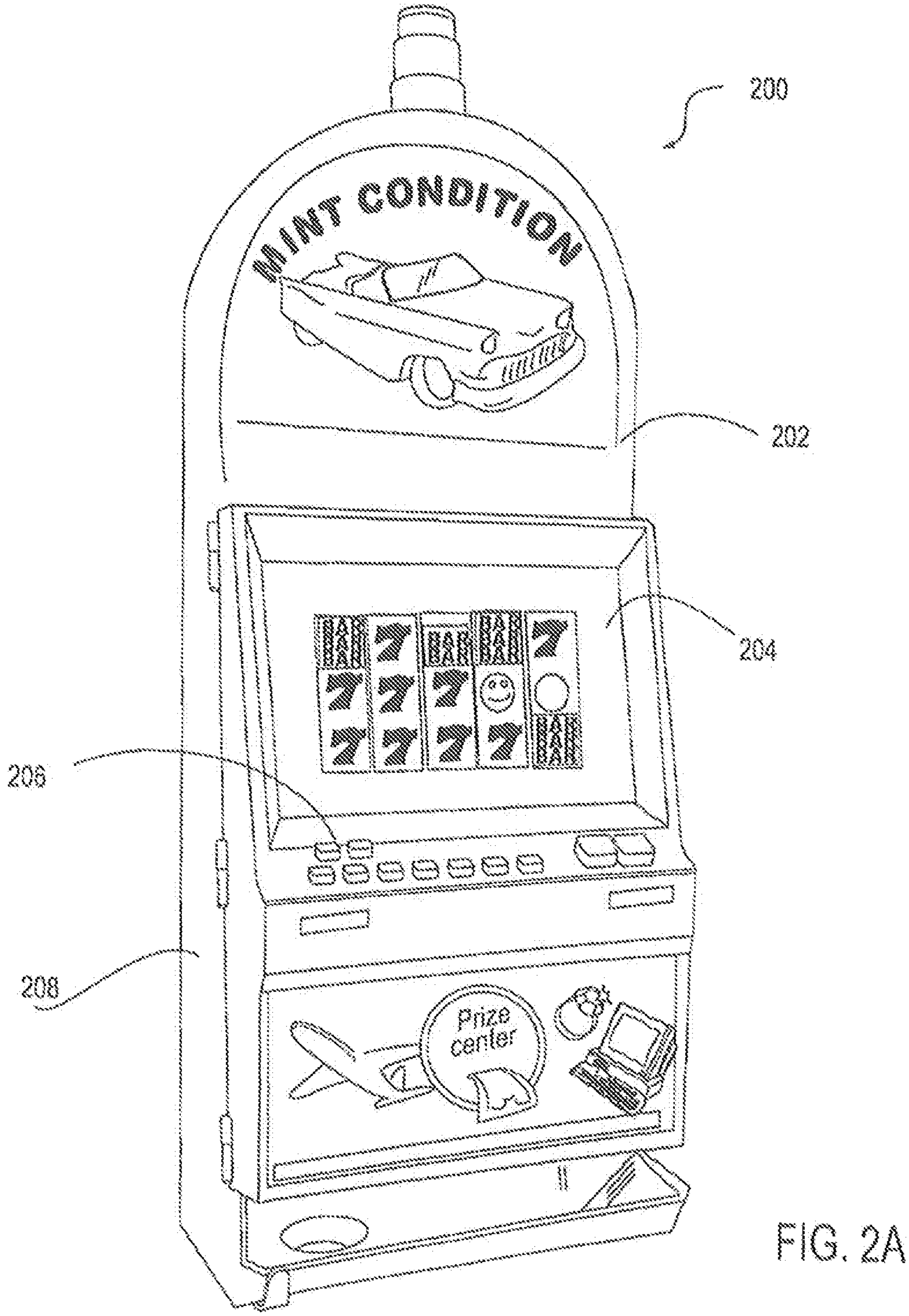
FIG. 2A is an isometric view of a player terminal 200, according to certain exemplary embodiments.
Figure 2B:
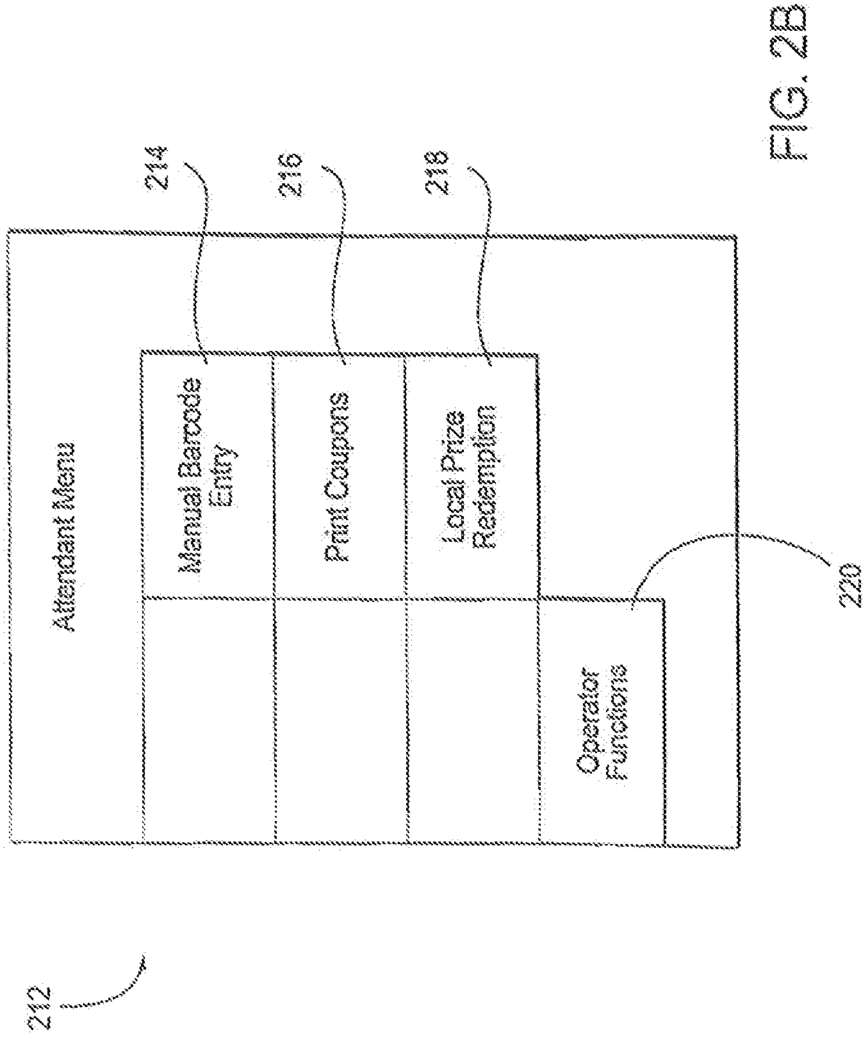
FIG. 2B is an example of certain aspects of a user interface for allowing an operator to perform various menu functions associated with the game.

The amusement system includes a player terminal, which is an example of a "game unit". FIG. 2A is a view of a player terminal 200, according to certain non-limiting exemplary embodiments. Player terminal 200 includes, among other features, a cabinet 202, an onscreen display 204, various control buttons 206, a ticket printer 208 and computer elements (not shown) such as a processor, magnetic or smart card reader/writer, player tracking secondary display device (e.g. Bally iVIEW product) and processor boards, Game Monitoring units (e.g. Bally MC250, MC300), top box display monitor, computer memory, and input/output mechanisms including but not limited to a card reader.

Figure 34A:
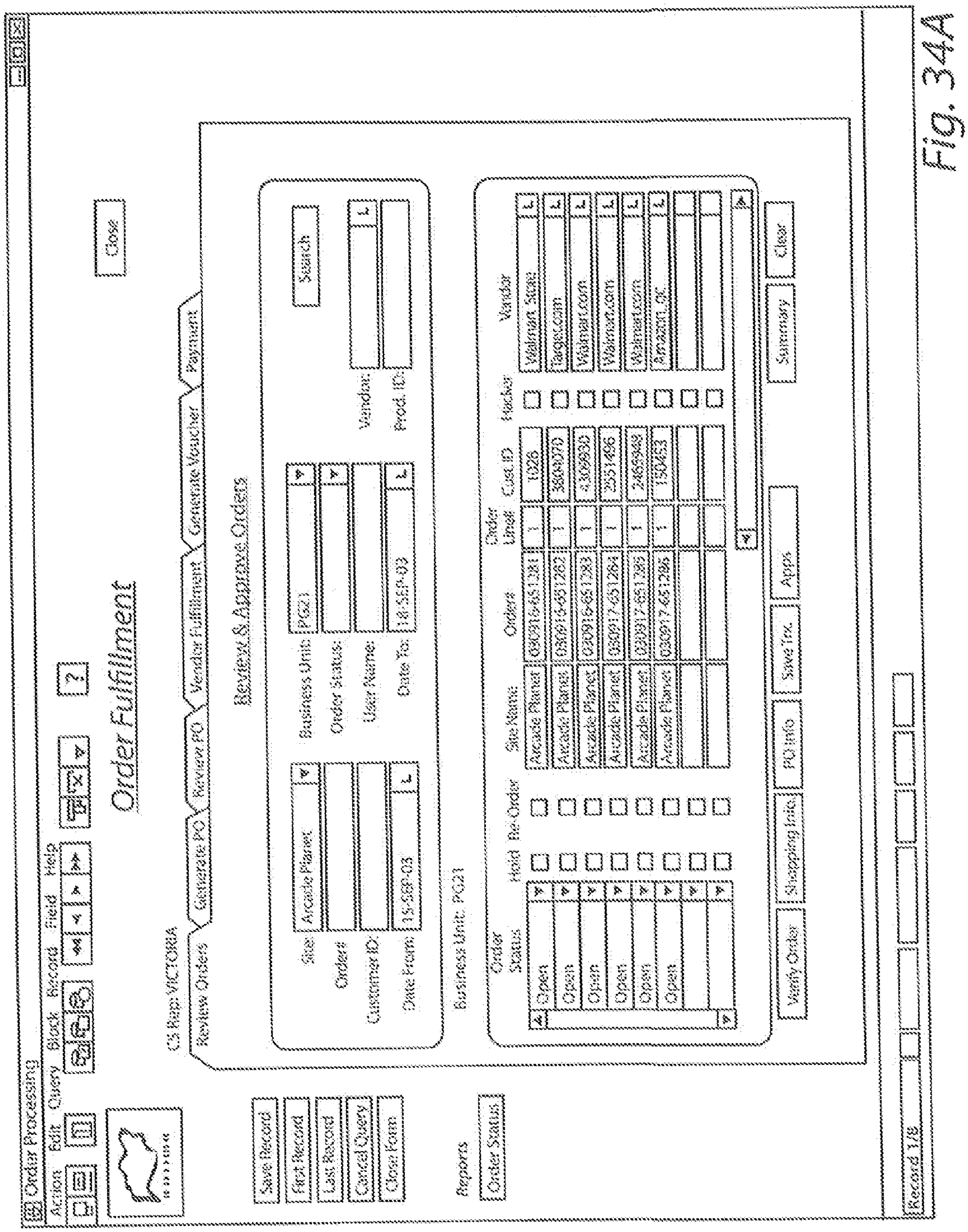
FIG. 34A is an exemplary screen display of a prize order fulfillment web page to review and approve orders.
Figure 34B:
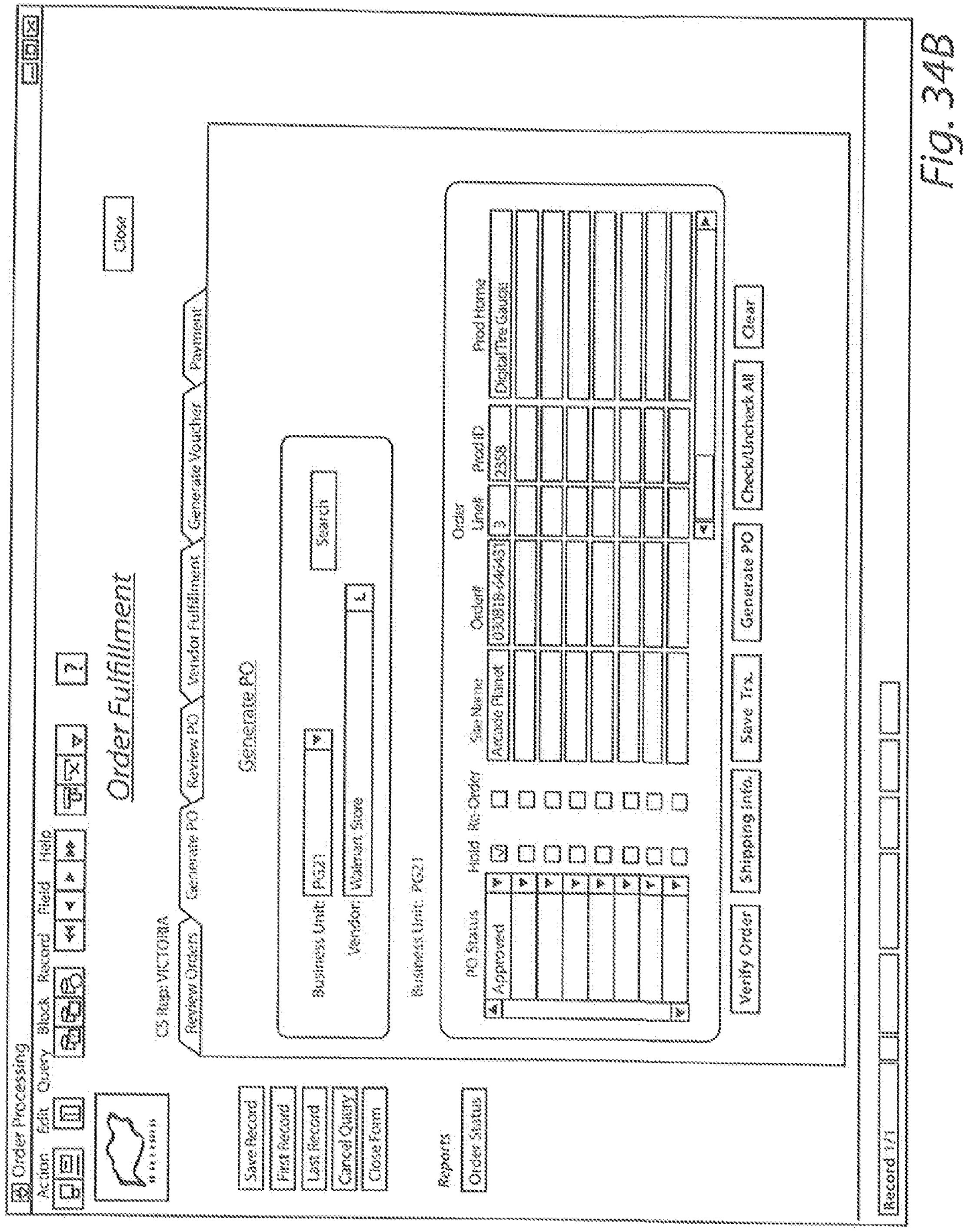
FIG. 34B is an exemplary screen display of a prize order fulfillment web page to generate a purchase order.
Figure 34C:
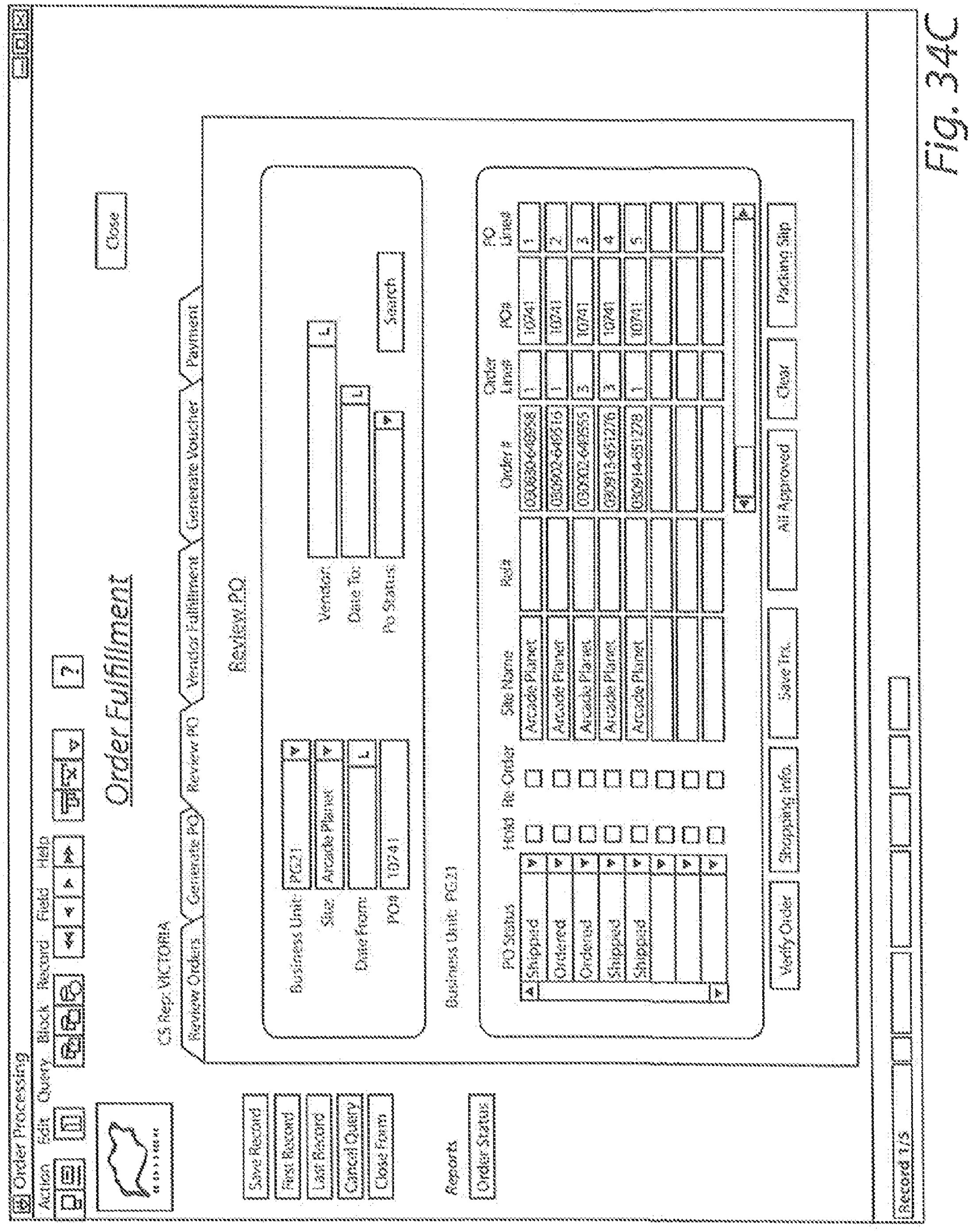
FIG. 34C is an exemplary screen display of a prize order fulfillment web page to review a purchase order.
Figure 34D:
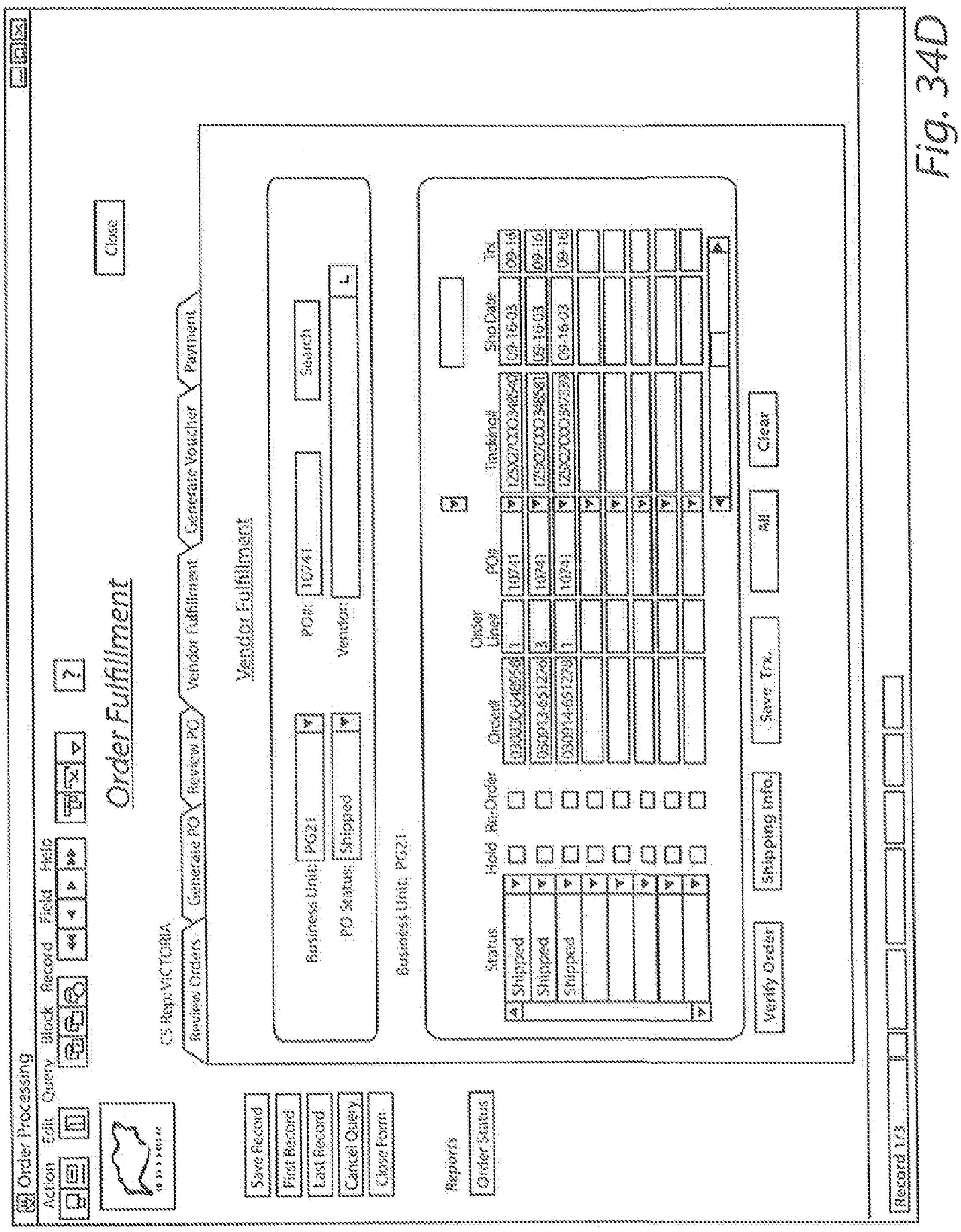
FIG. 34D is an exemplary screen display of a prize order fulfillment web page for vendor fulfillment.
Figure 34E:
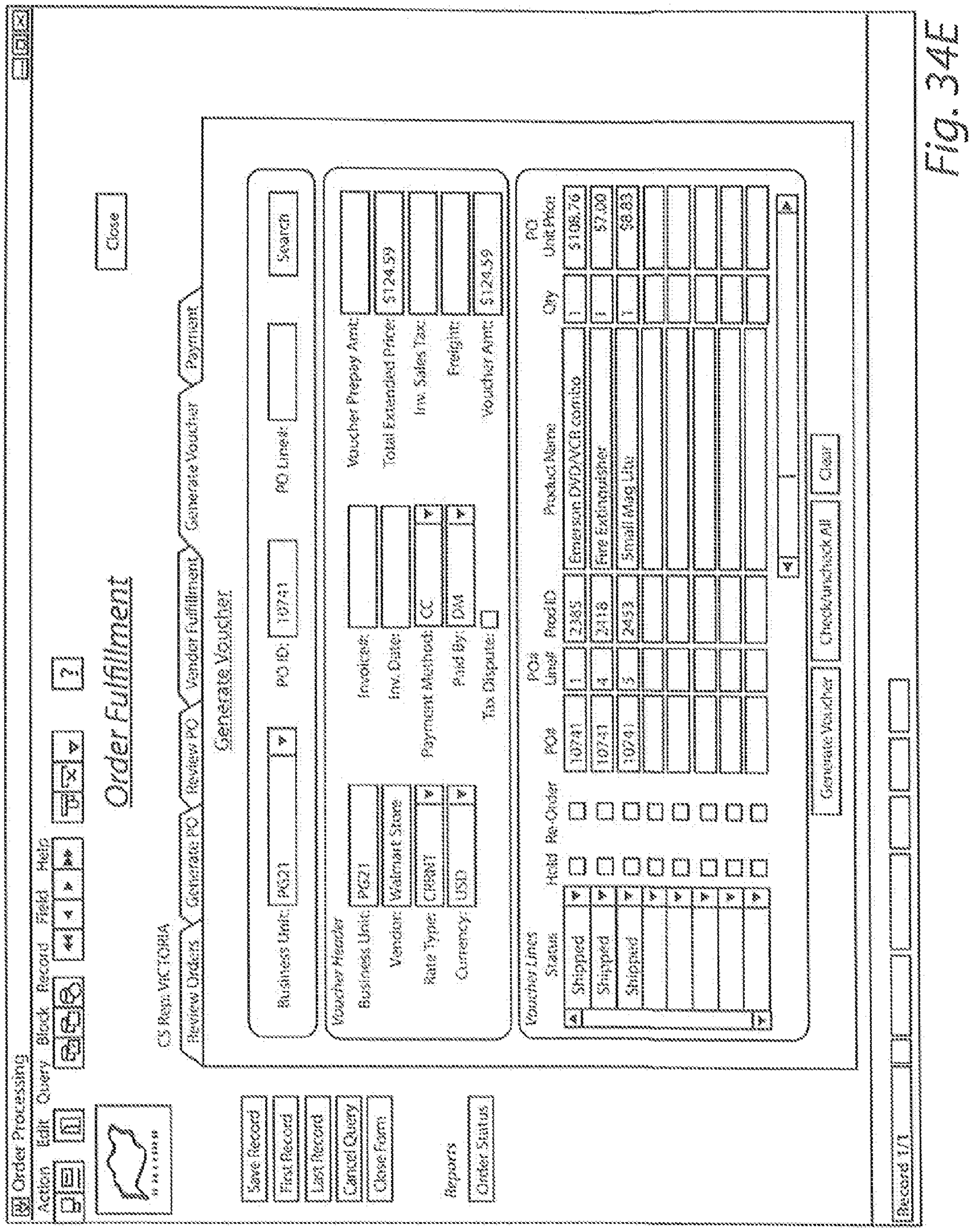
FIG. 34E is an exemplary screen display of a prize order fulfillment web page to generate a voucher.
Figure 34F:
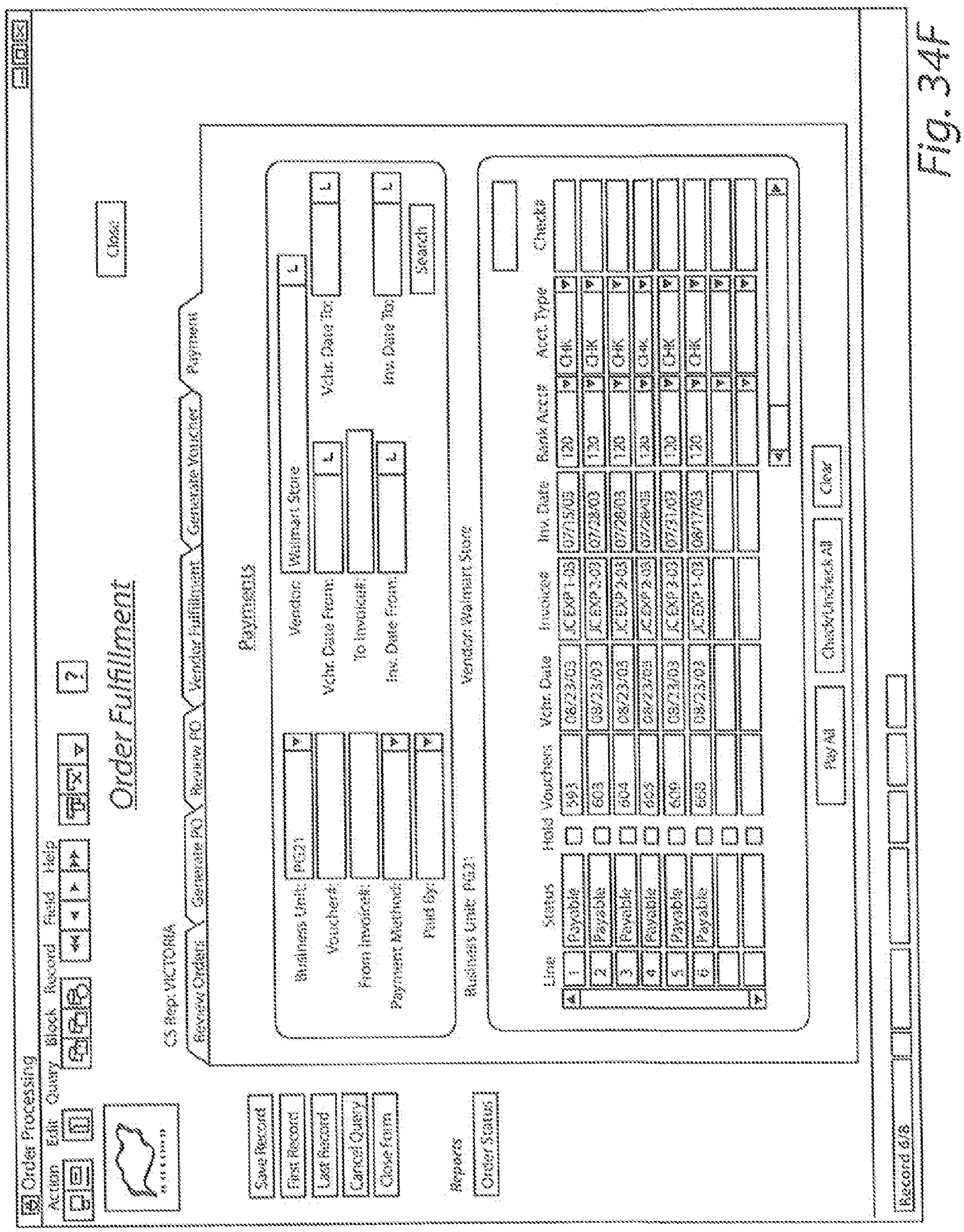
FIG. 34F is an exemplary screen display of a prize order fulfillment web page for payments.

FIGS. 34A-34F are screen displays, set forth by way of example but not limitation, for prize order fulfillment. FIG. 34A is an exemplary screen display of a prize order fulfillment web page to review and approve orders. FIG. 34B is an exemplary screen display of a prize order fulfillment web page to generate a purchase order. FIG. 34C is an exemplary screen display of a prize order fulfillment web page to review a purchase order. FIG. 34D is an exemplary screen display of a prize order fulfillment web page for vendor fulfillment. FIG. 34E is an exemplary screen display of a prize order fulfillment web page to generate a voucher. FIG. 34F is an exemplary screen display of a prize order fulfillment web page for payments.

Other mechanisms that may be included with player terminal 200 is a player tracking mechanism. Player terminal 200 can be configured to have any of a wide range of appearances and may vary from implementation to implementation. The onscreen display is described in greater detail with reference to FIG. 6. The onscreen display 204 is for displaying play and entertainment images. According to certain non-limiting exemplary embodiments, the onscreen display 204 can include touch screen elements for selection of game options, game play and prize shopping. Alternate input controls include a mouse, trackball, pin pad, biometric device, touchpad, etc. Similarly, the various controls buttons 206 may be configured for selection of game options, game play and prize shopping. An exemplary player terminal can also include a printer to enable the dispensing of an electronic voucher that represents the player's unplayed game credits and/or prize points/currency won by the player and/or the player's prize order receipts. Player terminal 200 can include a device for reading credit cards, debit cards and electronic vouchers to allow acceptance of cashless funds to enable play of a game, or to allow acceptance of previously issued vouchers and other credits or prize currencies. Non-limiting examples of electronic vouchers are ones that include a bar code or an RFID code, smart card.

Player terminal 200 can include an audio system for generation of sounds to enhance the game play experience.

Other non-limiting features of player terminal 200 can include a currency acceptor for accepting money and/or a currency converter for converting other forms of currency into game credits or prize credits, according to some non-limiting exemplary embodiments. Thus, the player terminal can be adapted to accept different forms of monetary input such as cash, game credit vouchers, credit cards, tokens, debit cards, e-cash, cyber cash or any electronic forms of payment, according to certain non-limiting exemplary embodiments. Optionally, the player may be allowed to withdraw or debit credits from his player account.

According to certain non-limiting exemplary embodiments, the player terminal can be configured to accept multi-denomination currency. The player is given the option to select the wager amount for a given game. For example, depending on the configuration of the player terminal, the player can select 25 cents or 50 cents as a wager per game (other denominations are possible). According to certain non-limiting exemplary embodiments, the pay tables change for each wager amount. For example, more prize points, cash, game credits or other form of currency or prize reward are awarded when the wager amounts are more per game. In some non-limiting exemplary embodiments players can wager multiple credits for each payline or prizeline.

The majority or all of the of game symbols used on the reel strips are preferably ranked in order of importance. For example 1 bar, 2 bars, 3 bars, or single double or triple sevens. This is an aid to the player to more quickly determine the relative value of each symbol compared to the others to aid in skill decisions by the player. Clearly triple bars are worth more than double or single bars.

The player may win cash instead of or in addition to prize-points, according to certain non-limiting exemplary embodiments. In alternate non-limiting exemplary embodiments, the player is awarded prize-points that can only be redeemed for merchandise, in compliance with the laws and regulations of a particular jurisdiction. In other non-limiting exemplary embodiments, the prize-points can be redeemed for cash. In yet other non-limiting exemplary embodiments, the prize-points can be redeemed for cash and/or merchandise and can be used for replay of games. In alternate non-limiting exemplary embodiments, prize points may not be used for replay of games, in compliance with the laws and regulations of a particular jurisdiction.

When prize-points are redeemed for prize merchandise, they can be redeemed at a prize center. According to certain non-limiting exemplary embodiments, the prize center is an online e-commerce prize redemption center that can be accessed and viewed at the player terminal, such as player terminal 200 of FIG. 2A, for example. The prize center may also be a dedicated application on a client device or kiosk with periodic updates from the server. Players can order prizes through the online prize center using prize points. Prizes can be mailed to the player's desired shipping address or to the location of the player terminal that was used to access the online prize center, according to certain non-limiting exemplary embodiments. According to certain other non-limiting exemplary embodiments, prize points can be redeemed only at the game site in order to comply with the applicable jurisdictional laws.

Alternatively, prize points can be redeemed at an automated prize kiosk or at a manned prize booth. For example, the player terminal can print prize point vouchers for a player if the player elects to redeem prizes at a later time. The prize point vouchers can be used to redeem prizes at automated prize kiosks or at manned prize booths. According to certain non-limiting exemplary embodiments, prize point vouchers do not have a cash value and may only be redeemed for merchandise prizes. In other non-limiting exemplary embodiments, prize point vouchers may have a cash value or may be used to play games at a player terminal. For example, in certain non-limiting exemplary embodiments, a player has the option of converting prize points into game credits for playing games using a suitable interface to drive the conversion process. According to certain non-limiting exemplary embodiments, the conversion to game credits can occur automatically if there are no game credits left.

According to certain non-limiting exemplary embodiments, a player is allowed to accumulate prize points over time. For example, if a desired prize costs more prize points than is represented by a given prize point voucher, the player can then insert multiple vouchers into a single machine in order to redeem the desired prize at an appropriate web portal.

According to certain non-limiting exemplary embodiments, in addition to printing a prize point voucher, the player terminal at which the player earned his prize points uploads the player's prize points or prize point cash value to the player's account at the appropriate server that manages prize points accounts. Thus, a player can log onto a web portal for redeeming prizes at his home computer. For example, the player can type into his computer the information displayed on his prize point voucher and the online prize center can then validate the voucher by checking against the player's online account. Alternatively, this anonymous voucher can be assigned to this user account al this time. This would allow only one use of the voucher.

In other non-limiting exemplary embodiments, the player's account is credited with the number of prize points represented by the voucher when the voucher is validated. Once the player's account is credited with the prize points represented by his voucher, the player may then commence shopping for prizes if he so chooses.

In an alternate non-limiting exemplary embodiment, the player may choose to have his prize points directly credited to his online account or smart card in lieu of receiving a printed voucher. Registration for this account can occur at the gaming device, at the prize center kiosk, at a registration desk, at a web portal, etc.

In certain non-limiting exemplary embodiments, players may purchase prize points using monetary currency or electronic funds transfer (EFT) to supplement the prize points to enable the selection of higher priced items in the prize center.

Further, according to some non-limiting exemplary embodiments, there may be different types of prize currencies, of which prize points are one type of prize currency. Non-limiting examples of various types of prize currencies include Silver Certificates, Gold Certificates, and Platinum Certificates. Each type of certificate has a different prize value. In other words, a silver certificate has a different prize value than the gold and platinum certificates. The denominations "silver", "gold" and "platinum" are merely examples. The prize currencies can be won on multiple types of machines that offer a range of different types of prizes such as jewelry, vacation trips, etc.

According to some non-limiting exemplary embodiments, a player is allowed to combine the various types of prize currencies when ordering prizes. For example, if a player wishes to order a car prize from the prize center, but the player does not have enough prize points to redeem the car prize, the player can combine prize points with other types of prize currencies that the player possesses.

In certain non-limiting exemplary embodiments, the player is also allowed to supplement his prize currencies with cash in order to redeem his desired prize. For example, the prize redemption terminal or kiosk may include a currency converter for allowing a player to convert cash and/or other types of prize currencies into the appropriate prize currency for redeeming the player's desired prize. A player may alternately convert from one specific prize voucher to another prize or prizes by first exchanging the specific prize voucher for prize points. This exchange option is configurable to the player and site. For example a voucher for a basketball may be converted back into prize points and the player then can select 2 baseballs or 1 baseball and 1 baseball hat.

The prize redemption terminal may be the same player terminal where the games are played or a separate terminal specially adapted for prize redemption. Further, according to certain non-limiting exemplary embodiments, the player may use prize redemption terminals at any qualified location. In other words, the player is not restricted to redeeming prizes at the same location where he played the game. Some machines may only have the game, and some others may only have the prize redemption center.

Figure 2C:
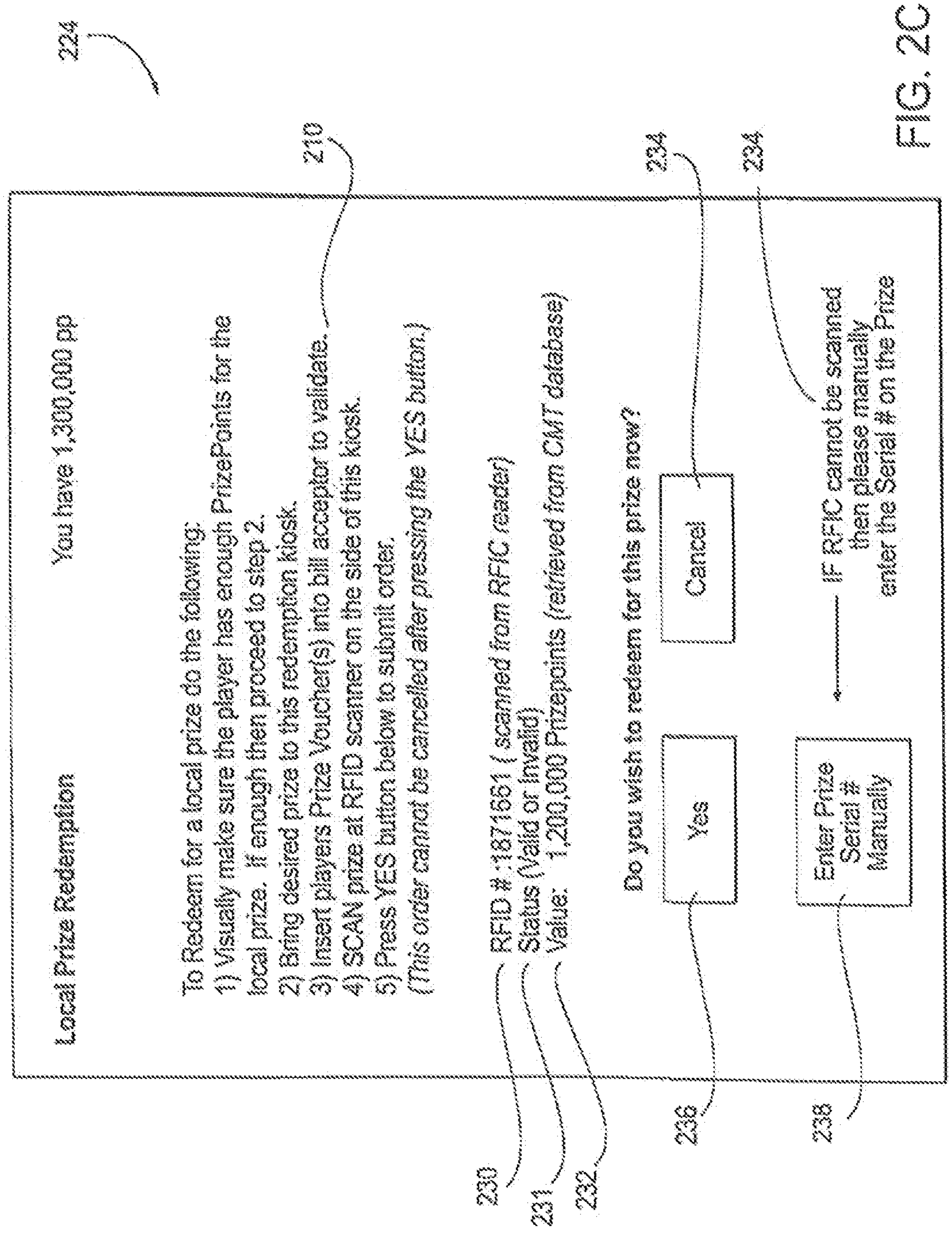
FIG. 2C is an example of a prize redemption interface associated with the game.
Figure 2D:
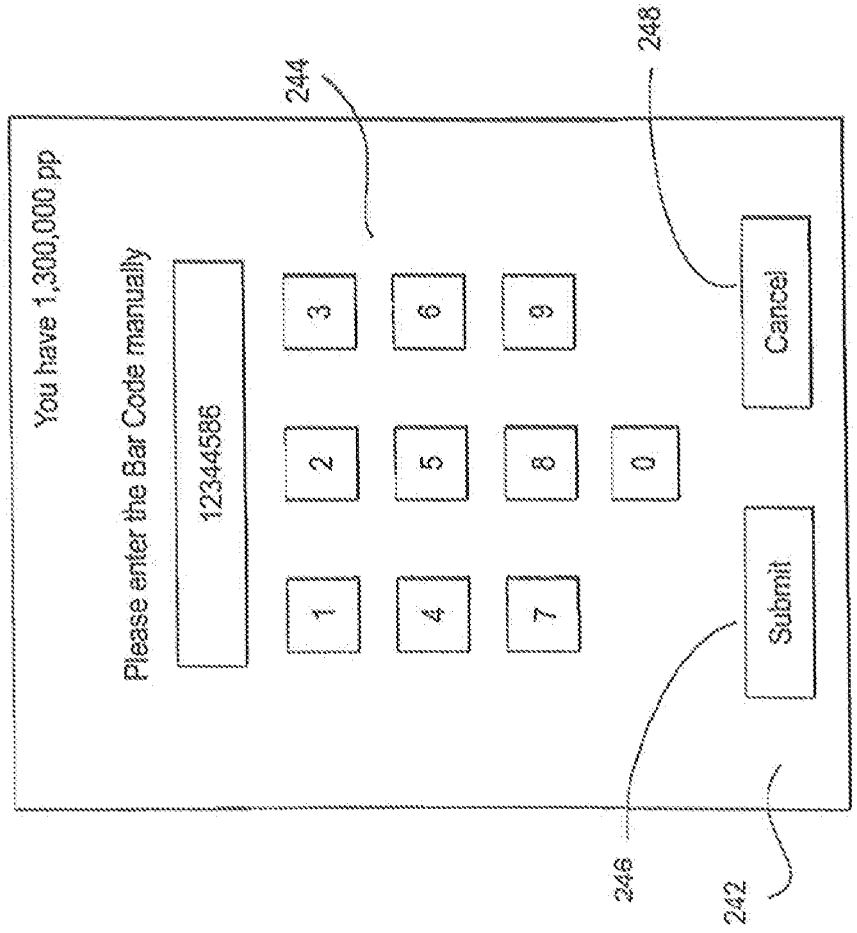
FIG. 2D is an example of certain aspects of a user interface for allowing an operator to manually enter a bar code.
Figure 20:
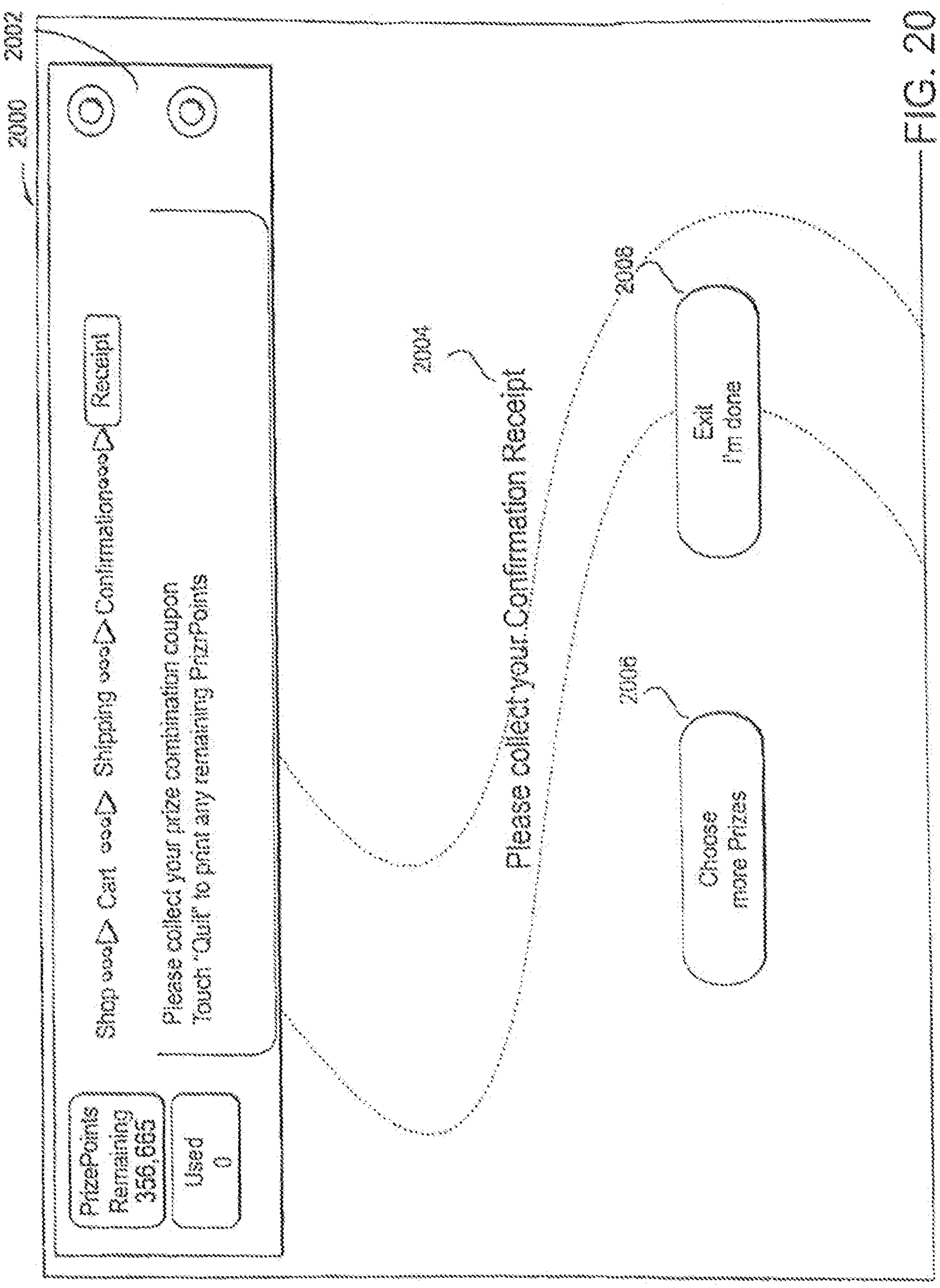
FIG. 20 illustrates an exemplary screen display for allowing the player to conclude his prize selection transaction using the online prize center, according to certain exemplary embodiments.

FIGS. 2B-2G depict non-limiting examples of certain aspects of a user interface for allowing an operator to perform various functions associated with the game, according to certain non-limiting exemplary embodiments. For purposes of explanation, assume that a player wishes to redeem a local prize at a prize kiosk. The player selects a prize and hands the selected prize to an attendant at the kiosk. FIG. 2C shows attendant instructions 210, an attendant menu 212. FIGS. 2C, 2D, 2E and 2F show a sequence of local prize redemption display windows 224, 242, 250, and 262 respectively. FIG. 20 shows a prize redemption receipt 272, Attendant menu 212 of FIG. 2B includes options for manual bar code entry 214 of a selected prize, printing coupons 216, local prize redemption 218 and other operator functions 220. Attendant menu 212 is not limited to the above options and thus may vary from implementation to implementation.

If the attendant selects option 218 for local prize redemption, then the operator is presented with display window 224 shown in FIG. 2C. Window 224 provides general instructions 228 for redeeming a local prize. General instructions 228 include instructions to insert the player's prize voucher(s) and instructions to scan the RFID on the prize selected by the player or enter the prize bar code manually or using a bar code scanner. After the attendant inserts the player's prize voucher(s), window 224 displays the player's prize points 226 that are available for prize redemption. After the attendant scans the RFID on the prize selected by the player, window 224 displays the RFID number 230, status 231 and value 232 of the selected prize. Display window 224 allows the attendant either to proceed with the prize redemption procedure by selecting the "Yes" option 236 or to cancel the procedure by selecting the "Cancel" option 234. If for some reason, the attendant is unsuccessful at scanning the RFID on the selected prize, the attendant can select the manual option 238 for manually entering the serial number or bar code number associated with the prize, using the manual entry interface shown in FIG. 2D. At this time the prize values are queried from the prize redemption database, and the verification that the player has enough prize points to purchase the prize is done at the client or at the prize database server. If the player has enough prize points the prize is given to the player and prize points are deducted from the client device, player account or smart card.

Figure 2E:
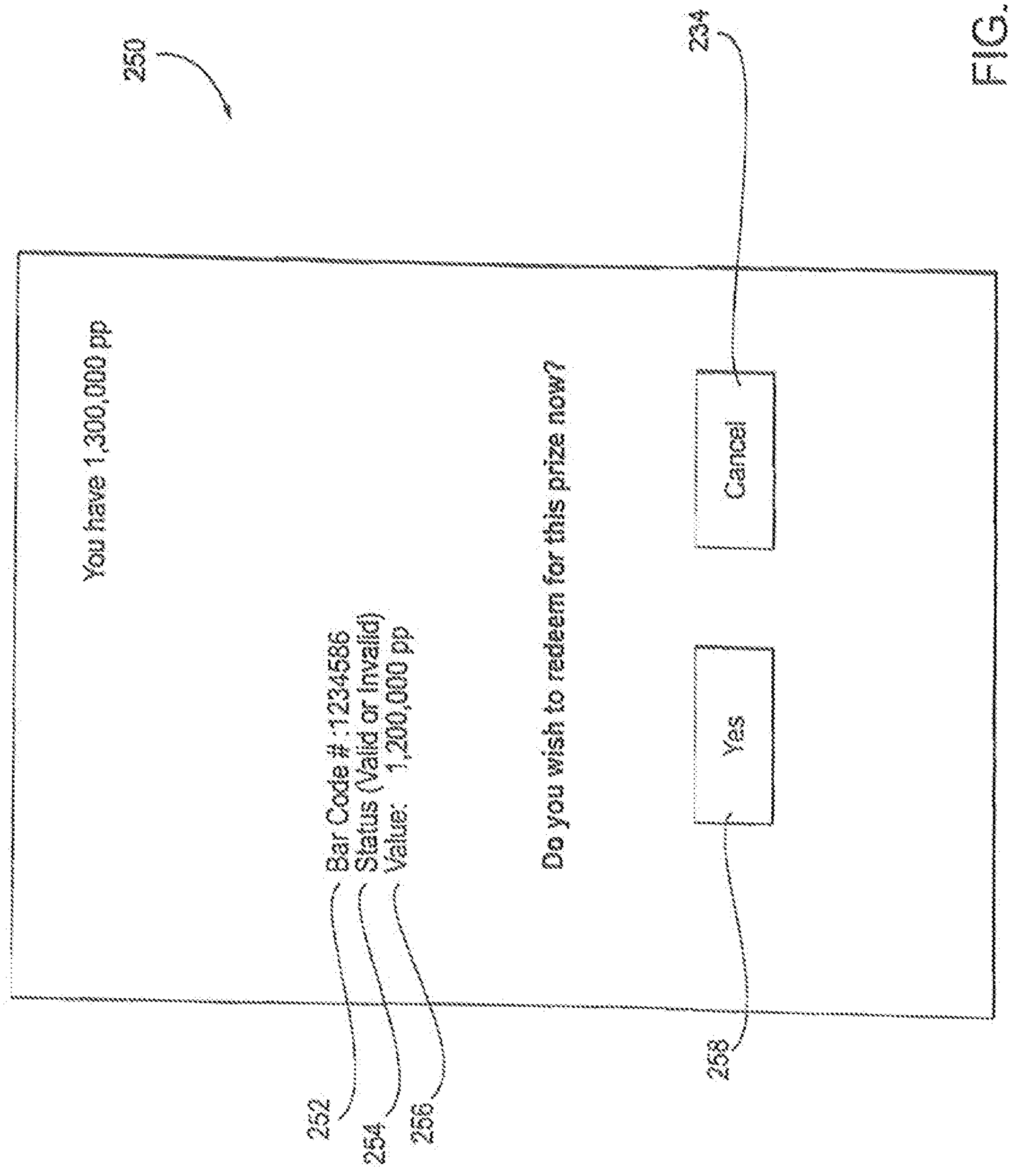
FIG. 2E is an example of certain aspects of a user interface for allowing an operator to redeem points for a prize.
Figure 2F:
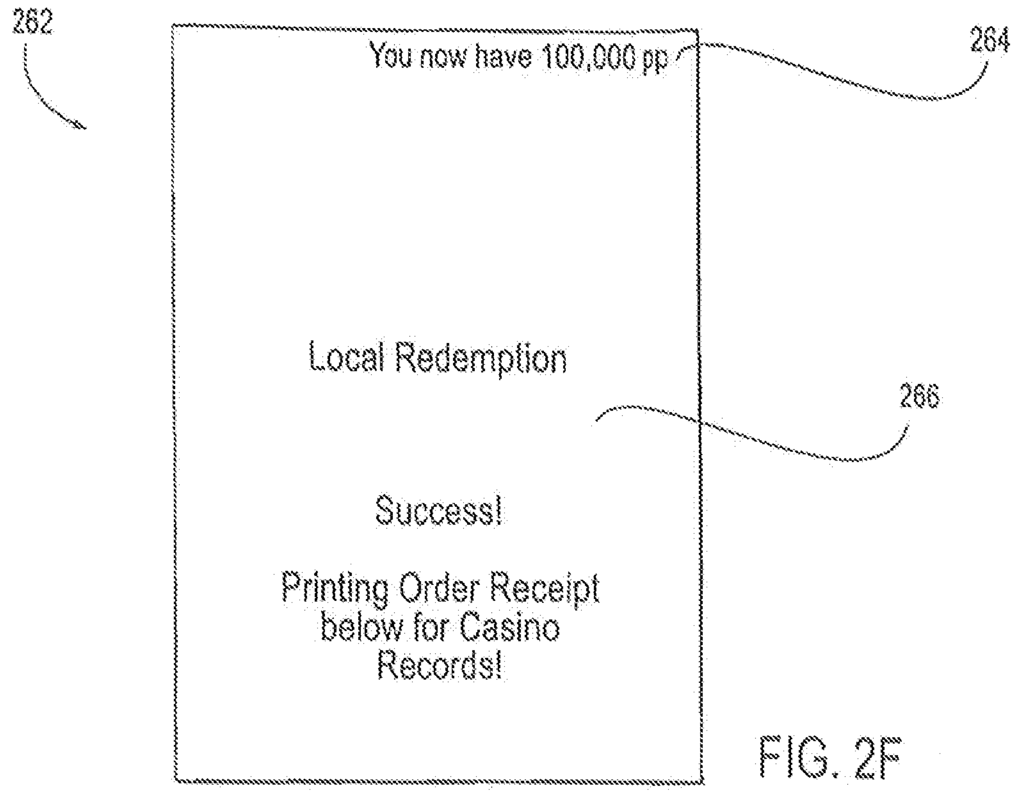
FIG. 2F is an example of a success notification associated with prize redemption.
Figure 2G:
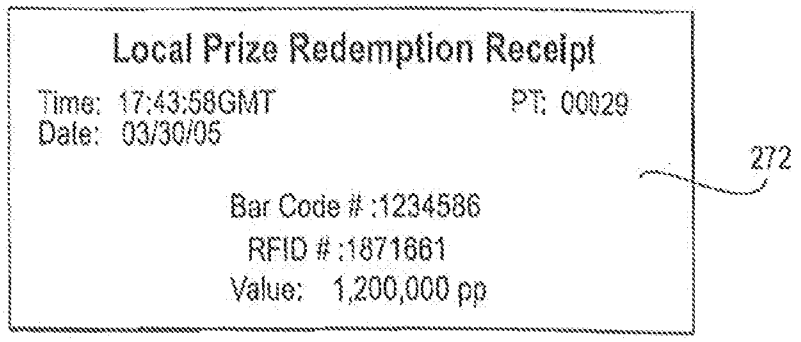
FIG. 2G is an example of a local prize redemption receipt.

If the attendant is successful in scanning the RFID on the selected prize, then, as shown in FIG. 2F message window 262 displays: 1) the number of prize points remaining 264, 2) one or more general messages 266 such as a message indicating success of the redemption procedure and/or a message indicating that a receipt is being printed. Receipt 272, shown in FIG. 2G is an example of a printed local prize redemption receipt. After the prize is redeemed, the attendant is presented with one or more interface windows (not shown) for entering information for bookkeeping and/or making event log entries 270, according to certain non-limiting exemplary embodiments. According to certain other non-limiting exemplary embodiments, the procedures for bookkeeping and/or event log entries may be automated. Players can choose locally delivered prizes or remotely delivered prizes. Other cabinet configurations may include built in prize dispensers. Inventory management is tracked by client and optionally prize servers so that pro-active restocking of the prizes can occur.

If the attendant is unsuccessful at scanning the RFID, the attendant can manually enter the serial number of the selected prize at the interactive display window 242. The attendant can use buttons 244 for entering the serial number and has the option of selecting the “Submit” option 246 or the “Cancel” option 248. If the submit option is selected, then, as shown in FIG. 2E, interactive display window 250 displays the prize serial number such as a bar code number 252, status 254, and prize value 256. The attendant can either select the “Yes” option 258 to redeem the selected prize or the “Cancel’ option 260. If the attendant selects the “yes” option 258, display window 262 displays information as described above. For audit purposes the employee who executed the transaction can be logged by first identifying himself to the redemption device by inserting an employee card into the card reader, having an employee unique RFID device that is scanned, logging in with a username and password or other identifying techniques including biometric devices. Various client and server side reports are available to show all redemption transactions per terminal or per player terminal or per play or per employee who initiated the transaction.

According to certain non-limiting exemplary embodiments, a player terminal may include a voucher printer. The voucher can print several types of vouchers. Non-limiting examples of types of vouchers include prize point vouchers, unplayed game credit vouchers, prize confirmation receipts, game credit vouchers, cash vouchers, saving the game state etc.

Voucher tickets may contain information such as voucher type, location identification, machine readable ticket information (e.g., bar-coded ticket or a debit card that can read and validated by a third party redemption location), printed ticket identification (e.g., ticket number), date and time of issue, identification of issuing device, and value of voucher (e.g., dollar value, or game credits or prize points currency).

An example of a third party redemption location is a retail establishment that would accept prize points in exchange for goods. Some of the aforementioned information that appears on the voucher ticket are optional and may vary from one implementation to another. Player ID may also be on the voucher if known by the device or system at the time of printing the voucher. According to certain non-limiting exemplary embodiments, the voucher system is supported by an associated accounting management system and a prize center fulfillment system. The voucher system, accounting management system and prize center fulfillment system include but are not limited to computer servers, network devices, communication devices, relational databases, and links to $3^{rd}$ party prize fulfillment businesses.

Each player terminal may be equipped with a printer for printing vouchers, according to certain non-limiting exemplary embodiments. According to certain non-limiting exemplary embodiments a smart card can be used in lieu of a printer.

According to certain non-limiting exemplary embodiments, as part of the voucher issue process, the player terminal requests a unique voucher code from an electronic ticketing database server and remote site manager (RSM) that is networked to the player terminal. In response, the ticketing database server creates a unique, one-time voucher code, according to certain non-limiting exemplary embodiments.

According to certain other non-limiting exemplary embodiments, the player terminal can create the unique voucher code and send the created voucher code to the ticketing database server for logging into a transaction log. In other words, in a client-server architecture, either the client or the server can perform some of the above functionality including the creation of unique voucher codes. The client side creation of a unique voucher code allows players to still cash out of the machine even with no server connection. However until a successful connection has been established, and this transaction is uploaded to the server from the client device, these vouchers will not be usable at any other client terminal. The issuing terminal may allow the re-insertion of the voucher and it can self validate the ticket because the transaction is in a local transaction log or database.

The ticketing database server may archive and manages the transaction in a transaction log, according to certain non-limiting exemplary embodiments. The transaction log includes information regarding the voucher unique code, the ID of the issuing player terminal, time and date of the issuance of the voucher, the amount of prize points or cash or unplayed game credits or prize order information, depending on the type of voucher issued. The issuing player terminal may archive a similar transaction log. In addition, there may be a central data center that stores and manages the transaction log. The voucher is then printed at the player terminal for collection by the player. An onscreen message may appear instructing the player to collect his ticket.

Subsequently, the player can bring his voucher back to any player terminal and insert the voucher into a voucher acceptor at the player terminal. A non-limiting example of a voucher acceptor may be, for example, a World Bill Acceptor (WBA) model WBA13SS which is commercially available from JCM® American Corporation. The voucher acceptor may be adapted to also accept dollar bills and other prize currencies as well, according to certain non-limiting exemplary embodiments.

Once the voucher is inserted in a voucher acceptor, a voucher validation process begins. The voucher acceptor is capable of reading the bar codes and/or RFID-based codes, magnetic codes and OCR codes that are on the voucher. The unique code associated with the voucher references a value or a transaction stored in a database. The unique voucher code is forwarded to the ticketing database server for validation. If the unique voucher code is matched with an existing code stored in the local ticket voucher transaction log, then the ticketing database server will return to the player terminal the value represented by the voucher.

The ticketing database server is able to retrieve such a value from the voucher transaction log corresponding to the unique voucher code. The value may be in prize points in the case of a prize point voucher, or unplayed game credits in the case of an unplayed game credit voucher. The prize points or unplayed game credits are reflected on the prize point meter and the game credit meter, respectively. Once the voucher is validated, a notification of the validation with information on time of validation and the machine ID where voucher was inserted is sent to the ticketing database server and the central data center, according to certain non-limiting exemplary embodiments. Such a notification prevents the reuse of a validated voucher. In a preferred non-limiting exemplary embodiment, communication to and from the server uses secure HTTPS transport or proprietary encryption techniques are used.

If an unvalidated voucher is damaged or unreadable by a player terminal, a game site attendant may manually enter the voucher code by accessing an Attendant Menu Screen. Alternatively, the player can call the toll free number on the voucher to contact customer service for assistance. There are other options as well. The vouchers may have an expiration date, according to certain non-limiting exemplary embodiments. An expired voucher may not be validated, for example.

Figure 3:
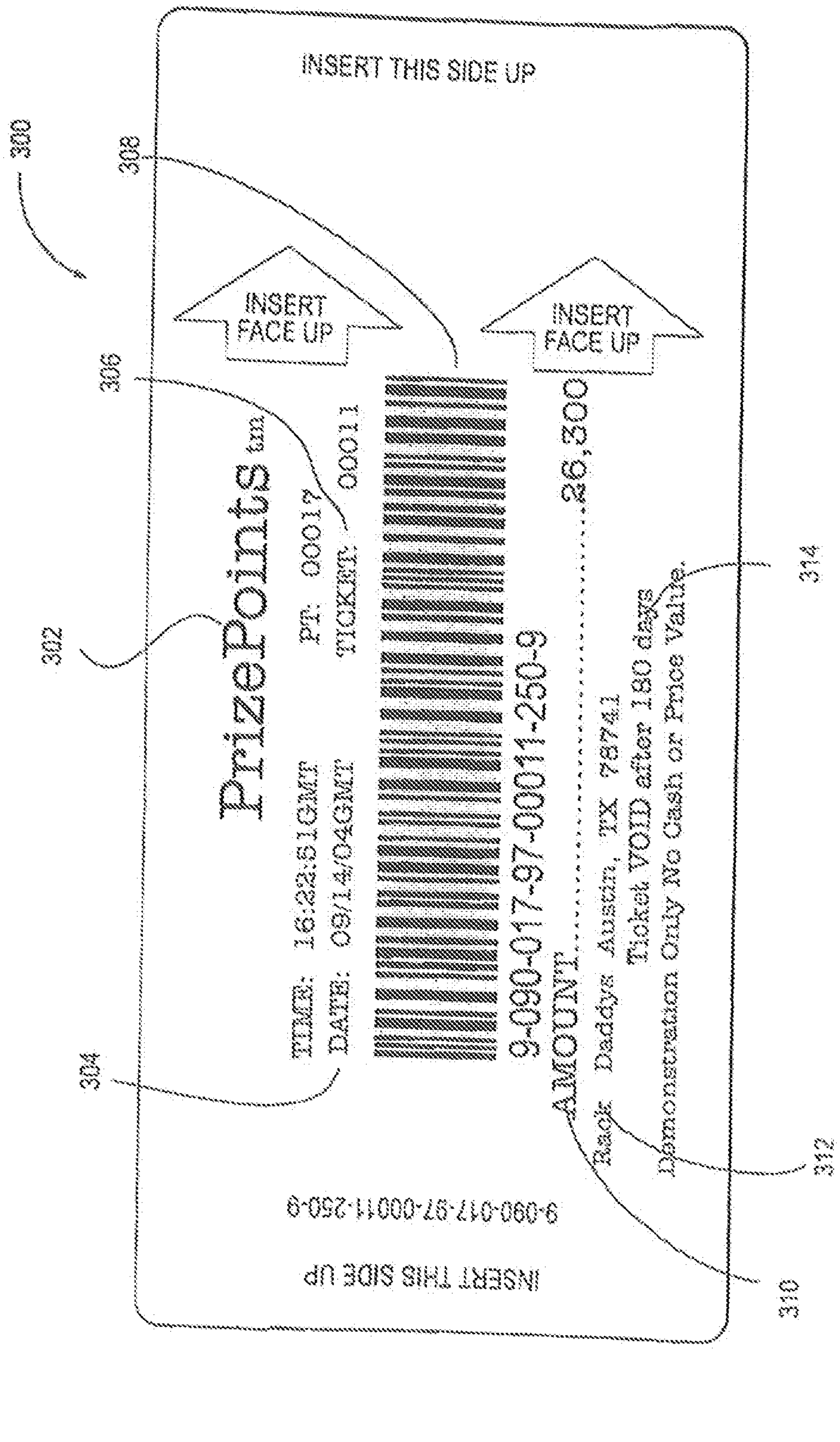
FIG. 3 illustrates an example of a prize points voucher, according to certain exemplary embodiments.

FIG. 3 illustrates an example of a prize points voucher, according to certain non-limiting exemplary embodiments. Prize points voucher 300 includes a voucher-type designation 302, a time and date information 304, a ticket identification 306, a bar code 308 so that information on the voucher can be read electronically, an amount 310, a location identification 312, and expiration information 314. The voucher of FIG. 3 is merely a non-limiting example of a prize points voucher and may vary from implementation to implementation. In certain non-limiting exemplary embodiments, the prize points voucher may contain more or less information including alternate forms of bar codes. Additional information may include instructions for usage of voucher and/or player information.

Figure 4:
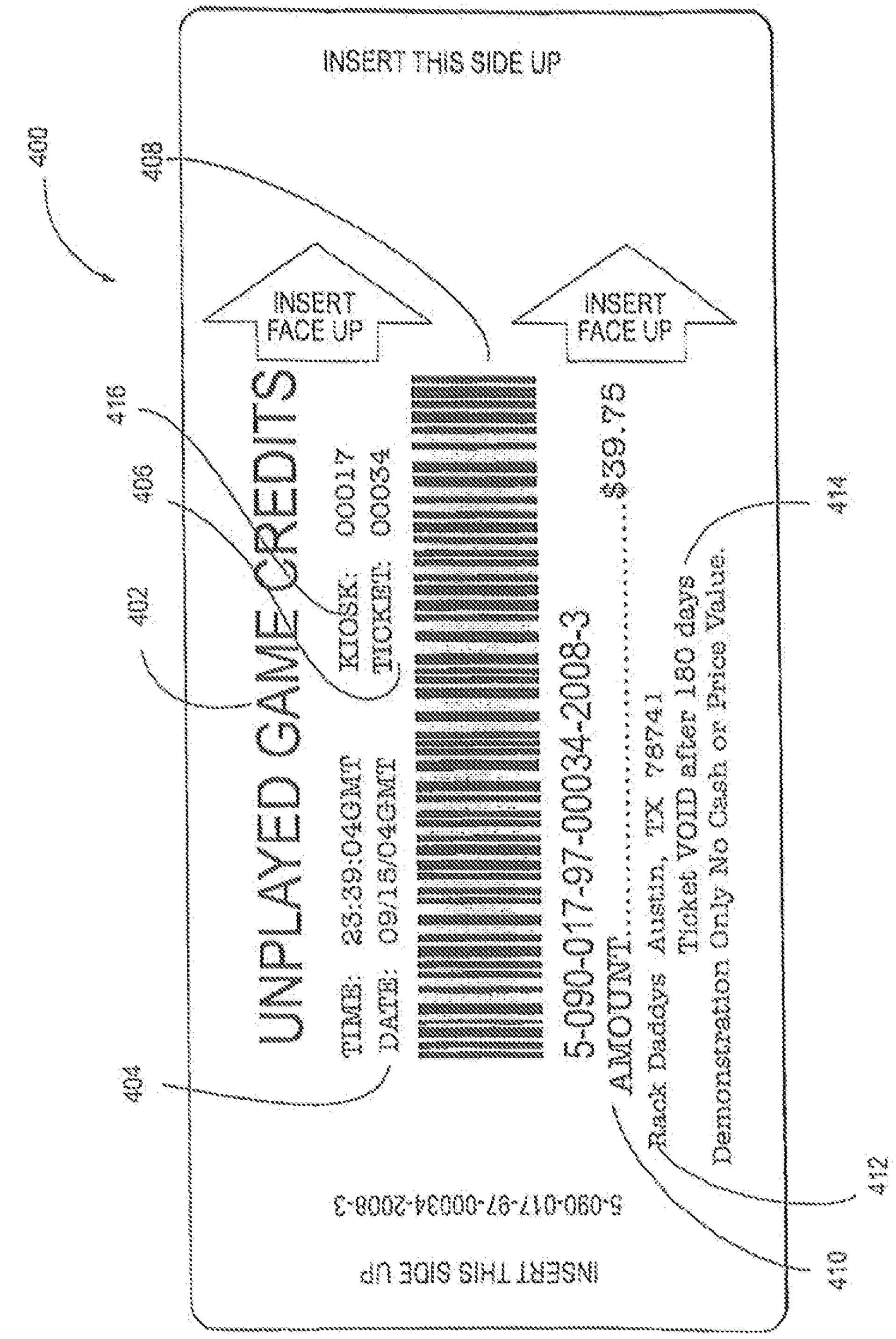
FIG. 4 illustrates an example of an unplayed game credits voucher, according to certain exemplary embodiments.

FIG. 4 illustrates an example of an unplayed game credit voucher, according to certain non-limiting exemplary embodiments. Unplayed game credits voucher 400 includes a voucher-type designation 402, time and date information 404, a ticket identification 406, a bar code 408 (so that information on the voucher can be read electronically), an amount 410, a location identification 412, expiration information 414 and an identification of the device that issued the voucher 416. The unplayed game credits voucher of FIG. 4 is a non-limiting example of an unplayed game credits voucher and may vary from implementation to implementation. In certain non-limiting exemplary embodiments, the unplayed game credits voucher may contain more or less information. Additional information may include instructions for usage of the voucher and/or player information.

If a player decides to discontinue playing games at a player terminal before exhausting the game credits on the player terminal, the player terminal can print an unplayed game credit voucher, such as the voucher in FIG. 4, for example, for the unplayed game credits remaining on the player terminal. In other words, a player is not forced to play all of the game credits at a single machine or all at one time. Such a voucher can be re-inserted into any similar player terminals for playing games, according to certain non-limiting exemplary embodiments. A ticket database system may be used to manage vouchers. For example, the database system records both the issuance and redemption of vouchers and may optionally be used to track player information.

According to other non-limiting exemplary embodiments, unplayed game credits can be credited to the player's online game account. A player may use these account based credits to authorize play on typically non-traditional gaining devices not limited to: cell phones, home PCs, PDAs, home game consoles, and other devices inside and outside a casino. As a non-limiting example, the player can play games on any authorized terminal players using game credits from his online game account even from a player's home. A database may be used to manage such online game accounts for players, including player/user information. Unplayed credit vouchers or other cash vouchers or prize point vouchers can be exchanged for actual currency where allowed by law. This can be done in the gaming machine a redemption kiosk, manually by an attendant, or at a retail store capable of scanning the voucher for authorization.

Another type of voucher is a prize confirmation receipt. A prize confirmation receipt is a voucher printed at the end of a successful order from the prize center or from a stand-alone prize kiosk or issued from a manned prize counter/booth. The prize confirmation receipt can optionally include information on checking the status of an order by calling a toll free number or by checking online using a designated URL, for example. A player may enter his order voucher number manually into the device to check his order delivery status and perform other customer service related functions. Alternately the order number may be stored on a smart card or other player associated account and a player can access order status by inserting the smart card or magnetic card into any device capable of reading it and providing order status queries to the prize fulfillment database. A player could also log-in to his account at his home or elsewhere through a web browser, a redemption kiosk, or a gaming player terminal to gain status for all of his recent orders or customer service related functions.

Figure 5:
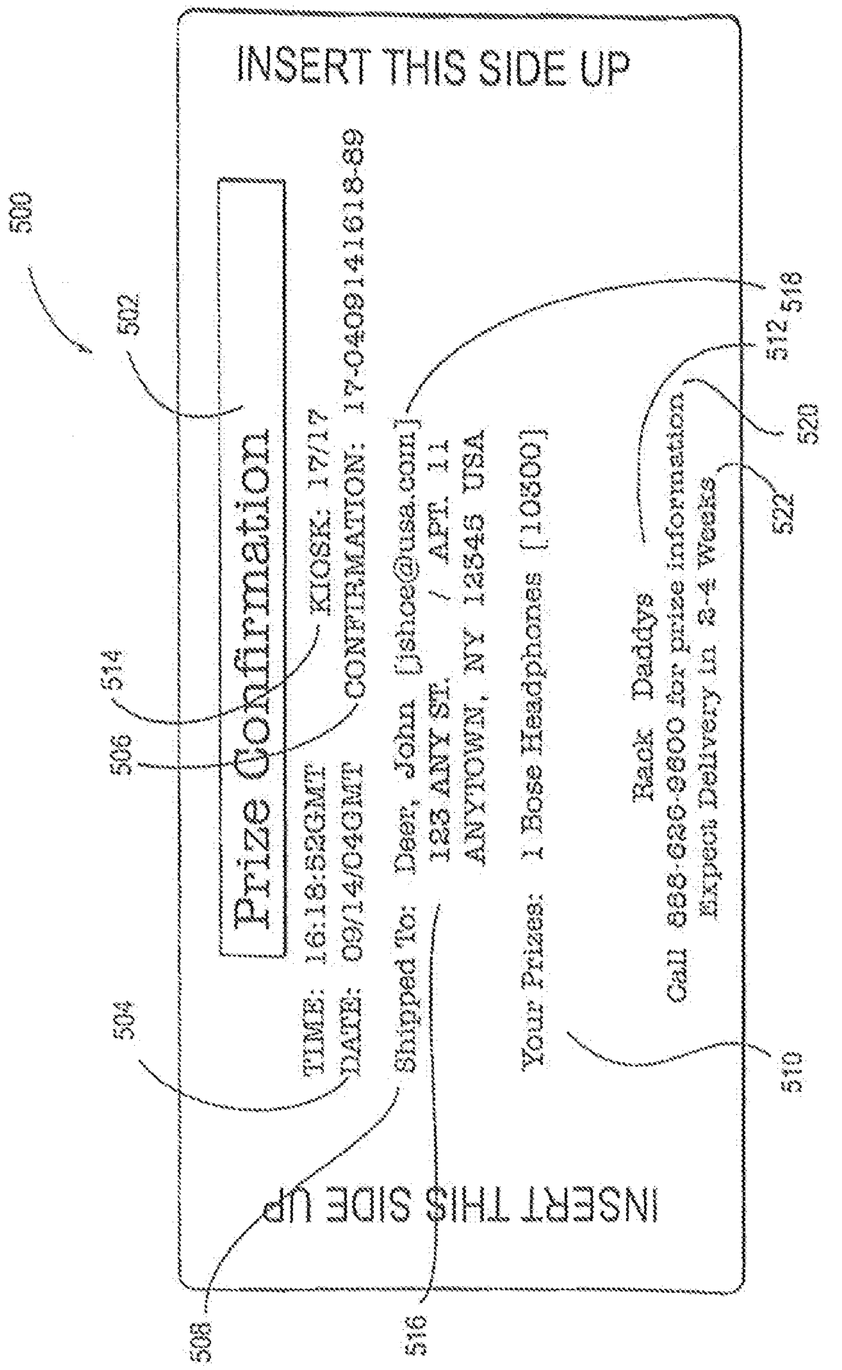
FIG. 5 illustrates an example of a prize confirmation receipt voucher, according to certain exemplary embodiments.

FIG. 5 illustrates an example of a prize confirmation receipt voucher, according to certain non-limiting exemplary embodiments. Prize confirmation receipt voucher 500 includes a voucher-type designation 502, a time and date information 504, a confirmation number 506, shipping information 508 that includes a shipping address 516 and optionally an email address 518, information on the prize or prizes ordered 510, a location identification 512, an identification of the device that issued the voucher 514, contact information 520 for obtaining status information and contacting customer service, and delivery information 522. The prize confirmation receipt voucher of FIG. 5 is a non-limiting example of a prize confirmation receipt voucher and may vary from one implementation to another. In certain non-limiting exemplary embodiments, the prize confirmation receipt voucher may contain more or less information. Additional information may include instructions for usage of the voucher and/or player information. Multiple prize confirmation receipt vouchers may be issued if there is insufficient space on single voucher for all the prizes ordered. Other types of additional information that can be included on any of the types of vouchers mentioned above include but are not limited to any of the following optional information: a player profile, player account information, player ID, player preferences, and shipping tracking numbers.

The bar codes described herein with respect to vouchers and prize currencies may be any suitable type of bar codes including linear bar codes, composite bar codes, two-dimensional bar codes, and matrix bar codes, according to certain non-limiting exemplary embodiments. Further, in certain other non-limiting exemplary embodiments, MD-based tags, and/or optical character recognition (OCR) codes can be used on the vouchers and prize currencies. The RAID tags may be embedded in the vouchers and prize currencies. Magnetic signatures or inks or watermarks may also be used to aid in the validation or identification of the voucher, the user, or other data associated with the voucher.

Figure 6:
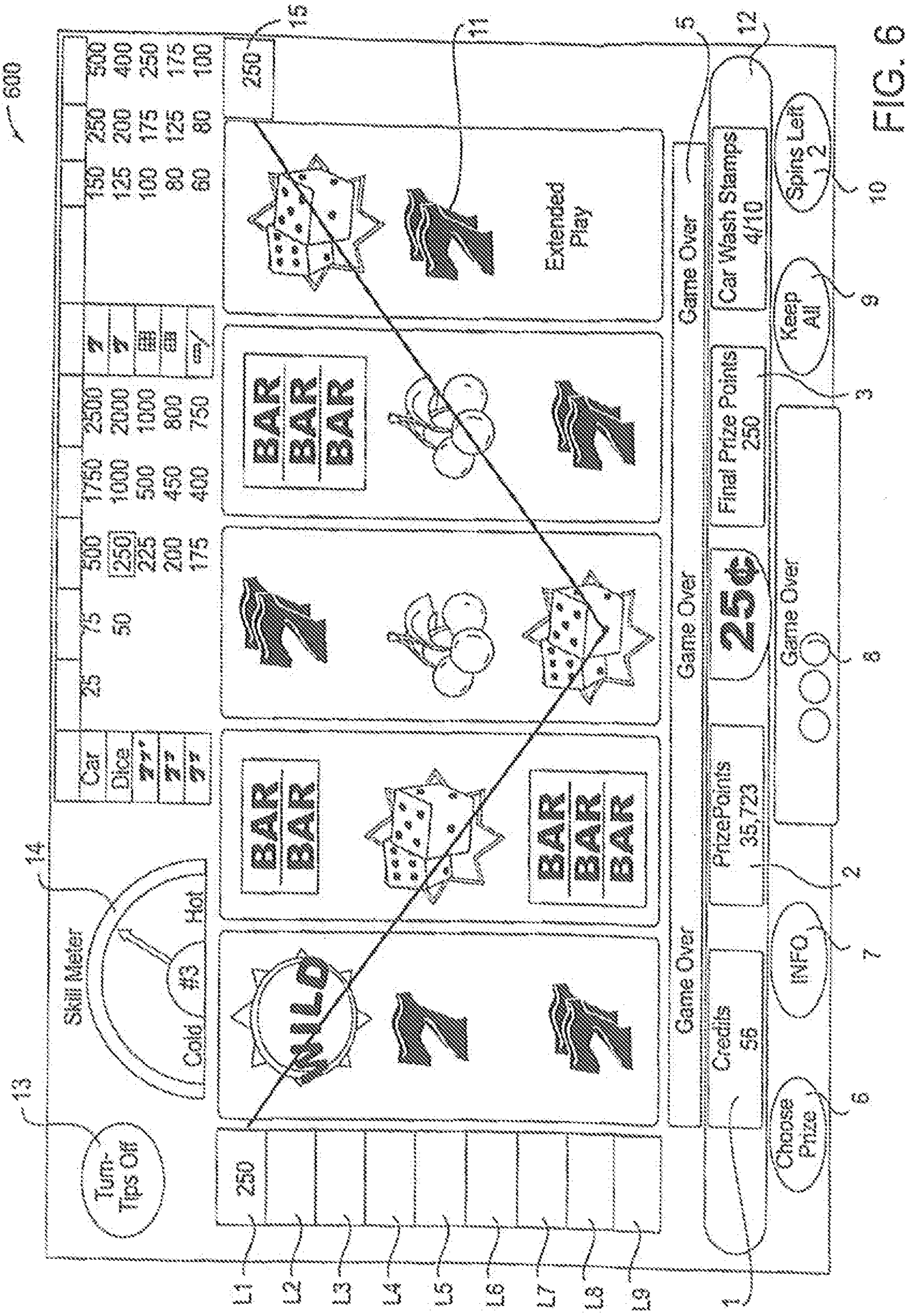
FIG. 6 illustrates a sample onscreen display on a player terminal, according to certain exemplary embodiments.

As explained above, FIG. 6 illustrates a sample onscreen display on a player terminal, according to certain non-limiting exemplary embodiments. Sample onscreen display 600 includes a credits meter 1, a prize points meter 2, a final prize points meter 3, a skill meter 4, a reel status indicator 5, a choose prize button 6, an information button 7, a prompt display 8, a Keep All button 9, a spin button 10, a prize line and reel display 11, an extended play bonus round indicator 12, a turn tips off/on button 13, pay-table 14, and nine pay-lines L1 to L9. FIG. 6 also shows an example of a highest winning pay-line 15. The onscreen display may optionally include a chance or "luck" meter (not shown in FIG. 6). Some of the onscreen display features are optional and may vary from one implementation to another. The amusement game on the player terminal is not limited to a video representation and may vary from one implementation to another. According to certain non-limiting exemplary embodiments, the amusement game can be of a purely mechanical form or a combination of mechanical and video forms including multiple video monitors.

In FIG. 6, the credits meter shows the amount of money or vouchers that the player has deposited into the machine to enable play of a game on the machine. According to certain non-limiting exemplary embodiments, money or unplayed game credit vouchers are deposited/inserted into the player terminal and are converted into game credits that are displayed on the credits meter. According to other non-limiting exemplary embodiments, the player can insert prize point vouchers and other prize currencies and elect to convert such vouchers and currencies into game credits or any other currency supported by the system. In certain non-limiting exemplary embodiments, the credit meter may not be incremented through game play. On the other hand, in other non-limiting exemplary embodiments, the credit meter can be incremented by game play through a winning outcome, for example. The credits meter is decremented when the player uses his credits to play games or by printing an unplayed game credit voucher should the player decide to interrupt his game experience.

The prize point meter, such as that shown in FIG. 6, is incremented at the end of a game when a player achieves a winning combination as represented by one of the prize-lines. Prize points are accumulated for all games played in a session. The prize point meter can also be incremented when the player inserts a validated prize point voucher into the player terminal. The final prize point meter, such as that shown in FIG. 6, displays the number of prize points that are won immediately after a game is completed, for example. A player may also win prize points during a game or at the start of a game and whether or not the game is pay-to-play or free play. Promotional game credits or prize credits may optionally be given to the player as an inducement to play more games. Normally these promotional givebacks would be tied to the players gaming activity. Typically the more the player plays or more he wagers the more promotional opportunities the player would be given. The skill meter may be used on promotional or free play games as well as pay to play games.

It should be noted that single or multiple games can be contained on a gaming device. The player can select a desired game.

According to certain non-limiting exemplary embodiments, a player may be provided with a game that meets the standards of a given jurisdiction, such as Texas, where the replay of winnings is prohibited. In this non-limiting exemplary embodiment, it would be possible to provide the same amount of play time that a player would experience for a normal gaming session in a Las Vegas like jurisdiction where he can replay his winnings, but in this jurisdiction he cannot replay his winnings. This would normally equate to the same number of spins in a game for the amount of money brought to the gaming location by the player. This non-limiting exemplary embodiment is provided as a non-limiting example.

In another embodiment, given by way of example and not limitation, a skill based slot machine is provided which is as easy to play as video poker. In this non-limiting exemplary embodiment, a player can within just a few seconds decide what reels to hold and which to re-spin in a manner similar to the hold and draw in video poker. As will be appreciated by those skilled in the art, this will work to reduce player confusion, and thus help retain the player. There are many more winning combinations in a reel spinner than in video poker and thus it is preferred to provide a game in which a player is not required to do the mental calculations to figure out the best combination. By way of analogy, the complexity of these calculations could be the equivalent of up to nine poker hands played simultaneously in approximately two to three seconds.

Another embodiment, given by way of example and not limitation, provides onscreen video, and audio as an aid to the player in making skill decisions.

Yet another embodiment, given by way of example and not limitation, provides a game which meets jurisdictional requirements that limit the total payout to a fixed multiple of the original bet, or a fixed amount, whichever is less.

In a further non-limiting exemplary embodiment, all prize rewards would be provided in the form of merchandise and not cash. This non-limiting example provides the advantage of meeting jurisdictional requirements, as well as other advantages that will be apparent to those skilled in the art.

A still further embodiment, given by way of example and not limitation, provides a game in which the replay of winnings is not allowed. This non-limiting exemplary embodiment provides the advantage of meeting jurisdictional requirements, as well as other advantages that will be apparent to those skilled in the art.

An additional non-limiting exemplary embodiment provides a fully self-contained video prize redemption center for the player to redeem his winnings on the gaining cabinet. This non-limiting exemplary embodiment advantageously provides the player with a convenient means of redeeming prizes, while reducing staff requirements. Other advantages of this non-limiting exemplary embodiment will be evident to persons of skill in the art.

A further embodiment, given by way of example and not limitation, allows a player to save up his prize credits and unplayed game credits from multiple gaming sessions for later use at the prize redemption center.

Another non-limiting exemplary embodiment provides the ability for a player to know how skillfully he is playing against the machine. The "skill meter" is different than the game score or outcome. It lets a player know the objective quality of his decisions as he plays. This feedback may be provided instantaneously, over a period of time, over a series of moves, over an amount of wagering activity, or a number of games, or any combination of these methods of providing feedback. These examples should not be construed in a limiting way.

The skill meter shows a measure of the player's performance based on a running average of the last several games played by the player. At the end of each game, the skill meter shows whether the player's performance in the completed game has improved or deteriorated based on whether the completed game has raised or lowered the player's running average. For example, at the end of a game, the arrow in the skill meter may move to the right to indicate an improvement in player performance. The arrow would move to the left in the case of deterioration in player performance. The skill meter shown in FIG. 6 is an analog form of a skill indicator, but is not limited to analog forms.

Figure 7:
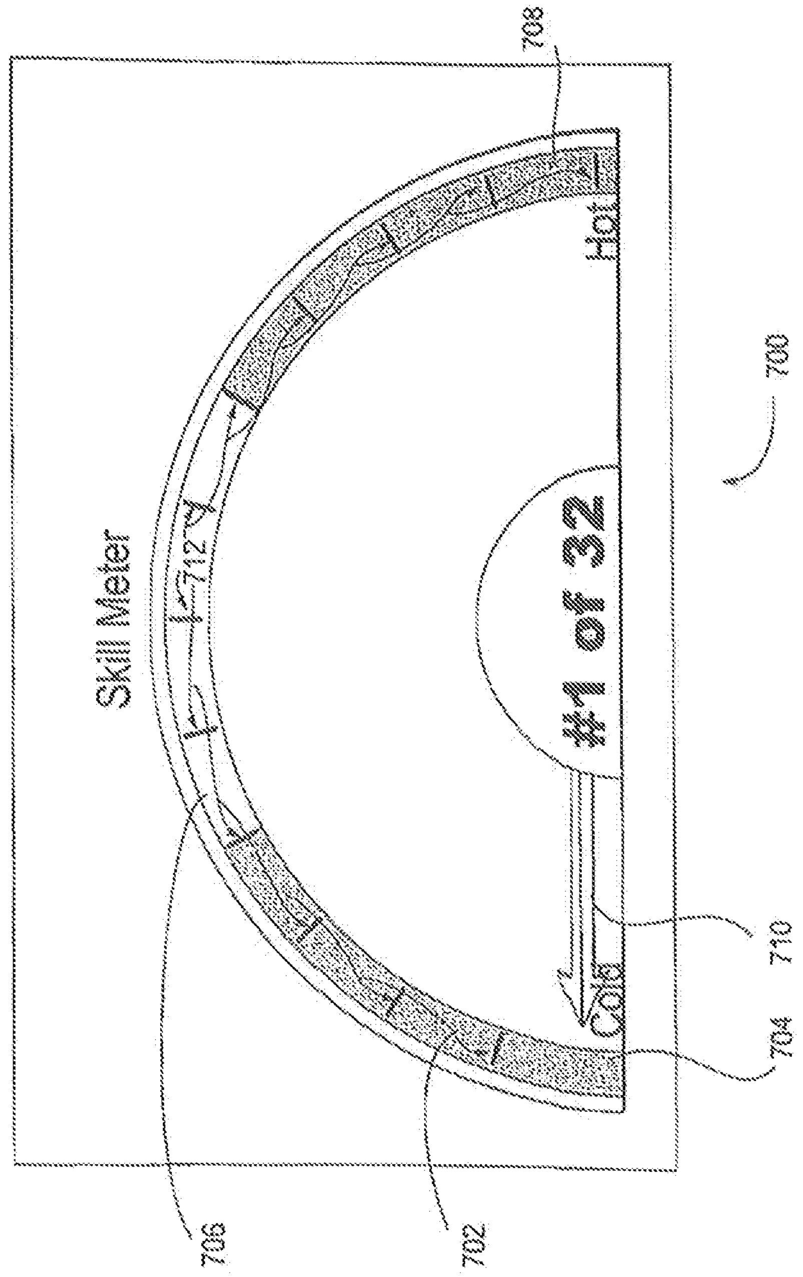
FIG. 7 illustrates a sample skill indicator, according to certain exemplary embodiments.

An exemplary skill indicator is described in greater detail herein with reference to FIG. 7. The skill meter may be a player session meter that clears after a player leaves the machine, by cashing out, a user inactivity period of time, removing his player card, etc. The skill meter or data associated with the skill meter for this and/or other players may in some embodiments stored in a player associated database account.

In some non-limiting exemplary embodiments a skill meter is provided where the pre running of the entire "period" of the games math can be done prior to the shipping of the product to the field. At each set of reel positions the optimal hold can be calculated. This data can be held in a table on the client gaming device or on a centralized server. Some exemplary games have approximately 60 million potential reel stops on the 5 reels. If a table on the client had each of these 60 million stops and the best hold combination associated with each then as each player spins the game engine can just run down this list to the actual stop the player got and pickup optimal hold for how the 5 reels came to rest. The client game engine wouldn't have to do any "simulated" spins to test for which is the best hold pattern. The time to calculate this table of optimal holds is prohibitive. As processing power increases the time to run all tests is shortened and this method becomes more practical.

In an alternative non-limiting exemplary embodiment, the product is designed to calculate the optimal hold as the players play and builds the database list on the individual client and/or server to improve over time. For example, if one had hundreds of clients providing data filling the table of 60 million potential stops for a specific game title it would be quickly possible to fully populate the table to 100% accuracy. If, in a further non-limiting exemplary embodiment the data is shared among all gaming clients then each machine can get the benefit of the others machines calculations. This method is very similar to grid-based computing.

A non-limiting example of an optimal hold database table for a specific is shown below:

GameID: 322, 5 reel slot (32 hold options)
Center Payline Optimal Hold

| Combo # | Reel 1 | Reel 2 | Reel 3 | Reel 4 | Reel 5 | (Optimal Hold) |
|---|---|---|---|---|---|---|
| #1 | Cherry | Blank | Blank | Blank | Blank | 1 |
| #2 | Cherry | Cherry | Blank | Blank | Blank | 3 |
| | | | . . . | | | |
| #60 Million | | | | | | X . . . |

In certain non-limiting exemplary embodiments, statistically speaking, one would have to run the entire period to get a close approximation of the optimal hold for a player. If for example one had the 5 reels come to rest after a player presses spin, and ran approximately 3000 simulated test spins behind the scenes one could get to over 99% accuracy of the skill meter. This would be, in one non-limiting exemplary embodiment, sufficient for all players. The longer the player takes between spins the more simulated spins can be run because the computing power of the gaming device can be focused on the skill meter optimal hold calculation math.

In an alternative non-limiting exemplary embodiment, a playfield is provided that has had the optimal hold strategy fully calculated. The gaming machine lets the player play games that have had the optimal hold fully calculated for each spin in the series of spins the player will receive. In-between games and during user inactivity such as late at night the gaming machine can run simulated games and build its own list of games it can deliver to the player when a player steps up. The Skill meter calculation engine would continue running games in the background for weeks and months until the entire game math period has been run (example all 60 Million reel stop positions or games.) This process can benefit from a client server relationship where results can be sent up to the server for distribution to other gaming clients. Each gaming client may be given a subset of the period to calculate and to report to the server. This would ensure no clients would run the same ones and would allow multiple client gaming devices to get more quickly to the final solution.

In certain non-limiting exemplary embodiments, the optimal hold calculation may also use forms of artificial intelligence rather than requiring a brute force calculation of the entire games math period. A human being can quickly throw out millions of possibilities without the player even being aware of what he is doing. One advantage is that artificial intelligence techniques can be used to get to an accurate optimal hold for time in the game where the player must make a skill decision. In another non-limiting exemplary embodiment, the game would use artificial intelligence at first, and then construct an optimal hold table over time using the brute force methods disclosed herein.

In some non-limiting exemplary embodiments, all of the above skill meter optimal hold calculations can be run for nearly any game that has a skill element. For example countless programming years have gone into calculating the optimal move on a chess game. For example, IBM's Deep Blue computer can now beat the best chess players in the world using a brute force approach. Video poker games would benefit greatly using this optimal hold calculation.

Other types of skill games that can use a skill meter include but are not limited to: Action games, strategy games, card games, tournament games, multi-player games, puzzle games, arcade style games, knowledge based games, quiz games, casino style games, group play poker games, etc. Any game where a player can make a secondary wager or bet on a game is a candidate for a skill meter.

A player would decide if his game is favorable and he should increase his wager for additional wins or as insurance against loss. The system can calculate whether the player was doing this wisely and tell him before, during, or after his decision to increase his wager. The player can also be rewarded for how well his skill decisions are being made. Even if he loses his game he may be given some reward for his skillful decisions.

A skill meter can be used on group play games as an aid for the player determining how well he is playing considering what his hand is against the other player's hands and what the current prize pot is. The skill meter could also take into account how much money or chips he has left to wager. The skill meter could show how the player is managing his money or play chips. Texas Hold Em Poker style games would be a perfect example of this interactive group play game where an individual skill meter can be used.

In certain non-limiting exemplary embodiments, multiple skill meters are provided within a single game or ones that span multiple games. There could be a different one for each type of skill decision the player must make throughout a game. For example: If a game had two decision points and one of the decisions has 15 options and the player must take one and a later one in the game that has 3 options. The player may have one skill meter for the 15 option choice and another skill meter for the 3 option choice. In an alternative non-limiting exemplary embodiment, the skill meters can be merged into a unified single meter that contains both data sets in one display or conversely 3 displays (each with their own and a combined display). Many permutations and alternative embodiments of a skill meter are envisioned.

In certain non-limiting exemplary embodiments, a skill meter is used in any style of skill game where a player is given a decision point amongst several options. The player must take in all the information he has learned up to this point and decide which path or option is the smartest. The skill meter can tell the player how close he is playing to perfect play for the game that is in front of him at this instant in time. Due to the random generator in nearly all skill predominant games, perfect play doesn't guarantee the best reward for this decision point or game, but rather the player has the optimal probability of best reward amongst all award options.

In certain non-limiting exemplary embodiments, a prize reward for a specific skill level may be given to the player for maintaining his skill meter at a specific level. This can be a fixed prize or progressive prize. Some non-limiting examples include cash, cash equivalent, a physical prize, prize points, or player club points. This can be either the primary form of reward for a player or a secondary. For example: a player may be given cash or prize points each time he performs an optimal hold for a given decision point in the game.

In certain non-limiting exemplary embodiments, a reel status indicator is provided which gives the player information on the game state. For example, at the end of a game, the reel status would indicate a game state of "game over" and the player would not be able to select any reels at such time. In a touch screen implementation of the display screen, if a player chooses to keep a reel set, the player can touch the reel indicator corresponding to the reel set that he wishes to keep. When the player touches the reel indicator, the state toggles between the Keep and the Re-spin game states.

The Keep All button such as that shown in FIG. 6, when pressed or selected will set all the reels to a Keep position. If a player wishes to re-spin one or more of the reel sets, then the player can touch the reel indicator corresponding to the selected reel set.

The spin button, as shown in FIG. 6, when pressed or selected, will deduct one or more game credits to start the game. The spin button can also be an extended play button, according to certain non-limiting exemplary embodiments. When the extended play button is pressed or selected, no game credits are deducted and those reels that are set on re-spin will commence spinning.

The Choose Prize button, when pressed or selected takes the player to an online prize center. The player then has the option of ordering a prize or pressing the Quit button. The Quit button when selected takes the player back to the main menu screen on the onscreen display. A sample main menu screen is described herein with reference to FIG. 14.

The information button as shown in FIG. 6, when selected takes the player to a help screen. For example, the help screen may include 1) the rules of the game, 2) a pay-table, 3) information on reel layout, 4) information on the skill meter, 4) help on game strategy, 5) information on ordering prizes, and 6) and a game demo. A player may alternately touch a specific symbol or reels or lines that form a winning payline to trigger the help screen to visualize.

Some versions of the game may require a user to take score or hold all to conclude the game and get any reward whatsoever. This can be done by holding each reel individually or by single hold all or take score button. This can be done with video screen buttons or cabinet buttons. This prevents a player from just pressing the spin button blindly and getting the reward as in chance based games. Some jurisdictions may require this to satisfy there "skill" game requirement.

The prompt display provides the player with important information regarding the game during the game play session. For example, when the reels are spinning, a message such as "please wait" or "reels are spinning" appear on the prompt display. Other messages include information on the number of extended plays that are made available to the player, instruction to the player to select reels to keep or re-spin, or inform that the game is completed. Dialog boxes may be used in lieu of the prompt bar area.

The prize line and reel display as shown in FIG. 6 is an exemplary spinning reel area. As used herein, a spinning reel may be displayed on a video display, may include actual, mechanical reels, or otherwise. The prize line and reel display shows 9 pay-lines or prize-lines, L1 to L9, and 5 reel sets. By selecting or touching any pay-line L1 to L9, the player can examine the line pattern of a pay-line across the reel sets. For example, the line pattern for pay-line L1, from left to right, connects the top most symbol of the left most reel, to middle symbol of the next adjacent reel to the third symbol on the middle reel to the middle symbol of the penultimate reel to the top most symbol of the right most reel. The player may also touch one of the symbols on a reel to display all play lines that pass through the touched symbol. In a non-limiting exemplary embodiment, if it is determined that the player has obtained some winning combinations after a spin of the reel sets, only the highest winning pay-line will be indicated on the display screen. In other words, the player is effectively wagering one set of credits for all the pay-lines or prize lines. This aids in the quick playing of the skill game. In a nine line video reel spinner game the player would have nine simultaneous winning combinations to analyze.

In addition all of these lines are interrelated to each other. If you re-spin one reel then all lines are affected. Hence there are too many calculations a player must mentally to calculate the best set of reels to hold. By limiting the payout to the highest prize line only, most of these reel interdependency calculations disappear for a player. A player still has visibility across the entire playfield because the highest "paying" line may not be the best to hold. (Example: 4 dice on the center line on reels 2, 3, 4, 5 ordered from left to right is currently not a paying combination in one version of the math, but if you hold them you have a higher probability of getting one more dice in column 1 and getting a 5 dice win versus a lower paying alternative hold strategy.)

For example, in FIG. 6, the reel sets shows L1 to be the highest winning pay-line for the combinations shown in FIG. 6. The onscreen display also shows a pay-table 14, according to certain non-limiting exemplary embodiments. If the player has one or more winning combinations at the end of a spin, then the highest winning amount is highlighted on pay-table 14, according to some non-limiting exemplary embodiments.

Another advantage of highest line paying is it allows many simultaneous high paying combinations to be shown to the player in the math design of the game to make the tease more powerful to the player, but only the highest pays. The player would "feel" the game is "hotter" and more likely to pay a sizable win since more of them are on screen at once.

Another advantage of paying the highest prizeline only is that at the end of the game the game doesn't have to cycle through multiple winning prizelines if there are any. Showing multiple winning prizelines lengthens the game, adds clutter, and player confusion. Because of the interdependencies of the symbols, paying the highest line only makes the determination of skill strategy much simpler. Paying the highest line only also allows fewer symbols on the reel strips to achieve the same total pays. A game designer may have more near winning combinations shown at one time by paying one line only. This makes a better "tease" for the player.

Paying on one-line only provides a greater anticipation and expectation of wins for play on subsequent plays or spins because of this tease effect. Further, for the winning combination, the symbols in the reels may animate or their locations highlighted. In alternate versions of the game a player may be allowed to increase his wager after each stop of the reels. He may be able to increase the number of lines he is wagering on, increase the amount of games credits for each line, make side bets, buy insurance against loss. All of these features may increase the players bonding with the game because he has some material control over the outcome.

According to certain non-limiting exemplary embodiments, the player can wager a desired number of credits for each pay-line or prize line. Thus, for each winning prize line, if the player wagered x credits for the prize line, then the player may receive y number of prize points where, y=x*number of prize points designated for the particular winning prize line. In effect each line becomes a game in to itself where each line has a wager and reward associated with it. A player may be given a choice of lines to wager on or the system may auto-select which specific lines for the player.

In alternate non-limiting exemplary embodiments a player may be allowed a choice of which symbols he wishes to re-spin versus the entire reel strip. In other non-limiting exemplary embodiments a player may be given a finite number of reel strips to re-spin or symbols to re-spin in a single game or over a series of games.

The game may include reflexive math to "self-tune" wins and losses for optimal player experience. For example: if a player is loosing too much he/she may be given one or more free games, a good starting playfield or deal. Other reflexive tuning may include: Wins may be forced for a player, extra entry into bonus rounds may be given, on screen tips may be turned on with optimal holds, extra prize points may be given, better reel strips, better pay tables, simpler games may be given, more high paying symbols given, more club points given, or more bonus system games given, more club points given, or more bonus system games given, etc. The reflexive game engine may alternately make the gaming experience less to the player's advantage if the player is winning too much.

In some non-limiting exemplary embodiments of the game only the highest line is paid to the player, but the other winning lines would contribute to a personal prize pool that will be paid out over time as the player makes more wagers so as not to go over jurisdictional payout limits for a single win or multiple wins over a period of play time. Alternately these could fund a progressive prize pool (player specific, machine specific, local or wide area) that can be awarded for a specific winning outcome on a game or other winning event.

A progressive sign may be bundled with the game cabinets showing the progressive prizes that can be won by the player. Progressive prizes may also be incremented as a percentage of base game wager.

Further, even though FIG. 6 shows a 5-reel, 9-liner reel display, the non-limiting exemplary embodiments are not restricted to a 5-reel, 9-liner reel display and may vary from implementation to implementation. Other non-limiting examples include 5-reel 3-liner, 5-reel 8-liner, 3-reel 3-liner, 5-reel 3-liner, and 5-reel 1-liner games.

The onscreen display of FIG. 6 also shows a turn tips on/off button 13 for turning the tip mode on or off, according to certain non-limiting exemplary embodiments. Onscreen tips are helpful for skill based games to help educate the player at his skill decision points. When the tip mode is on, helpful tips that include game instruction or game strategy can be displayed onscreen to aid the player in playing the game. In certain non-limiting exemplary embodiments, the displayed tips may be context sensitive. In other words, tip mode can be turned on automatically based on the occurrence of an event, and the player may be presented with a tip that is relevant to an action that the players has just performed or relevant to an action that he is performing. The tip mode can then be turned off automatically, after a pre-determined number of cycles of tips display, example.

By way of example, the player is presented with the tip to choose the prize button or to insert more money/currency when the player runs out of game credits, according to certain non-limiting exemplary embodiments. Optionally, the player may be presented with a tip showing the best hold option for a given combination of symbols on the reels. In some non-limiting exemplary embodiments a player may be given a few good alternative hold options. In some non-limiting exemplary embodiments the hint of the optimal hold may be periodically given to a user or for every spin. These hints may turn on if a player is playing poorly, or loosing too much. The may also turn off automatically when a player has reached a certain skill level and/or earnings level. This dynamic tuning may tailored for the individual player, or to the specific gaming machine, or to the entire gaming establishment, or across all gaming establishments included in a gaming network. A player may be given alternate pay tables (with different payback percentages), game speed, reel sets or symbols, or different minimum wagers, if the optimal hold hints or other hints are turned on for this game play.

In some non-limiting exemplary embodiments a player's skill level can be saved to his player account or smart card. This way a different game experience can be tuned for players after they access their account.

Ball on tips that are normally on the top of the screen can be optionally moved or dragged to other screen locations by the player. They may also be scalable by the player or hidden to aid the player in reading the large amount of game information that he may need to make the proper skill decisions. The tips are displayed based on a set of rules, according to certain non-limiting exemplary embodiments.

An onscreen tip, audio phrase, or the skill meter may show the player how optimal his hold is prior to or after the spin button is pressed (or "draw" button in a poker game) as an aid to let him know how "skillful he is."

Some non-limiting examples of rules for displaying such tips include: 1) the tip mode is automatically turned on when the player terminal has 0 credits followed by credits being added, 2) the tip mode automatically turns off after all the tips have been displayed a pre-determined number of times, 3) touching or selecting the tips Off button disables the tip mode, 4) touching or selecting the tips On button will re-start the sequence of tips display, and 5) when the tip mode is enabled, the game will display a tip based on timing rules of tips. The timing rules or events corresponding to each tip are shown in TABLE 1, herein. Some non-limiting examples of tips that can be displayed are as follows:

1) Touch the colored boxes to see the Prize-line (pay-line) patterns
2) Only the highest paying Prize-line (pay-line) is awarded
3) Winning combinations build from left to right only
4) Touch Skill Meter for more information
5) This number shows how well you selected which reels to KEEP. Try for #1
6) The arrow shows how well you have played over the last several games
7) Touch any reel to KEEP that reel (it will not spin next time). Touch it again to have it RE-SPIN instead
8) Extended Plays allow you to build a better hand. You can KEEP or RE-SPIN any or all of the reels each time
9) Touch here to change how many credits you will use each game The timing rules for the above examples of tips are shown in Table 1. The non-limiting exemplary embodiments are not limited to the type or number of tips as described above.

TABLE 1

| Sequence of tips to be shown | Event | Location | Text |
|---|---|---|---|
| 7 | After First Spin | Over bottom half of bottom row of symbols in all reels | Touch any reel to KEEP that reel (it will not spin next time). Touch it again to have it RE-SPIN instead. |
| 5 | After a spin when the player can make a selection. | Upper left corner | This number shows how well you selected which reels to KEEP. Try for a #1!! |
| 8 | After First Spin | Over Keep All button | Extended Plays allow you to build a better hand. You can KEEP or RE-SPIN any or all of the reels each time. |
| 9 | Between Spins | Left of 25 cent | Touch here to change how many credits you will use each game. |
| 3 | Between Spins | Upper left corner | Winning combinations build from left to right only. |
| 6 | After Game End and arrow moved (when arrow animation starts, for example) | Upper left corner | The arrow shows how well you have played over the last several games. |
| 2 | Between Spins | Upper left corner | Only the highest paying Prize-line is awarded. |
| 4 | Between Spins | Upper left corner | Touch Skill Meter for more information. |
| 1 | Between Spins | Upper left corner | Touch the colored boxes to see the Prize-line patterns. |

The onscreen display of FIG. 6 also shows a bonus game indicator 12. The bonus game indicator 12 comprises a jigsaw of stamps that spells a pre-determined word, such as “car wash”. According to one non-limiting example, a player wins a stamp for each winning game that includes 4 or 5 symbols, such as 4 red 7’s or 5 cherries. When the player accumulates a pre-determined number of stamps, the player advances to a timed bonus round of game play, according to certain non-limiting exemplary embodiments. In some non-limiting exemplary embodiments, the payer may receive bonus round stamps through optimal holding. The car wash is further illustrated in FIGS. 38A and 38B.

During a timed bonus round, the player is allowed to play as many games (hands) and/or as many spins in each game as the player wishes within an allotted amount of time, according to certain non-limiting exemplary embodiments. The player is provided with a richer reel set (higher payback) during the timed bonus round, according to certain non-limiting exemplary embodiments. The timed bonus round is also referred to herein as a Car Wash mode. The timed bonus round may be playable on other display devices housed in the electronic game machine or remote from the machine. The timed bonus round and timer are further illustrated in FIGS. 38C and 38D.

For example, there are 2 modes of game play, according to certain non-limiting exemplary embodiments. The 2 modes are 1) normal mode, and 2) timed bonus round mode (or car wash mode).

During the normal mode of play, the player places a single wager by using one or more game credits and spins the reels by pressing the spin button on the player terminal. Even though the player places a single wager, the game is configured to allow the player to play all the pay-lines (prize-lines). By playing all pay-lines, it is possible that more than one pay-line has a winning a combination when the spinning reels come to a stop. However, the game is configured to only pay the player the highest winning pay-line, according to certain non-limiting exemplary embodiments.

During the normal mode of play, after the reels come to a stop, the player has the option to KEEP or Re-SPIN any, all or none of the reels. The player touches the desired reel to KEEP the reel. Touching the desired reel again changes the reel state to RE-SPIN. By pressing the KEEP ALL button, all the reels are set to KEEP. When the player has completed setting the state of the reels to his liking, the player presses the SPIN button, and the reels that are set to RE-Spin will spin again. Alternately all the reels may default to hold and the player must force a re-spin on the reels of his choice.

According to certain non-limiting exemplary embodiments, the player is provided with at least one Extended Play for each game. The game ends when the player runs out of extended plays or when the player chooses to KEEP ALL the reels and presses Extended Play button, according to certain non-limiting exemplary embodiments. One or more of the reels in the reel set may contain one or more extended play symbols. If the extended play symbol appears on any reel in any position (ie. A scatter symbol) when the reels come to a stopping position, the player’s Extended Play is incremented by one for each extended play symbol appearing on the reels. The player’s Extended Play amount is shown on the SPIN button, according to certain non-limiting exemplary embodiments. After the player’s Extended Play count is incremented, the extended play symbol on the reel turns gray or disappears, or is marked as paid, to indicate that it has been used already. If the player sets the reel with the gray extended play symbol to KEEP, and then spins the rest of the reels, the player’s Extended Play count is not incremented by the extended play symbol on the kept reel.

One purpose of the Extended Play feature is to lengthen the game to simulate the play time that is afforded to players in gaming venues such as Las Vegas, for example. In jurisdictions such as Las Vegas, players are allowed to replay their winnings, thereby lengthening the play time. Thus, in a jurisdiction that prohibits a player from replaying his winnings, the Extended Play feature allows the player more play time by providing more spins for his wager. In some non-limiting exemplary embodiments winning combinations from right to left could pay as well versus just left to right as is normally done.

A player may alternately be given on or more nudges where he can move a specific reel up or down on or two steps. The player may be given the choice of the direction or may limited to the one chosen by the game math.

If the player wins prize points and the winning combination is made up of the pre-determined number and types of symbols associated with a bonus game round, the player is allowed to proceed to the timed bonus game mode. Non-limiting examples of the pre-determined number and types of symbols to qualify for a timed bonus game mode includes, 5 cherries, 4 triple sevens, 5 triple bars etc. The number and types of symbols to qualify for a timed bonus game mode can be configured in variety of ways and may vary from implementation to implementation. Scatter symbols could also be used as a means to earn stamps or direct entry into the bonus round. Alternatively the player may have to collect a specific number of special unique symbols on the reels to gain entry into the bonus round.

In the timed bonus round mode or Car Wash mode, the player is provided with a richer reel set that can offer a higher payback than the normal mode play. Sometimes the same reel set is used, and the player is given more spins than normal or unlimited spins. According to certain non-limiting exemplary embodiments, the timed bonus round mode is associated with a new set of rules of play. Some non-limiting examples of rules of play are:

1. The player is in the Car Wash mode for a fixed amount of time (indicated by a timer in the upper right corner of onscreen display on player terminal).
2. The player plays with a reel set that is richer than that of the normal play mode. The quantity of each symbol on each reel is shown in the information pages/screens that are accessible by the player when the player presses the INFO button on the player terminal. Alternatively the complete reel strips can be shown to the player on the help screen or on the main game screen.
3. The player has unlimited RE-SPINS for each game initiated by the player. The game continues until the player chooses to KEEP all 5 reels (in a 5 reel player terminal) and presses the RE-SPIN button again. This take score capability will conclude a single bonus game in timed bonus round and the player will be given a prize reward for a winning outcome of the single bonus game in the timed bonus round. In alternate game embodiments such as video poker this same mechanic is done.
4. The player may pay for and play as many games as he can during the fixed period of the Car Wash mode. The player can decide whether to pursue bigger individual wins by re-spinning more on a single game in a bonus round (this takes longer so less games can be played in the bonus round) or try for more wins that may be smaller in payback (quicker and the player can play more games during the fixed period of the Car Wash mode). The player pays 1 credit for each game played, for example. The maximum win per game played in the Car Wash mode may be configured to avoid contravention of applicable laws, thus requiring the next credit to be spent to spin again. Any game payouts in bonus round and/or normal game mode over the legal limits for a paid single game can be escrowed for the player and be given out over a series of future games either just by playing those future games, by making it easier to win these future games, or giving games with more lucrative winning combinations. These escrowed amounts can be stored on the gaming machine or in any player associated storage device or account. The paying out of these escrowed amounts on future games is done such that the winnings from those future games plus the portion of the escrowed payout is at or below the legal limit for that newly played game. As time runs out in the bonus round the player usually changes his re-spin strategy for optimal credit utilization and prize reward. He may not spend as much time trying to improve one game to the maximum payout possible, but may rather switch to trying to do many paid for games with less spins or focus on any single game. This tug of war in a players mind is what makes this time based bonus round so compelling.
5. Four and five symbol winning combinations do not progress the player toward an additional Car Wash Mode.

The above rules are merely examples and may vary from implementation to implementation. Depending on jurisdictional requirements, Bonus rounds may be free or require the use of game credits. When the fixed time period of the bonus round runs out, the player has 1 final RE-SPIN for the game that they may have already started, according to certain non-limiting exemplary embodiments. When that game is completed the player will then once again play in the normal mode. Alternately a larger fixed number of spins than in normal game mode may be given versus unlimited spinning for a game during the bonus round or period. Extended Spin symbols may or may not be used in various implementations of the bonus round.

In some non-limiting embodiments the bonus mode may give the player a fixed number of bonus games in a bonus round in a fixed amount of time. A player may be given unlimited tries to improve his game or a specific number of tries like hold/draws or hold/re-spins. If the fixed number of bonus games are played prior to the time running out then the bonus round concludes. Either time or number of games played in bonus round can conclude the game. Extended time can be given randomly or by achieving some pre-determined goal in a game not-limited to: a special symbol, certain winning combination. In fixed number of spins games, extra spins can be given to the player randomly or by achieving some pre-determined goal in a game not limited to: a special symbol, certain winning combination.

According to certain non-limiting exemplary embodiments, different number of reels and/or lines may be given to the player in the bonus round.

According to certain non-limiting exemplary embodiments, either in addition to or instead of the timed bonus round, the player may be provided with a single bonus game or a fixed number of bonus games that can be paid for (ie. Unlimited re-spins or larger than normal game mode) (example 10 spins per game). In the bonus game, the player can keep or re-spin one or more of the reels for as many number of times as desired within a predetermined period of time.

Alternatively a person may be able to purchase the number of spins he gets in the bonus round or normal game mode. Normally a player would get two spins for a normal game and if he spends another quarter he gets 3 hold/re-spins for example.

FIG. 7, as described above, illustrates a sample skill indicator, according to certain non-limiting exemplary embodiments. The non-limiting exemplary embodiments are not restricted to analog representations of a skill indicator. Other non-limiting displays of skill include digital forms, such as a display for indicating a number value, 1 to 100 for example, where 1 is the worst and 100 is the best. Another type of skill indicator may be a qualitative type of indicator. For example, a thermometer-like indicator may be used to show expert skill, mid-level skill or novice skill as indicated by the "mercury level" in thermometer-like indicator. Mechanical skill meters or indicators can be used in other non-limiting exemplary embodiments. A skill meter or luck meter may be shown in a stock ticker format over a recent series of games. This can be shown on the player tracking display or on the game screen itself or any other screen viewable by the player.

Yet another skill indicator may take the form of qualitative named rankings whereby a player might be ranked as "Expert", "Journeyman", "Novice", etc. The skill indicator can be displayed as part of the base game display or as a display that is separate from the base game, according to certain non-limiting exemplary embodiments. For example, there may be a player tracking module display that can display various aspects of the player's performance to the player. The secondary display device may calculate the skill meter and chance meter if it is provide enough data by messaging this data between the base game cpu and the player tracking display processor (commonly known as the Bally iVIEW). Alternatively the meter data may just be shown after calculated by the base game or a linked server. For example, the player tracking module can display the skill meter, a chance meter and the player's "frequent player" points or player loyalty points.

In some non-limiting exemplary embodiments, player loyalty points are promotional bonus points that are awarded to the player based on a percentage (accrual rate) of the base game handle that is configurable by the game operator or game venue operator. Further, a player can achieve different membership levels based on how much money the player spends at a particular game venue (gaming site). Examples of different membership levels include Platinum, Gold, Premiere, etc. Different membership levels entitle the player to different incentives. One non-limiting example of an incentive is that the player may be entitled to a higher than normal accrual rate for accruing loyalty points. A player may be awarded central time based progressives ("Bally Power Progressives"), Bonus System Games as well as incentives to keep playing the primary base game.

In FIG. 7, skill indicator 700 is in the form of an analog skill meter. Skill indicator 700 is either a video display or mechanical display comprising a half circle 702, with three color ranges 704, 706 and 708 and an arrow like pointer 710. Half circle 702 includes tick marks 712 that represent for example, 0, 10, 20, 30 and 100%.

In the preferred non-limiting exemplary embodiment the player is ranked for each spin. For example in this 5 reel game, there are $2^5$ or 32 possible hold combinations every time the player has a choice to make. How well the player chooses which of the reels to hold determines the player's rank for a specific spin. For example, Rank 1 is the best rank and rank 32 is the worst.

A prize points array (for example 32 elements) is a table in memory that is used to sum up the values of the random games that are 'played' internally. Table 2 and Table 3 are examples of prize point arrays. Games that use other currencies than prize points may have similar tables that tabulate these other currencies. In some non-limiting exemplary embodiments, a skill meter is provided in a game that does not provide points.

The following is an outline of an exemplary procedure for determining a player's rank for a given reel game with one re-spin and prize points awarded as the currency: At the beginning of each game, the prize points array is re-set to all 0's. The player makes the first spin of a game (this creates the original set of reels of the game determined from random number generator).

For example: The result of the first spin is the following table (X denotes any symbol)

| Reel #1 | Reel #2 | Reel #3 | Reel #4 | Reel #5 |
|---|---|---|---|---|
| X | X | X | X | X |
| Cherry | Cherry | Cherry | X | X |
| X | X | X | X | X |
| Re-spin | Re-spin | Re-spin | Re-spin | Re-spin |

1) The player selects the reels that he would like to keep and presses the spin button. The game engine uses a Random number generator to pick a new random location for each reel allowed to re-spin by the player. The game spins the reels chosen to spin by the player. The reels are programmed to stop at the random locations chosen by the game engine.

For example the player holds Reel #1, #2 and #3 in an attempt to get 5 cherries on the center payline.

| Reel #1 | Reel #2 | Reel #3 | Reel #4 | Reel #5 |
|---|---|---|---|---|
| X | X | X | X | X |
| Cherry | Cherry | Cherry | X | X |
| X | X | X | X | X |
| HOLD | HOLD | HOLD | Re-spin | Re-spin |

The hold combination the player chose in this example is #8 as outlined in the table below:

| All Possible Hold combinations for a 5 reel game are: (H = Hold, R = Re-spin) | |
|---|---|
| #1 | RRRRR |
| #2 | HRRRR |
| #3 | RHRRR |
| #4 | HHRRR |
| #5 | RRHRR |
| #6 | HRHRR |
| #7 | RHHRR |
| #8 | HHHRR (players hold choice) |
| #9 | RRRHR |
| #10 | HRRHR |
| #11 | RHRHR |
| #12 | HHRHR |
| #13 | RRHHR |
| #14 | HRHHR |
| #15 | RHHHR |
| #16 | HHHHR |
| #17 | RRRRH |
| #18 | HRRRH |
| #19 | RHRRH |
| #20 | HHRRH |
| #21 | RRHRH |
| #22 | HRHRH |
| #23 | RHHRH |
| #24 | HHHRH |
| #25 | RRRHH |
| #26 | HRRHH |
| #27 | RHRHH |
| #28 | HHRHH |
| #29 | RRHHH |
| #30 | HRHHH |
| #31 | RHHHH |
| #32 | HHHHH |

2) The optimal hold calculation engine behind the scenes switches to a new set of 5 reels (test reels) while visual reels are spinning. Test reels are not displayed to the player and are for internal use only. These new set of test reels are chosen by new random numbers picked for each reel. This will emulate a random spin for the reels that the game does each time a player presses the spin button.

3) The game's award routine determines the resulting prize points award that would have been awarded for each of the possible 32 different hold combinations with the original reels and the test reels and adds prize point values, if any, to their respective rows in the prize points array. Additional prize points may also be awarded based on the winning combination and one or more modifiers.

4) The game of this example repeats the above test process a pre-determined minimum number of times using the original reels in combination with the different test reels. Each time, the prize points are added to the array to help determine a skill rating for the player for a given game. The more tests that are run the more accurate the skill meter becomes. Hundreds or thousands of tests can be run prior to the game and during the actual spins that are shown to the player, 5) After all of the tests are complete, the prize points array looks like the following:

| Array # | Total Prize Points accumulated over test spins |
|---|---|
| PrizePointArray[1] = | 6,000,888 |
| PrizePointArray[2] = | 4,788,888 |
| PrizePointArray[3] = | 2,381,333 |
| PrizePointArray[4] = | 2,881,321 |
| PrizePointArray[5] = | 3,000,119 |
| PrizePointArray[6] = | 3,111,888 |
| PrizePointArray[7] = | 6,111,981 |
| PrizePointArray[8] = | 8,003,186 |
| PrizePointArray[9] = | 2,288,998 |
| PrizePointArray[10] = | 3,000 |
| PrizePointArray[11] = | 800,003 |
| PrizePointArray[12] = | 1,300,132 |
| PrizePointArray[13] = | 856,103 |
| PrizePointArray[14] = | 900,382 |
| PrizePointArray[15] = | 7,958,988 |
| PrizePointArray[16] = | 301 |
| PrizePointArray[17] = | 4,964,321 |
| PrizePointArray[18] = | 9,818 |
| PrizePointArray[19] = | 215,083 |
| PrizePointArray[20] = | 1,201,888 |
| PrizePointArray[21] = | 8,152,186 |
| PrizePointArray[22] = | 6,898 |
| PrizePointArray[23] = | 89,000 |
| PrizePointArray[24] = | 78,198 |
| PrizePointArray[25] = | 15,323 |
| PrizePointArray[26] = | 1,982,321 |
| PrizePointArray[27] = | 788,982 |
| PrizePointArray[28] = | 432,321 |
| PrizePointArray[29] = | 552,553 |
| PrizePointArray[30] = | 5,653,132 |
| PrizePointArray[31] = | 908,876 |
| PrizePointArray[32] = | 76,332 |

6) Next the optimal hold calculation engine sorts the array from highest to lowest by the amount of prize points in each position of the prize points array. This sorted list is now a ranking of which hold will statistically pay the most Prize Points. Note: array item #1 can be the highest or lowest out of the 32 items.

The RankedPrizePoint array list would look like the following from highest to lowest based upon # of prize points in each array position:

*RankedPrizePointArray* [1] = 21 (this is the optimal hold choice)

*RankedPrizePointArray* [2] = 8 (this is the combination the player chose)

*RankedPrizePointArray* [3] = 7

*RankedPrizePointArray* [4] = 1

*RankedPrizePointArray* [5] = 30

-continued

*RankedPrizePointArray* [6] = 17

*RankedPrizePointArray* [7] = 2

*RankedPrizePointArray* [8] = 6

*RankedPrizePointArray* [9] = 5

*RankedPrizePointArray* [10] = 4

...

*RankedPrizePointArray* [32] = 16 (this is the worst hold)

The #21 hold combination is the highest paying in the list above with 8,152,186 Prize Points being awarded throughout all of the test spins. The combination the player had chosen (#2 in our example above) is then found in the ranked list. In the ranked list above it is the 2nd element down from the top. Hence for this last skill decision the player made the 2nd best decision out of 32 possibilities.

7) The player's skill rank for this last spin is added to a Historical list of ranks. The historical list comprises a predetermined number of rankings. When a new ranking needs to be added to an already full list, the oldest rank on the list is removed. The values in the list are averaged to determine a running average rank for the player. In the preferred non-limiting exemplary embodiment a rank is done for each spin of the game except for the first spin because there was no skill choice made by the player to initiate the first spin.

8) The Running average rank has the following formula applied to it to determine the display percentage. This formula makes a rank of 1 (the best) be equal to 100% and a rank of 32 mm 3.125%.

((33−(running average))/32)*100=value between 0 and 100. This value is a percentage used for mapping to the visual display. By using such a formula the hypothetical player would have a running average of ((33−9)/32)*100=75% of full scale on the running average skill meter display. The display percentage may be shown as a linearly or non-linearly mapped indicator.

The modifiers, referred to in Step 5, take into account advance game play tactics:

1) In step 5 in the above procedure for determining a player's rank, when the game determines the amount of Prize Points that a given combination would earn, and if the combination also earns a Car Wash Stamp, a small bonus number of Prize Points is added to the total Prize Points for such a combination. The bonus helps take into account a player that realizes the true value of the Car Wash round and who is actively playing to achieve the Car Wash round. The Prize Points with bonus are then added to the Prize Points Array. In some non-limiting exemplary embodiments the skill meter calculation may have correction factors taken into account. A player's instantaneous goal for this decision point may change during game play as he progresses through different sub or master goals in the game.

A goal of the skill meter is to provide the player with an instantaneous skill level (digital number in our skill meter display and a time averaged display. The goal of the game for the player is to get a top score always for each skill decision point, and to maintain a high time averaged skill meter display. One may not get a huge payout, but you will get the best payout possible for what you were dealt by the games random # generator. By combining the instantaneous and time averaged skill meter into one display with multiple components the player can get all of the information he needs to encourage him to keep playing. This gives the game more "legs", longevity, or earning potential over a longer period of time than a game without a skill meter. There is a huge spectator component to the skill meter. Others watching a skilled player are amazed at how the skill meter is maxed out. It encourages players to want to figure out how the game works. It bonds them to the game more than one without the skill meter.

2) The steps listed in the above procedure for determining a player's rank are based on the player having only 1 spin for making choices during the game. The player can have extended play spins added to his spin count and can end up with several spins. If the player is fortunate enough to get several extended play spins in a single game, the player is more likely to take bigger chances on the first spins because the player knows that he has more spins left for a more conservative choice later. As the player approaches his last spin, the player is likely to 'play tighter'. To include the player's mentality as a weight in the ranking system, the rank is adjusted for a given spin based on how many spins the player has remaining. For a single game, a table is maintained for recording the rank for each spin (as determined in steps 5, 6, and 7 above) and the number of remaining spins at that point (see tables below). After the player runs out of spins or the player keeps all the reels and the game ends, the ranks are multiplied by their weights and averaged by the total of the weights. In the example below it would be:

Example Weight system

| Remaining Spins | Weight |
|---|---|
| 1 | 4 |
| 2 | 2 |
| 3 | 1 |
| 4+ | 0.5 |

Example of Spins is a single game

| Rank | Remaining Spins | Weight | Weighted Value for This Spin |
|---|---|---|---|
| 18 | 4 | 0.5 | 18 * 0.5 = 9 |
| 12 | 3 | 1 | 12 * 1 = 12 |
| 5 | 2 | 2 | 5 * 2 = 10 |
| 1 | 1 | 4 | 1 * 4 = 4 |
| Total | | 7.5 | 35 |

In the example, the total weighted value is 35. The Average Weighted Rank is 35/7.5=4.67. Only the Average Weighted Rank is added to the running total in Step 8 in the above procedure for determining a player's rank for a given game. If the player KEEPs all the reels with extended spins remaining that choice should be weighted as if there is one spin remaining.

In other non-limiting embodiments the skill rank can be determined in the following way. A random number generator is used to determine the stopping locations of the reels, a hold/re-spin option is provided for each reel for a player, a player selects a hold/re-spin combination for the reels.

A computer simulated game process runs in the background of the game application with the following steps:

a) generating random numbers to virtually spin non-held reels to a new location, b) calculating the prize reward outcome for the reels in their new location, c) adding the calculated prize reward to a prize reward counter for this hold/re-spin combination.

d) repeating steps a) through c) at least once for all hold/re-spin options, a ranked list is created from these prize reward counters for each hold/re-spin combination, the skill rank is at least in part determined by the position of the players hold/re-spin combination choice on the ranked list.

In other non-limiting embodiments the skill rank can be determined in the following way:

a random number generator is used to determine the actual stopping locations of the reels, a hold/re-spin option is provided for each reel for a player, a player selecting a hold/re-spin combination for the reels, an optimal hold calculation engine doing the following steps:

a) using a random generator used to create test reels, b) a game reward routine determining the prize reward that would be awarded for each of the possible different hold combinations with the original reels and the test reels, c) adding prize reward values to a prize reward list, d) repeating steps a) through c) a number of times, e) sorting the prize reward list by the amount of prize reward in each position in the list to create a ranked prize reward list.

f) finding the hold combination the player had chosen in the ranked list and retrieving its corresponding index value.

g) using the index value to at least partially determine the skill rank for the player.

In video draw poker games similar techniques of calculating a skill rank is done, but with simulated test cards being drawn versus test reels in a reel type game.

Figure 8:
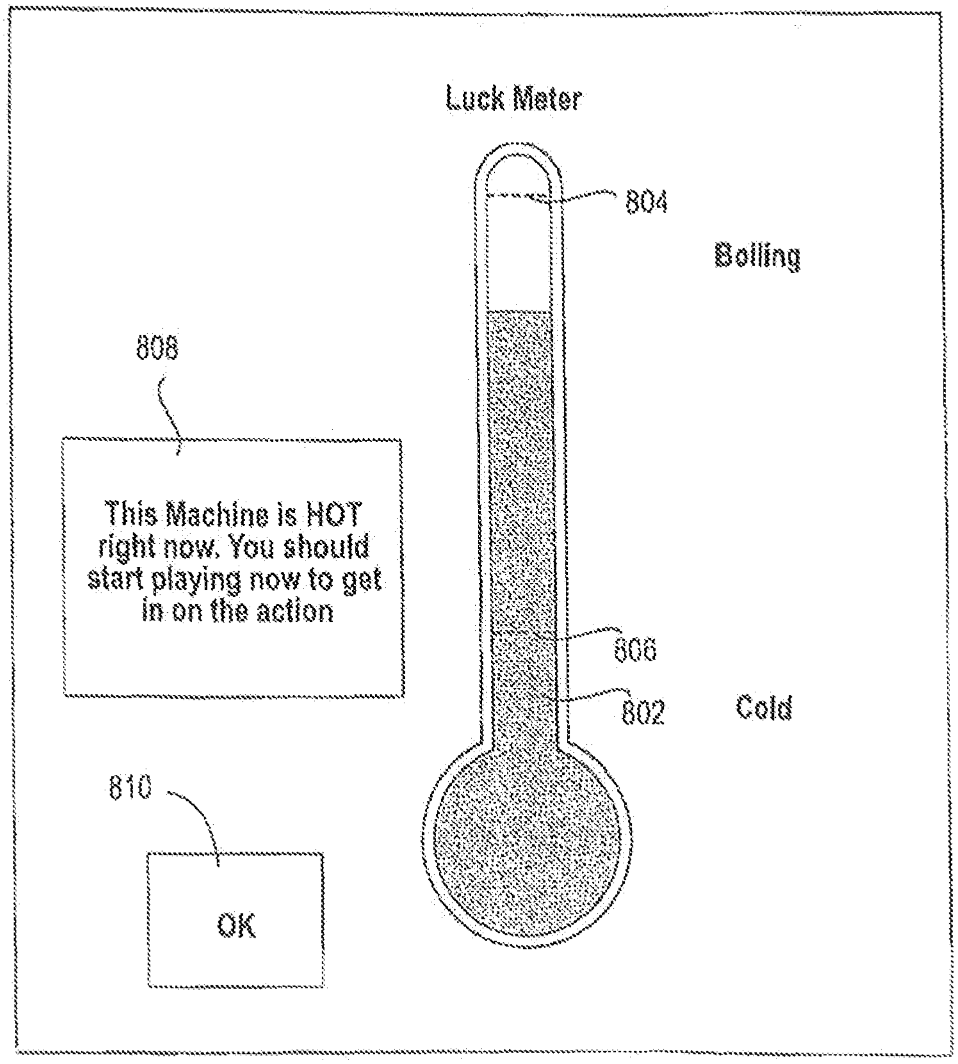
FIG. 8 illustrates a sample chance indicator, according to certain exemplary embodiments.

Certain non-limiting exemplary embodiments may include a chance or luck meter feature on the onscreen display of the player terminal. The chance meter gives an indication to the player as to how lucky the player has been for each game. FIG. 8 illustrates a sample chance indicator, according to certain non-limiting exemplary embodiments. FIG. 8 shows a thermometer-like indicator 802 to show the player's luck as indicated by the "mercury level" in thermometer-like indicator. For example, the "boiling" level 804 may be used to indicate a winning streak while the "cold' level 806 is used to indicate poor luck. FIG. 8 also shows a message display 808. The player can select button 810 to start playing a game or to continue an existing game.

The non-limiting exemplary embodiments are not restricted to analog representations of a chance indicator. Other non-limiting examples of chance meters include digital forms, such as a display for indicating a number value, 1 to 100 for example, where 1 is the worst luck and the 100 is the best luck, Mechanical luck meters may also be shown to the player.

One purpose of the luck meter is to "tease" the player by giving the player an indication of how "lucky" the player's game machine is running at a given time. For example, if the luck meter indicates that the player's game machines is running at a low luck level, the player might be inclined to believe that the game machine is imminently due for a "lucky" turn. If the luck meter on the game machine is high, the player may be induced to start playing at the machine. The luck meter may have a time averaged display tied to theoretical payout percentage of the games base math. It may also have an instantaneous luck display meter for the last spin for example how lucky you were. The Luck Meter may not include any actual payout but rather advancement towards a game goal. Is the player lucky at each step toward his micro and macro goals.

The luck meter can be based on a comparison of the player's performance, a recent group of players' performance, a recent series game plays independent of player and a theoretical average performance associated with the particular game. For example, the wagers and wins can be compared to the theoretical output associated with recent wagers. Any suitable mathematical formula can be used to calculate either the "luck" of the game machine or the luck of the player over the last game or last game event or over an average number of games. The calculation of the luck meter may thus vary from implementation to implementation. The luck meter may span gaming sessions as well where the players luck score can be saved in a player account or on a player card or other storage device.

Sample of Instantaneous Chance or Luck meter=Total Win*Weighting factor/(Total Wager*Theoretical Win % for that wager).

Example for Game #1 $1 wager on a 95% machine and win is $2

2*(10,000)/($1*0.95)=21,052 for game #1

Example for Game #2 $5 wager (max bet) on a 96% paytable and win is 0.=$0*(10,000)5*0.96)=0 (Note: max bet often gives a higher payout %)

So average of game 1 and game 2 is: (21,052+0)/2=10,526 average luck meter. Other formulas can be used in alternate non-limiting exemplary embodiments.

One of the purposes of the chance meter is to give the player some feedback on his current level of 'luckiness'. The meter may show the player a range of colors (red, yellow, green) to indicate his standing, or it may have some form of digital value (a range of 1-100 for example).

There are multiple means by which the player's luckiness can be measured, Depending on the type of game played, different methods of computing the luck score are used.

In certain non-limiting exemplary embodiments, the player's win/wager ratio is averaged over multiple hands. This is compared versus the expected win/wager ratio to determine the player's relationship to the expected outcome. (Actual/Expected) The result is mapped either directly or to a curve to make a value that can be displayed digitally or in an analog version, for instance on a graph or meter.

In certain non-limiting exemplary embodiments, games are provided where the player makes a decision, the chance meter can be taken to a different level, Not only can the luckiness of the random deal of cards be rated, in the case of poker, but also how lucky the player's draw is based on the cards they held.

To figure out the value for the draw aspect of the game the following would be performed in one non-limiting exemplary embodiment:

Based on the 5 original cards drawn it is known what the best play is for the player to make (which cards the player should hold/draw). This would be used if a skill meter were shown. It is also known what the average payback is for each combination of cards the player could choose to hold/draw, 1) When the player makes their selection of cards to hold/draw and receives his new cards, the actual resulting win is compared to the average win for this hold.
2) The resulting number it is mapped in the same manner as in the simple version.

Some non-limiting exemplary embodiments of the luck score display include, but are not limited to:

1) Analog meter
2) Digital value—This could be a number from 1 to 100 or any other range.
3) A Thermometer
4) A named ranking system where the player might he a:
   a. Four-leaf clover
   b. Rabbit's foot
   c. Horseshoe
   d. Shooting Star, etc.

Figure 9:
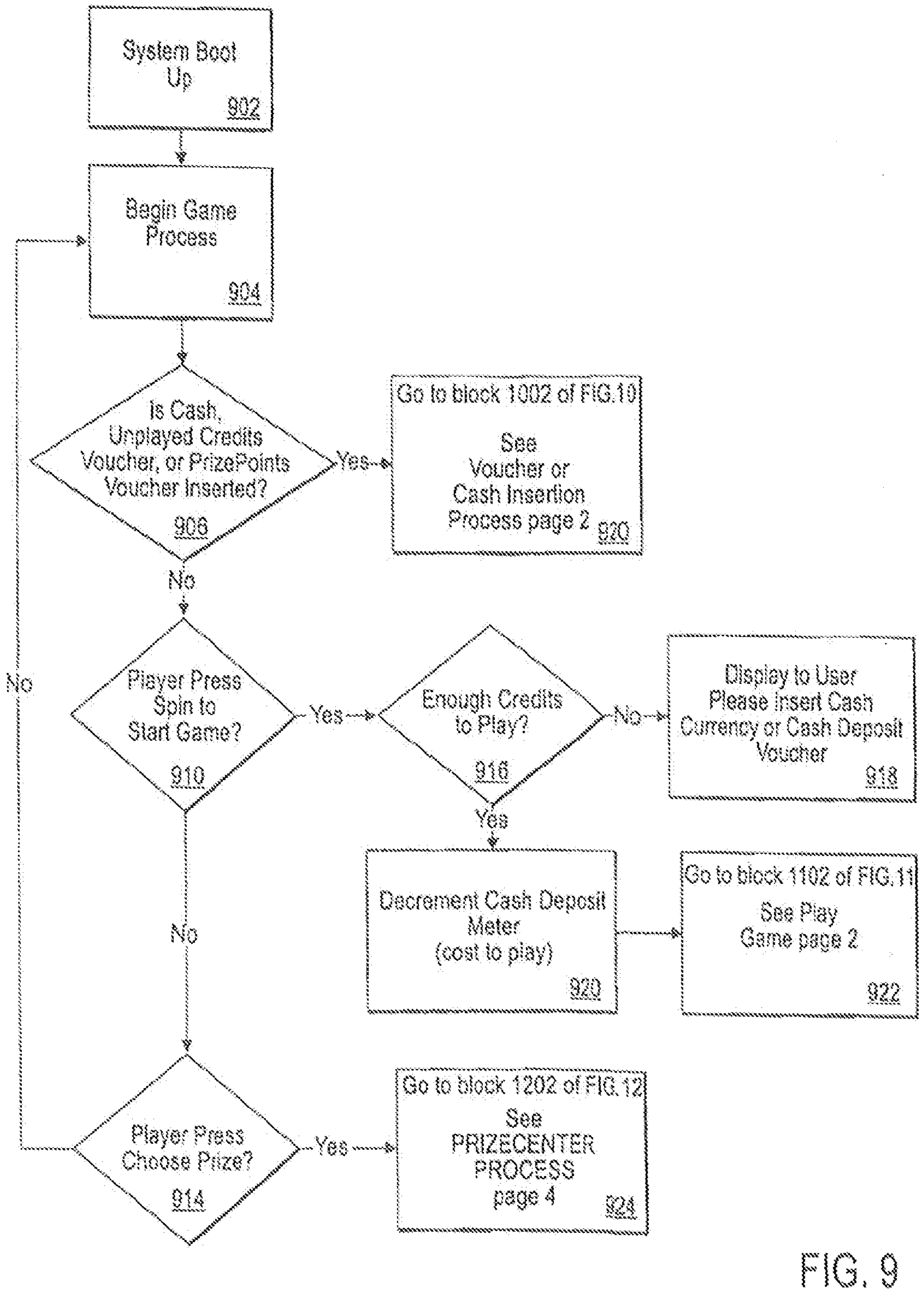
FIG. 9 is a flowchart that illustrates a game process, according to certain exemplary embodiments.

FIG. 9 is a flowchart that illustrates a game process, according to certain non-limiting exemplary embodiments. In FIG. 9, game process 900 includes a system boot up step 902, if necessary. The game process begins at block 902. At block 906, it is determined if any cash, unplayed game credits voucher, or prize points voucher is inserted in the player terminal. If it is determined that cash or a voucher is inserted, then at block 908, control is passed to block 1002 of FIG. 10. If it is determined that no cash or vouchers are inserted then at block 910, it is determined whether the player has pressed the Spin button to start the game. If the player has not pressed the Spin button, then at block 914, it is determined whether the player has selected the Choose Prize button. If it is determined that the player has not selected the choose prize button then control is returned to block 904. If it is determined that the player has selected the choose prize button then at block 924 control is passed to block 1202 of FIG. 12.

If it is determined at block 910 that the player has pressed the Spin button to start the game, then at block 916, it is determined whether there are enough credits at the player terminal to play the game. If is determined that there are not enough credits, then at block 918 a message is displayed to the player to insert more cash or vouchers and control is returned to block 904. If it is determined that there are enough credits, then at block 920 the game credits meter is decremented the appropriate amount to start the game. At block 922, control is passed to block 1102 of FIG. 11.

Figure 10:
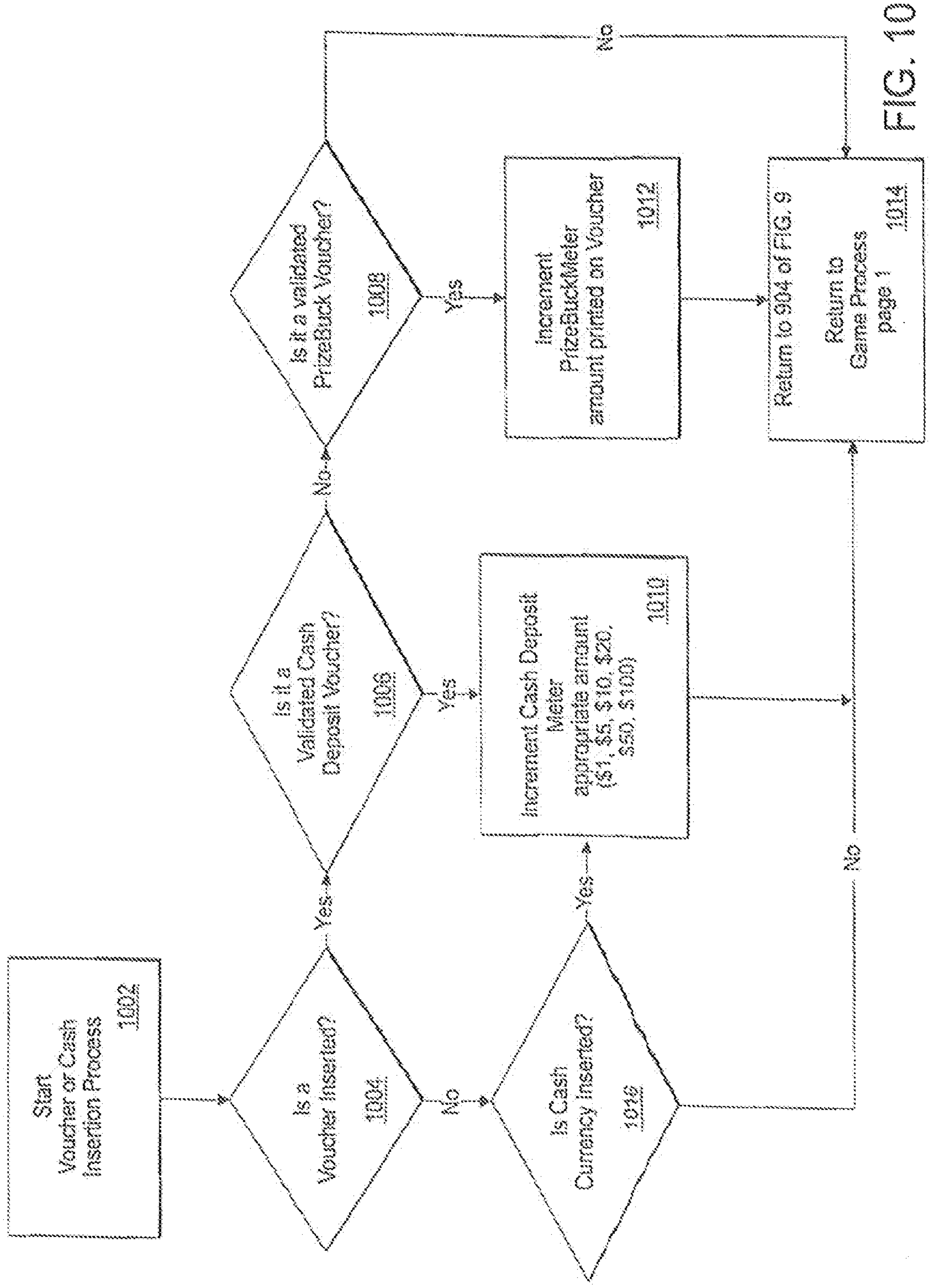
FIG. 10 is a flowchart that illustrates a voucher or cash insertion process, according to certain exemplary embodiments.

FIG. 10 is a flowchart that illustrates a voucher or cash insertion process, according to certain non-limiting exemplary embodiments. At block 1002, the voucher or cash insertion process begins. At block 1004, it is determined if a voucher is inserted in the player terminal. If it is determined that a voucher is not inserted, then at block 1016, it is determined if cash is inserted. If cash is inserted then at block 1010, the game credits meter is incremented by an appropriate amount. Next, at block 1014, control is returned to block 904 of FIG. 9. If at block 1016, it is determined that cash is not inserted then at block 1014, control is returned to block 904 of FIG. 9. Similar steps for putting game credits and prize credits on the game machine can occur from a smart card or from a player account after successful login by the player. Alternatively the game credits may be exclusively stored on a card or player associated server side account that is decremented at each time credits are used to start a game or within a game.

If it is determined at block 1004 that a voucher is inserted, then at block 1006 it is determined if the inserted voucher is a valid game credits voucher. If it is determined that the inserted voucher is a valid game credits voucher, then at block 1010, the game credits meter is incremented by an appropriate amount based on the value represented by the valid game credits voucher.

If it is determined at block 1006 that the inserted voucher is not a valid game credits voucher, then at block 1008, it is determined if the inserted voucher is a valid prize points voucher. If it is determined that the inserted voucher is a valid prize points voucher, then at block 1012, the prize points meter is incremented by appropriate amount based on the value represented by the valid prize points voucher. Next at block 1014, control is returned to block 904 of FIG. 9. If it is determined at block 1008 that the inserted voucher is a not a valid prize points voucher, then at block 1014, control is returned to block 904 of FIG. 9.

Figure 11:
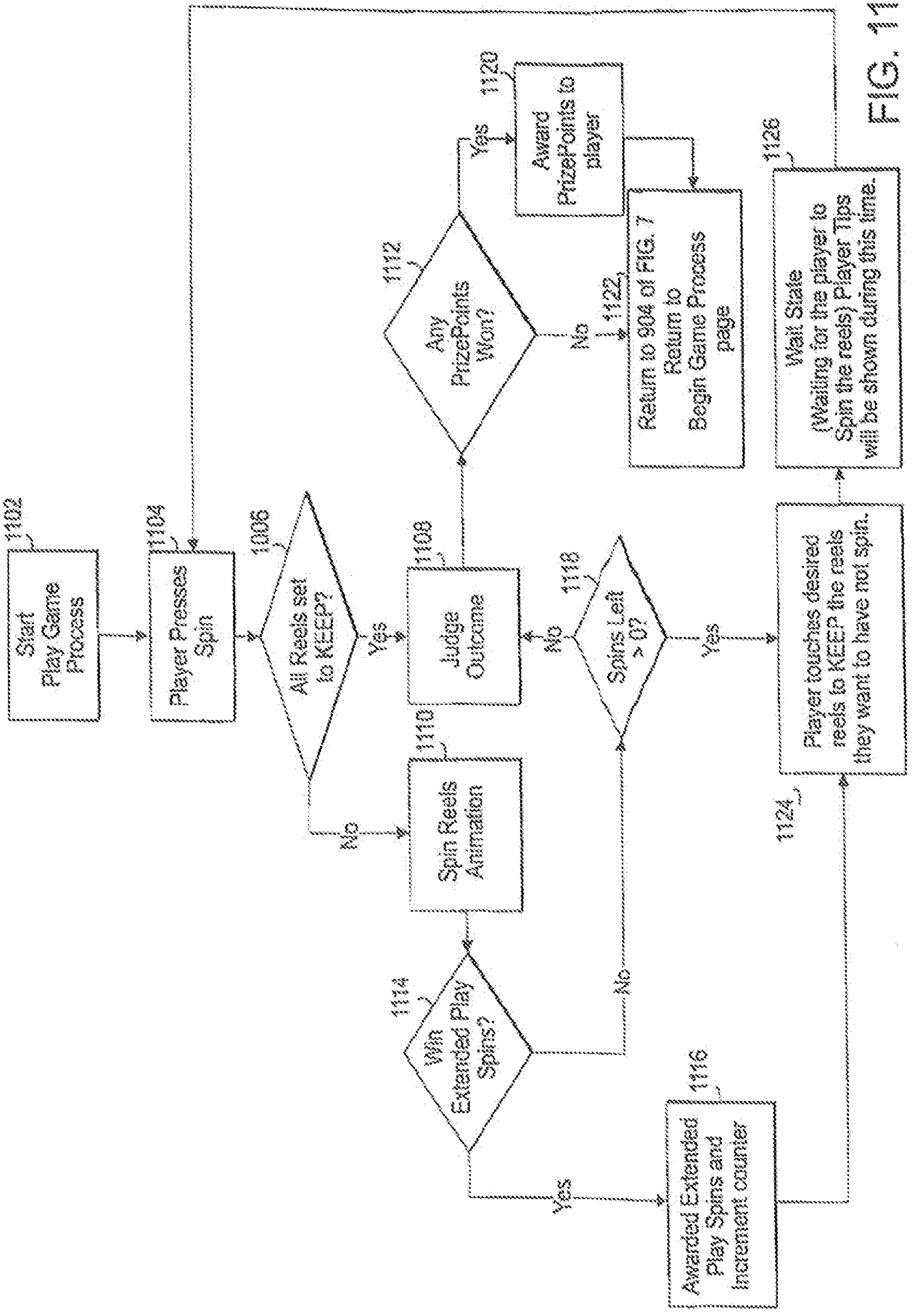
FIG. 11 is flowchart that illustrates a play-game process, according to certain exemplary embodiments.

FIG. 11 is flowchart that illustrates a play game process, according to certain non-limiting exemplary embodiments. At block 1102, the play game process begins. At block 1104, a player presses the spin button to begin playing the game. At block 1106, after the reels stop spinning, it is determined if all the reels are set to the Keep state. If it is determined that all the reels are set to the Keep state, then at block 1108, the outcome of the spin is judged.

Next, at block 1112, it is determined whether any prize points are won. Winning combinations may optionally award cash or credits and/or prize points depending on the games math or cabinet configuration. If it is determined that no prize points are won, then at block 1122, control is returned to block 904 of FIG. 9. On the other hand, if at block 1112, it is determined that prize points are won, then at block 1120, prize points are awarded to the player. Next, at block 1122, control is returned to block 904 of FIG. 9. In some non-limiting exemplary embodiments the Player Terminal has no game and is only used for prize redemption purposes.

Many jurisdictions prevent any single wins over X dollars or Y times the amount of dollars wagered. Often the size of the wager is limited as well. In certain non-limiting exemplary embodiments, if any single win or combination of wins is over the jurisdictional payout limit then the maximum allowed by law will be given to the player and the remaining over pay amount may be thrown out at the player expense, accrued to a personal progressive, accrued to a site wide progressive prize pool, given back to the player become "cashable" over other games that are paid for and that do not go over the jurisdictional limit, accrue to the reflexive game engine that then retunes the game to ensure non paid wins are given out over time or a number of games with better games, better game math, or better pay tables, higher payout percentage games, more bonus rounds, free games, extra bonus symbols, more winning combinations for future games, more spins for a single game, longer bonus rounds, etc. These over pay techniques ensure that payout limitation laws are complied with while still letting the player know that he is going to get his receive these over pay amounts if the player keeps playing long enough with new wagers. Onscreen indication of the overpay amount that has yet to be paid to the player may be shown to the player or hidden from the players view. Normally once the over pay has been given back to the player or players then each associated EGM will reset to its normal game state.

If at block 1106, it is determined that all the reels are not set to the Keep state, then at block 1110, the player spins the reels by pressing the Spin button. At block 1114, when the reels stop spinning, it is determined whether any extended play spins are won. If at block 1114, it is determined that no extended play spins are won, then at block 1118, it is determined whether the player has any spins left. If it is determined at block 1118 that there are no spins left then control is passed back to block 1108. Bonus extended spins may be randomly given to a player by a central system or client side software engine and not tied to the game math or reel design.

If it is determined at block 1118 that there are spins left, then at block 1124, the player touches those reels that he would like to set in the Keep state. Next at block 1126, the game enters a wait state, waiting for the player to re-spin the reels. During the wait state, player tips can be shown to the player on the onscreen display. Next control is returned to block 1104.

If at block 1114, it is determined that one or more extended play spins are won, then at block 1116, in the preferred non-limiting exemplary embodiment the symbol flies to the spins left display indicator to help convey they are going to be incremented. The spin counter is incremented based on the number of extended play spins that are won. Next control is passed to block 1124.

Figure 12:
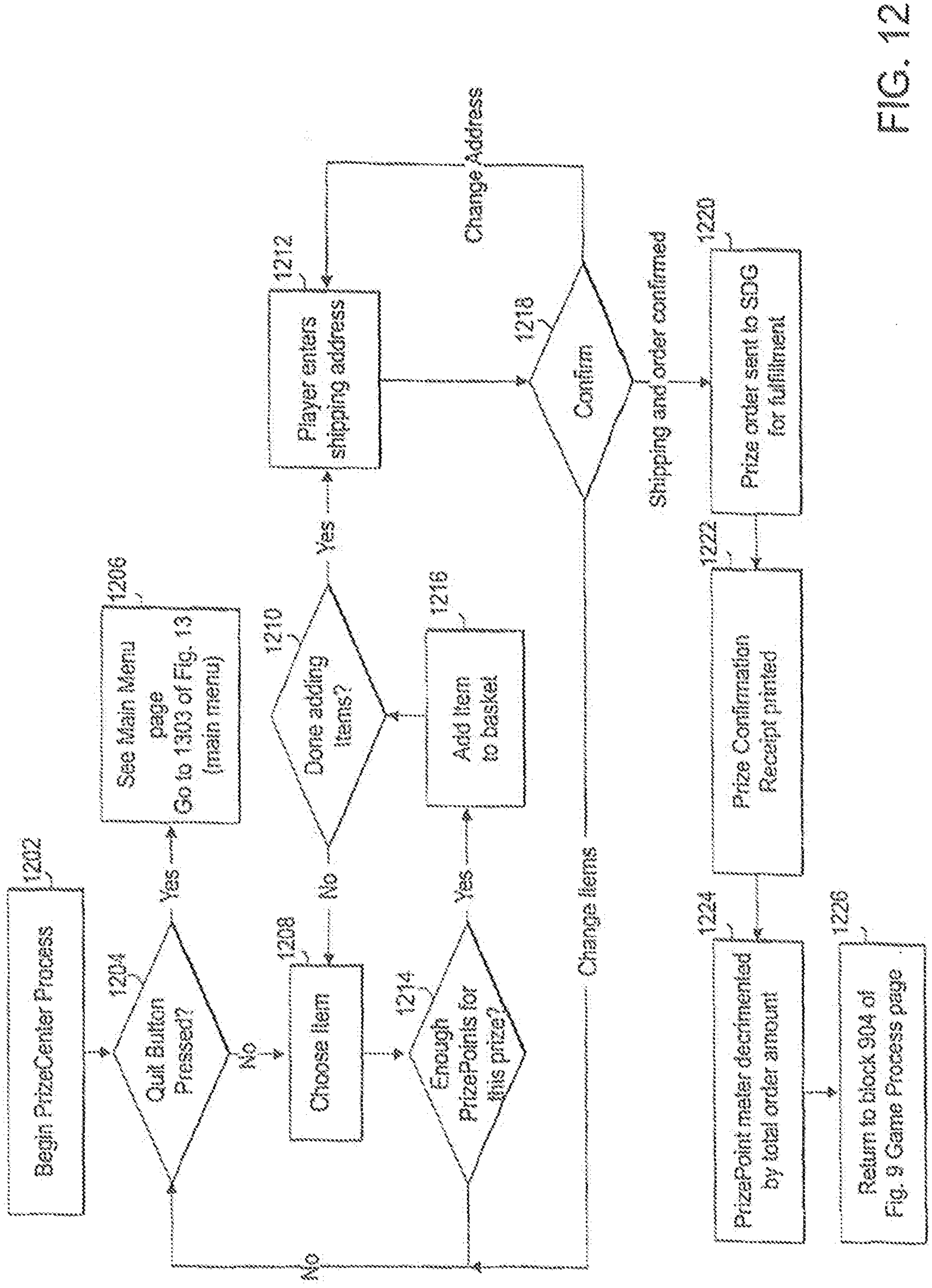
FIG. 12 is flowchart that illustrates a prize center process, according to certain exemplary embodiments.

FIG. 12 is flowchart that illustrates a prize center process, according to certain non-limiting exemplary embodiments. At block 1202, a prize center process begins. At block 1204, it is determined whether the player has pressed the quit button. If the player has pressed the quit button, then at block 1206, control is passed to block 1302 of FIG. 13.

On the other hand, if is determined that the player has not pressed the quit button, then at block 1208, the player is presented with an opportunity to choose/order one or more prizes and the player selects a prize. For example, the player may be presented with a set of prize center onscreen menus for ordering prizes. The player can navigate the prize center onscreen menus to obtain information about available prizes and can select and order prizes. The prize center interface is described in greater detail herein with reference to FIG. 15 to FIG. 18.

At block 1214, it is determined whether the player has enough prize points for his selected prize. If there are not enough prize points, then an onscreen message is displayed to the player informing him that he does not have enough prize points. According to certain non-limiting exemplary embodiments, the player then has the option of inserting more vouchers or cash or cash equivalent into the terminal. For example, the player can insert more prize points vouchers, prize currency, cash, credit cards, debit cards, etc. This is often done to purchase prize points or to buy down the cost of the prizes in prizepoints. All prizes may have their associated cost lowered by the amount of cash or cash equivalent put on the machine or into a storage device associated with the player or the gaming device. The player also has the option of exiting the prize center process. If there are not enough prize points and the player has not supplemented the prize points then control returns to block 1204. Prize selection may be provided on alternate display devices in the same electronic game machine not limited to an iVIEW or top box monitor. Physical local prizes can be chosen in the onscreen shopping application or prizes that will be mailed to the player or other facility.

If it is determined at block 1214, that there are enough prize points for the player's selected prize, then at block 1216, the player can add the selected prize to a virtual shopping cart. Next, at block 1210, it is determined if the player would like to select more prizes. If it is determined that the player would like to select more prizes, then control is returned to block 1208.

If it is determined that the player does not wish to select more prizes, then at block 1212, the player is asked to enter his shipping address or it is returned from the players account after successful player login. The address can also be loaded into the machine by the player inserting a previous order voucher that can reference the player shipping address in an account or have the encoded on the prize order voucher. Alternatively a smart card may be used which can be queried for the shipping information. Next, at block 1218, the player is asked to confirm his prize order and shipping address. If the player wishes to change his shipping address, then control is returned to block 1212. If at block 1218, the player wishes to change his prize order or exit, then control is returned to block 1204.

If at block 1218, the player confirms his order and shipping address, then at block 1220, the player's prize order is sent to an appropriate prize fulfillment center, Next, at block 1222, a prize confirmation receipt is printed for the player. At block 1224, the prize points meter is decremented by the amount of the total order amount. Next, control is returned to block 904 of FIG. 9.

Figure 13:
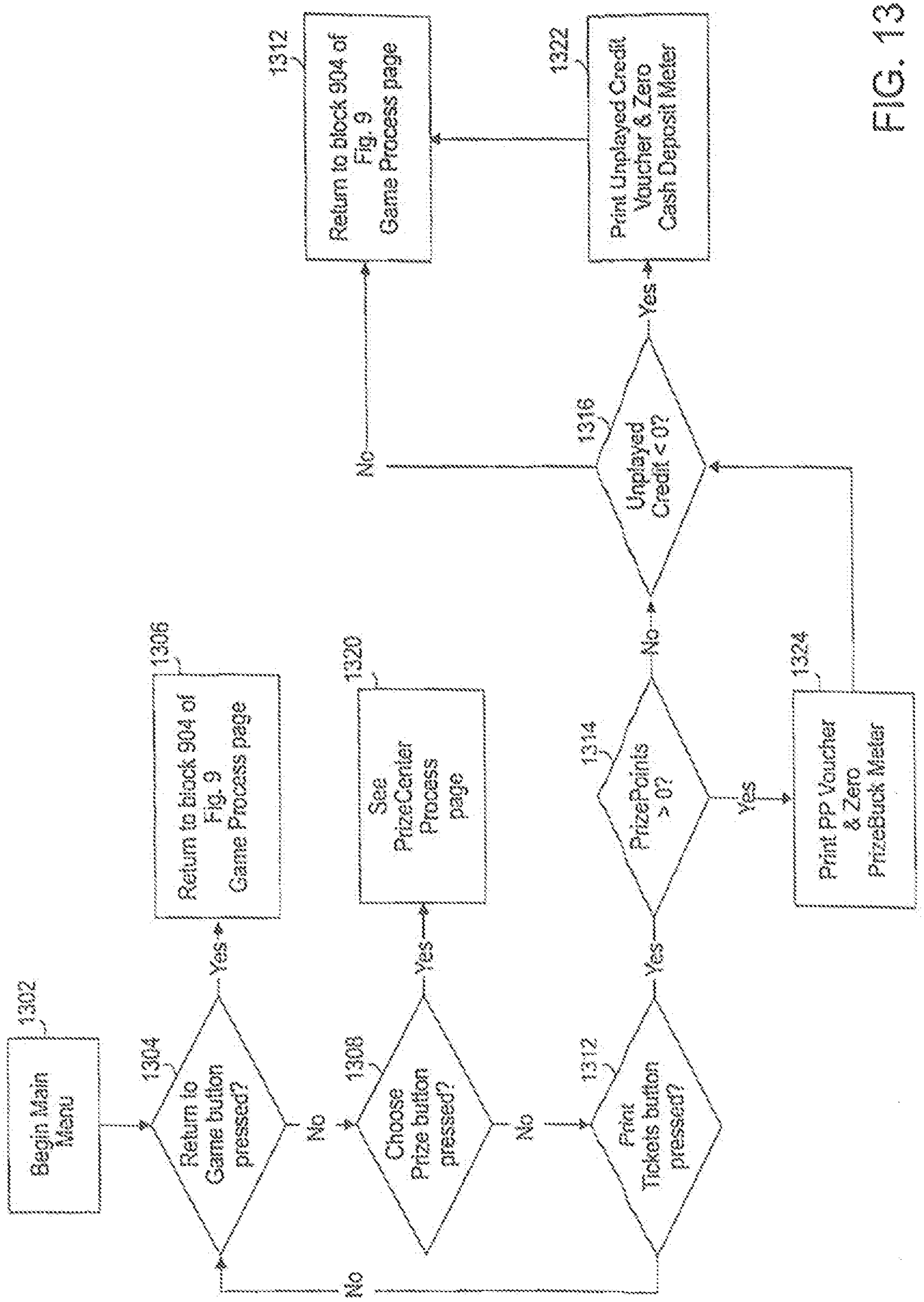
FIG. 13 is a flowchart that illustrates a main menu of the game cycle interface, according to certain exemplary embodiments.

FIG. 13 is a flowchart that illustrates a main menu of the game cycle interface, according to certain non-limiting exemplary embodiments. At block 1302, the main menu process begins. At block 1304, it is determined whether the return to game button has been pressed. If the game button has been pressed, then at block 1306, control is passed to block 904 of FIG. 9. However, if it is determined that the return to game button has not been pressed, then control is passed to block 1308.

At block 1308, it is determined whether the "choose prize" button has been pressed. If the "choose prize" button has been pressed, then at block 1310 control is passed to block 1202 of FIG. 12. However, if the "choose prize" button has not been pressed, then control is passed to block 1312.

At block 1312, it is determined whether the "print tickets" button has been pressed. If the "print tickets" button has not been pressed, then control is returned to block 1304. However, if "print tickets" button has been pressed then control is passed to block 1314.

At block 1314, it is determined whether there are any prize points at the game machine. If there are prize points at the game machine, then at block 1324, a prize points voucher is printed and the prize points meter is reset after the voucher is printed. Control is then passed to block 1316.

If at block 1314, it is determined that there are no prize points at the game machine, then at block 1316, it is determined whether there are any unplayed game credits at the game machine. If it is determined that there are no unplayed game credits then at block 1318, control is passed to block 904 of FIG. 9.

If at block 1316, it is determined that there are unplayed game credits then at block 1322, an unplayed game credits voucher is printed and the game credits meter is reset after the voucher is printed. Alternatively, a single coupon or ticket that includes information on both the player's prize points and the unplayed game credits may be printed. For example, the coupon or ticket may include a bar code that references the prize points and unplayed game credits information stored on a database. A player may optionally elect to print a portion or all of his value meters on tickets for later use or save them on an electronic storage device associated with a specific player. Examples could be a smart card, client side player database, or server side player database. These meter values may include cashable and non-cashable portions. These meter values may include cashable and non-cashable portions.

Figure 14:
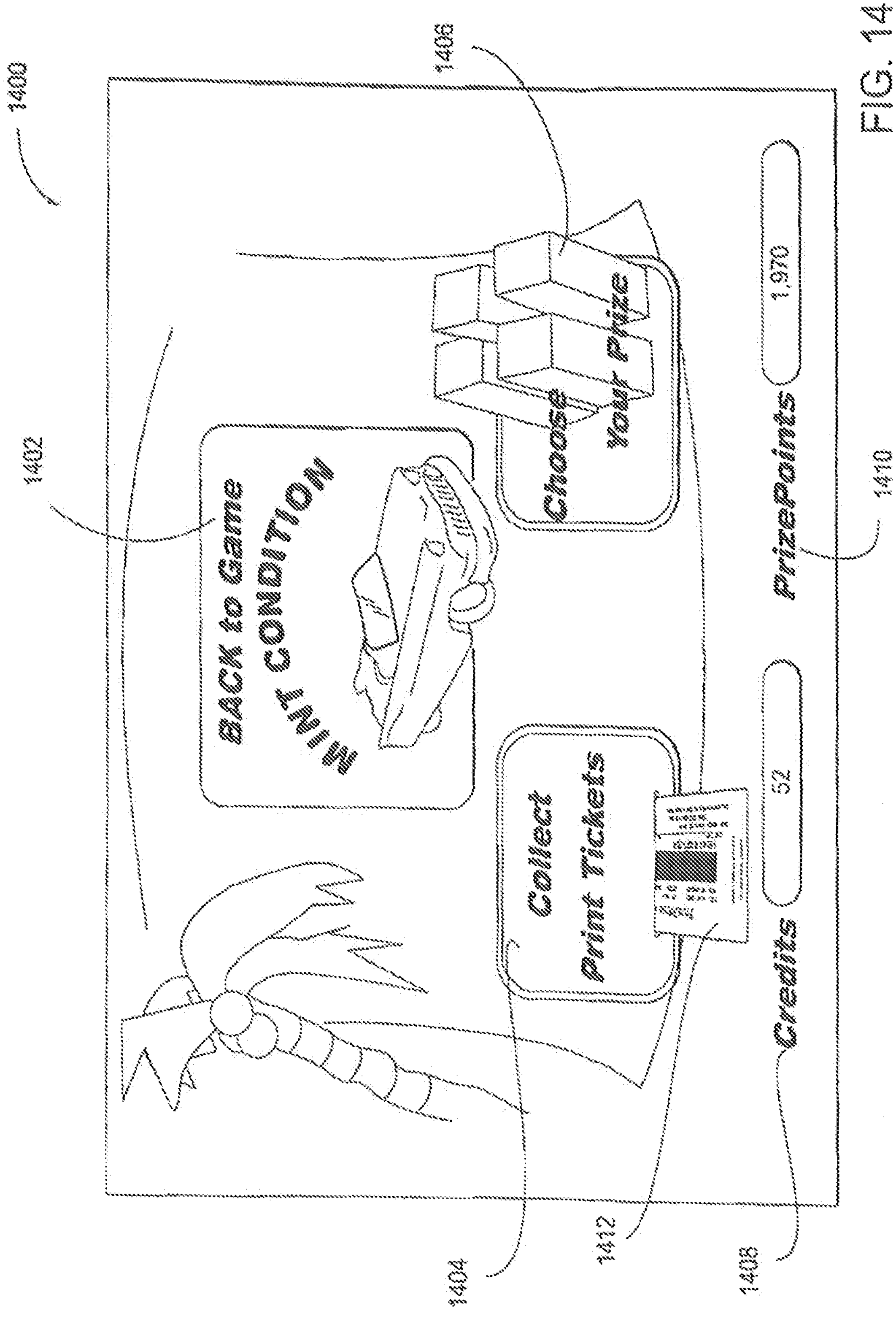
FIG. 14 is an illustration of an exemplary screen display associated with the main menu process referred to in FIG. 13, according to certain exemplary embodiments.

FIG. 14 is an illustration of a sample main menu screen display associated with the main menu process referred to in FIG. 13, according to certain non-limiting exemplary embodiments. Alternate embodiments may provide multiple games for a player to choose from. In FIG. 14, main menu screen 1400 shows a "back to game" button 1402, a "collect or print tickets" button 1404, a "choose a prize" button 1406, a game credits meter 1408, a prize points meter 1410 and a ticket dispensing slot 1412. Tickets include various types of vouchers as described herein. According to other non-limiting exemplary embodiments, the ticket/voucher dispensing slot may be located separately from the print ticket/voucher button, Prize Points and game credits can go to alternate storage devices instead of vouchers. (non-limiting examples are: smart cards, player accounts using a magnetic strip card to access the account.

FIGS. 15 to 20 illustrate sample screens of a user interface associated with an online prize center, according to certain non-limiting exemplary embodiments. A player can interact with the prize center interface for choosing and ordering prizes. The player may have won many prize points during different game sessions and may have collected his prize points in the form of printed vouchers or may have saved his prize points to his online player account that is remotely managed and maintained by a central game system, according to certain non-limiting exemplary embodiments.

Some installations may not allow cash currency to be inserted into each gaming device bill acceptor but only cash vouchers. A player would go to a kiosk or cashier to first convert cash to cash voucher then take the voucher to the gaming machine. Alternately cash can be put on a smart card or into a player account accessible at the gaming terminal. A mechanical coin mechanism is an optional monetary input device. A coin dispenser is an optional monetary output device. An attached prize dispenser is optionally attached or included with the gaming device with single or multiple types of prizes that can be directly dispensed from the gaming device.

Some implementations may require the player to press two different buttons to receive the different types of vouchers. Or the player must press the same button multiple times (one for each type of voucher.) Proper onscreen and audio notification is given to the player to encourage him to retrieve the vouchers.

The player may insert the prize points vouchers to the player terminal Once the inserted vouchers are validated by a central database, the prize points meter on the player terminal is credited by the amount of prize points represented by the vouchers, according to certain non-limiting exemplary embodiments. According to certain other non-limiting exemplary embodiments, the player's online account is credited and the player can use his online account for prize redemption at the online prize center. According some non-limiting exemplary embodiments, a player can access a website for purposes of validating his voucher. For example, the player can enter his voucher information using the website. Once the voucher is validated, the player is automatically assigned a user online account or is asked to create an account and the prize points value will be added to the account. The validation procedure of the voucher includes comparing the entered information to the information stored on the game system ticketing database.

Figure 15:
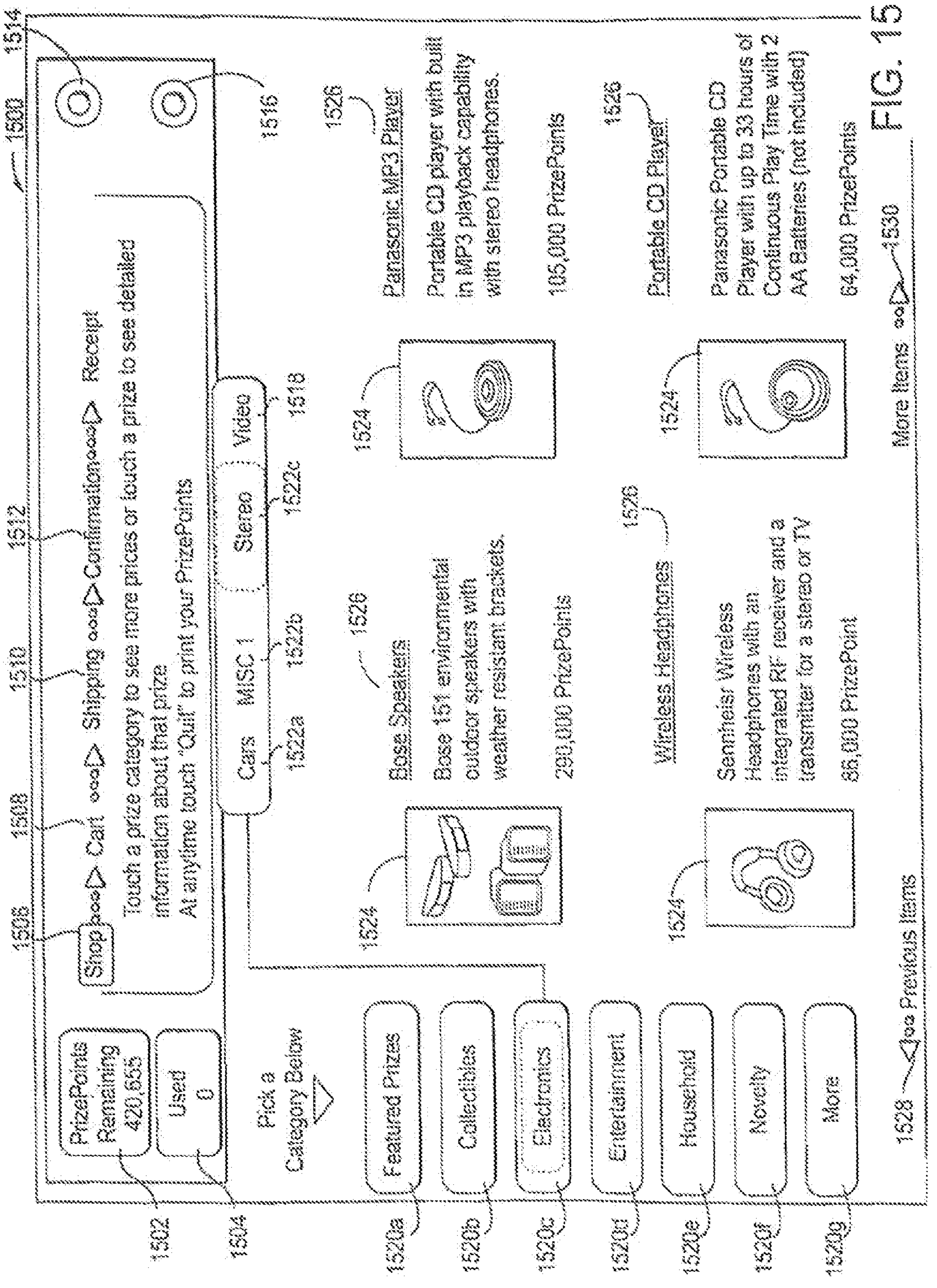
FIG. 15 illustrates an exemplary screen display for allowing a player to choose prizes when redeeming prize points, according to certain exemplary embodiments.

FIG. 15 illustrates a sample screen display for allowing a player to choose prizes when redeeming prize points, according to certain non-limiting exemplary embodiments. In FIG. 15, screen 1500 shows a remaining prize points window 1502, a used prize points window 1504, navigation buttons 1506, 1508, 1510, 1512 to navigate to different prize center screens, a quit button 1514, a help button 1516, a message box 1518, main category buttons 1520*a*-1520*g*, subcategory buttons 1522*a*-1522*d*, pictures of prizes 1524 and associated description of prizes 1526, a "previous items" navigation button 1528 and a "more items" button 1530. The remaining prize points window 1502 indicates the total number of unused prize points that is available to the player to redeem prizes. The used prize points window 1504 is incremented by the amount of prize points of prizes selected by the player and which are added to the shopping cart.

Navigation button 1506 is highlighted to show the current screen accessed by the player. Message box 1518 can display help information to the player. The main category buttons 1520*a*-1520*g* allow the user to select the main category of prizes that are available through the prize center. Non-limiting examples of main categories of prizes include electronics, household, entertainment, novelty, collectibles, featured prizes, etc. Additional categories may be displayed by the "more categories" button 1520*g*. When a main category of prizes is selected, subcategory buttons 1522*a*-1522*d* associated with the selected main category are displayed. When a subcategory is selected, the pictures of prizes 1524 and description of prizes 1526 for the selected subcategory are displayed. When the previous items button is selected, previously displayed prizes of the selected subcategory are displayed. When the more items button is selected, additional prizes of the selected subcategory are displayed.

Figure 16:
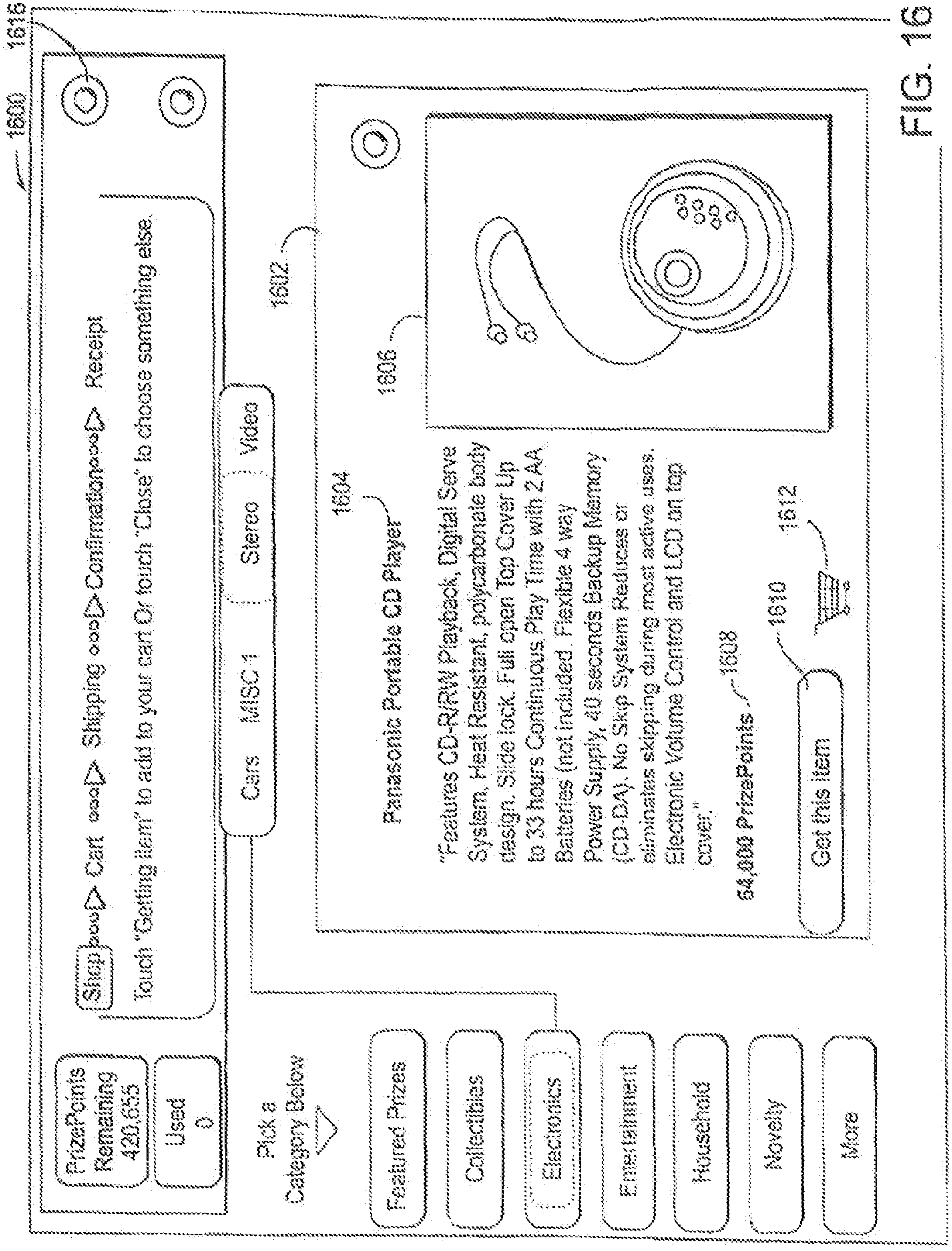
FIG. 16 illustrates an exemplary screen display for allowing a player to select a prize.

FIG. 16 illustrates a sample screen display for allowing a player to select a prize. In FIG. 16, screen 1600 shows an item details window 1602. The item details window 1602 includes a detailed description 1604 and photo 1606 of a prize item selected by the user for detailed viewing. Window 1602 also shows the number of prize points 1608 that is required for redeeming the selected prize item. If the player wishes to order the prize item displayed on window 1602, then the player can select the item by selecting the "get this item" button 1610. If the player selects the item, then the item is added to the virtual shopping cart 1612. The player can close window 1602 by selecting button 1614. The player has the option of selecting the quit button 1616. By selecting quit button 1616, the player is taken back to the Main Menu with all his prize points intact. Any items in the virtual shopping cart 1612 are removed. Players shipping information may stay in the PrizeCenter until session timeout or player credits go to zero after a cashout button is pressed or player card removed, or player logging out.

Figure 17:
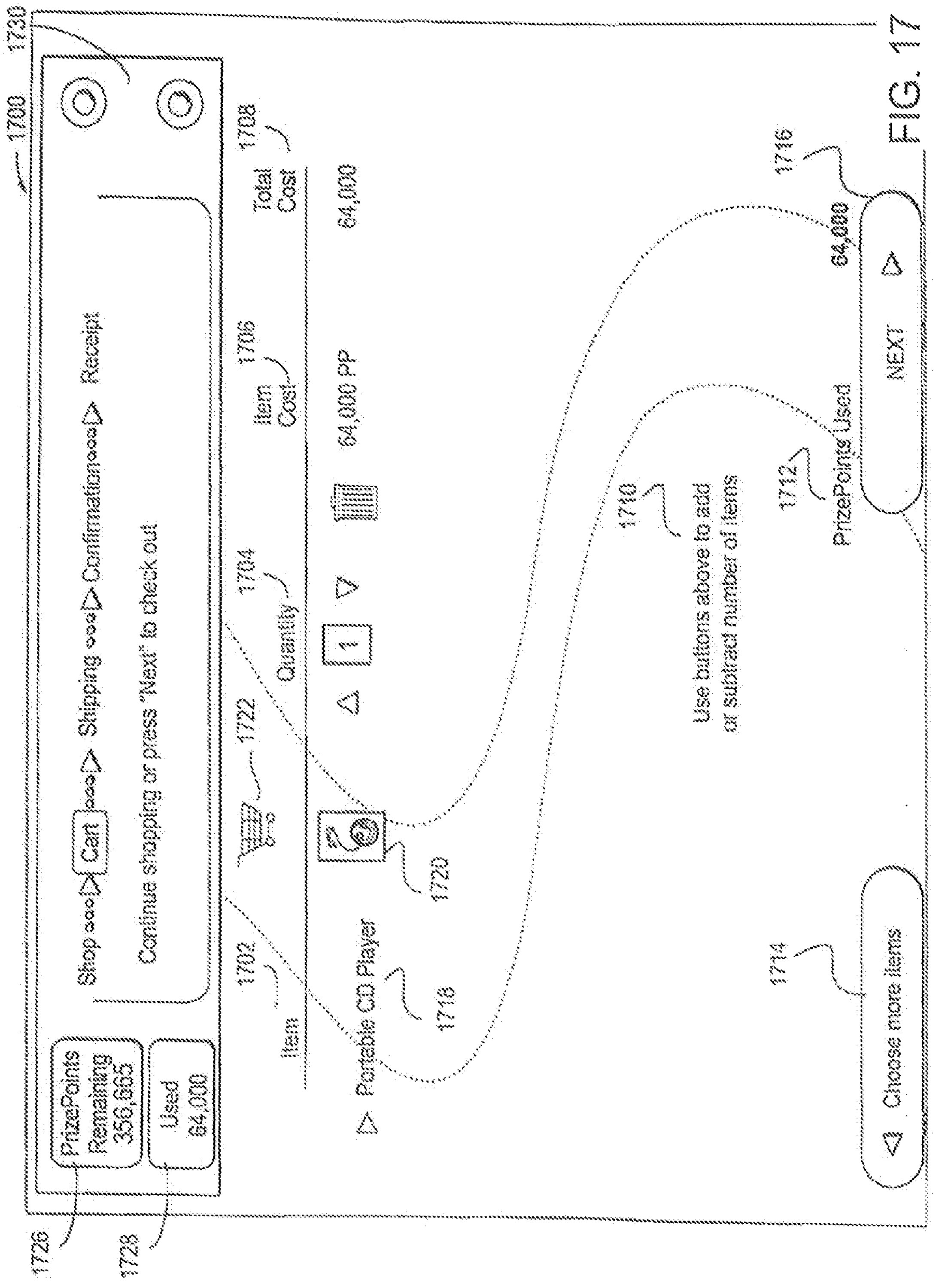
FIG. 17 illustrates an exemplary screen display for showing the player his item selection from the online prize center, according to certain exemplary embodiments.

FIG. 17 illustrates a sample screen display for showing the player his item selection from the online prize center, according to certain non-limiting exemplary embodiments. In FIG. 17, screen 1700 shows the contents of the player's virtual shopping cart 1722. Virtual shopping cart 1722 shows an items column 1702, a quantity column 1704, an item cost column 1706, and a total cost column 1708. Screen 1700 also shows a "choose more items" 1714, an instruction message 1710, and prize points used 1712 corresponding to items in the virtual shopping cart 1722. Screen 1700 also includes a help screen 1730, a remaining prize points indicator 1724 and the total prize points used by the player 1728. The player can then select the "Next" button 1716 to continue to the next screen in the prize redemption transaction.

Figure 18:
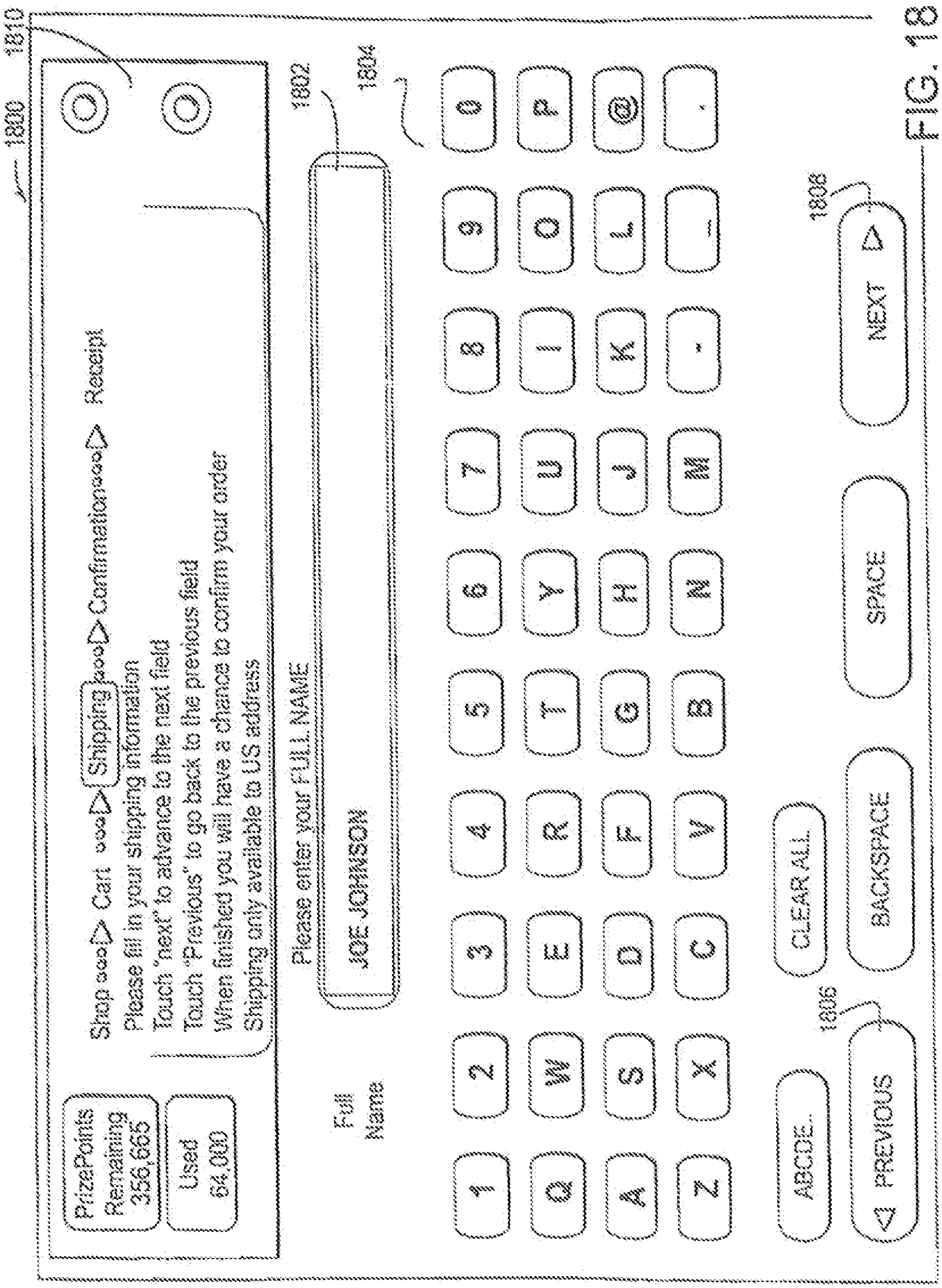
FIG. 18 illustrates an exemplary screen display for allowing the player to enter shipping information, according to certain exemplary embodiments.

FIG. 18 illustrates a sample screen display for allowing the player to enter shipping information, according to certain non-limiting exemplary embodiments. In FIG. 18, screen 1800 shows a help window 1810, a virtual keyboard 1804 for keying in shipping information, a feedback window 1802 that shows the information keyed in by the player, a "previous" button 1806 and a "next" button 1808. By selecting the previous button 1806, the player can return to the previous field. By selecting the next button 1808, the player can advance to the next field. For example, when the player has filled out the "name" field, he can advance to the next field for entering shipping address information. In alternate embodiments actual keyboards may be incorporated into the cabinet to enter shipping address or registration information or the use of voice recognition software can also be used.

Figure 19:
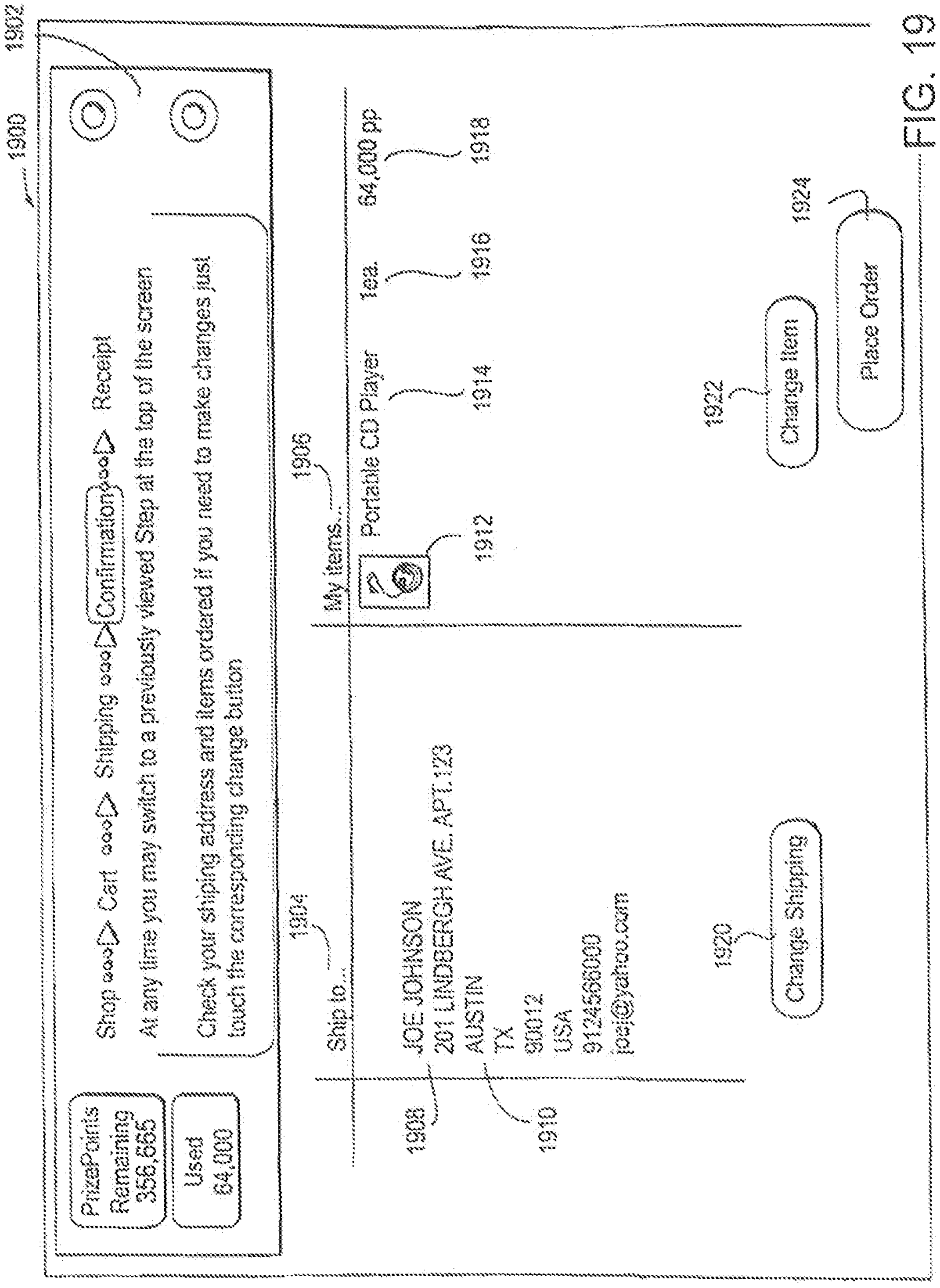
FIG. 19 illustrates an exemplary screen display for displaying the player's transaction confirmation information, according to certain exemplary embodiments.

FIG. 19 illustrates a sample screen display for displaying the player's transaction confirmation information, according to certain non-limiting exemplary embodiments. In FIG. 19, screen 1900 shows a help screen 1902, a shipping information column 1904, and a selected items column 1906. Shipping information column 1904 includes details of the player's shipping information such as player's name 1908, and shipping address 1910. The selected items column 1906 includes an image 1912 of each selected item, a textual description 1914 for each selected item, a quantity column 1916, and a prize points indication 1918 corresponding to each selected item. If the player wishes to change the shipping information, he may select the "change shipping" button 1920. If the player wishes to change the selected items, he may select the "change item" button 1922.

If the player is satisfied with the information presented on screen 1900, he may place the order by selecting the "place order" button 1924. When the player places his order, the order is then posted to the prize management server and the prize points corresponding to the placed order are deducted from the player's prize points meter. According to certain non-limiting exemplary embodiments, the lists of prizes and prize categories may be dynamically updated automatically based on information from a central server and/or the game operator may manually update the prize information. Locally redeemed prizes may also be shown a same or different prize selection screen. An order can be placed on the local prize screen and a receipt printed and taken to a redemption location at the gaming facility or retail shopping location. The prize order may optionally be stored on a smart card for later redemption at any location capable of reading the smart card. If a coupon is printed and used at a retail location it can be scanned by the POS system at the retail location and validated against the Prize Fulfillment database or other database that has been notified of the order. If validated the customer is given the prize item(s).

FIG. 20 illustrates a sample screen display for allowing the player to conclude his prize selection transaction using the online prize center, according to certain non-limiting exemplary embodiments. In FIG. 20, screen 2000 shows a help screen 2002, a textual section 2004, a "choose more prizes" button 2006 and an exit button 2008. Screen 2000 instructs the player to collect his prize confirmation receipt dispensed from the player terminal. According to certain non-limiting exemplary embodiments, the prize confirmation receipt identifies the destination address of the prize items, the order confirmation number, the date and time of the transaction, the player machine ID, the items ordered, and contact information, such as a customer service toll free number, for checking on the status of the player's order.

In some non-limiting exemplary embodiments a gaming establishment may require the player to pickup the prize items at the gaming facility or at a single redemption facility. As such the shipping address may be not be changed by the player. The order receipt would show the location of the redemption site. This order pickup process has the advantage of forcing the player to carne back to the gaming site at least once more, and hence more gaming activity may occur by this player.

According to certain non-limiting exemplary embodiments, the player can check the status of his prize order by entering the order ID that is displayed on his order receipt or by inserting the order receipt into a player terminal or a prize redemption machine.

According to certain non-limiting exemplary embodiments, during subsequent visits to the online prize center by the player, the system automatically fills in the player's shipping information and contact information upon identifying the player. Sonic non-limiting examples on how the player can be identified include: 1) a machine readable player tracking card, 2) a paper ticket that includes player identification information printed during a previous transaction, and 3) when the player enters his telephone number and access PIN, 4) when the player logs into the gaming device using a player account, smart card, or magnetic strip card.

Figure 21:
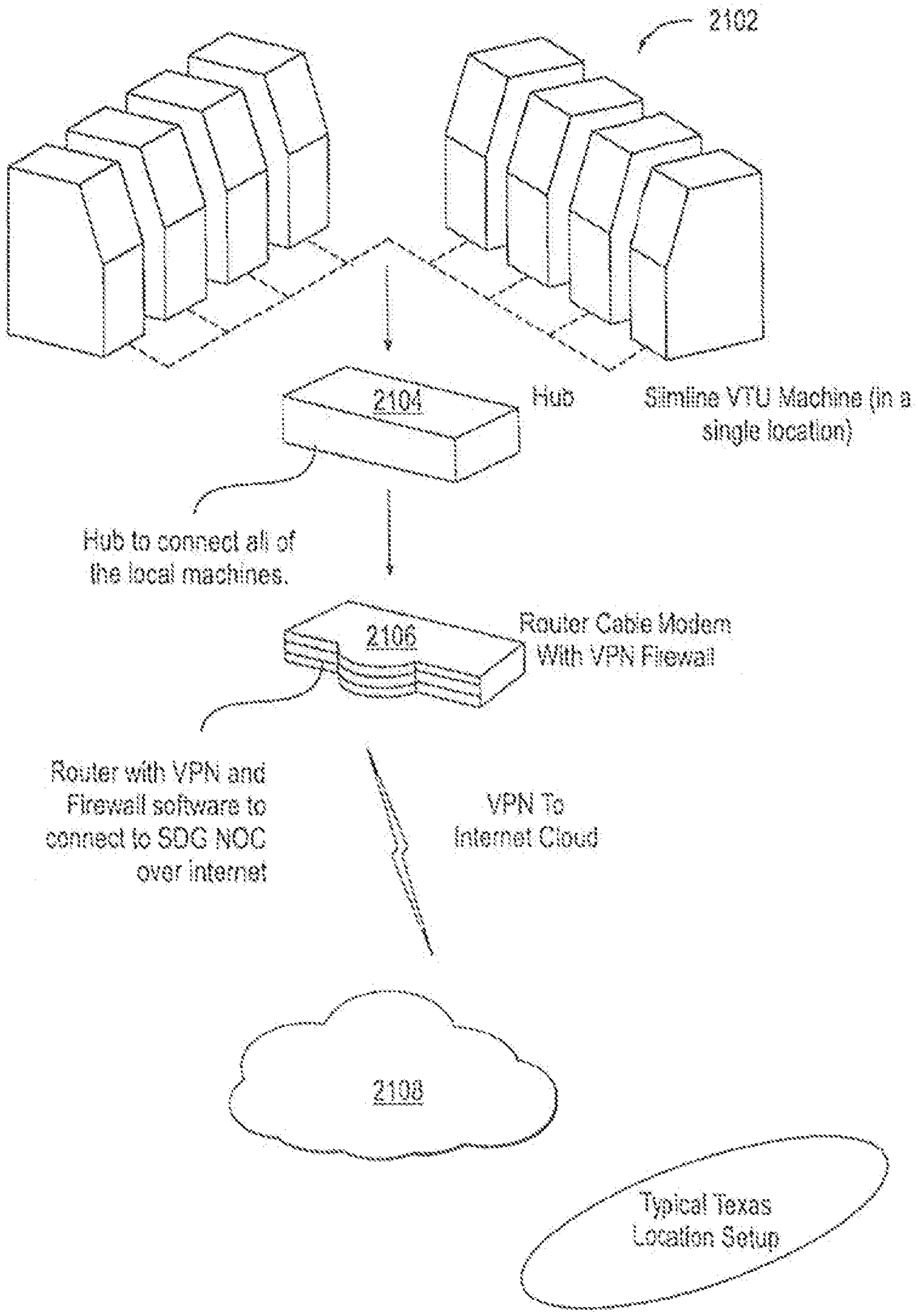
FIG. 21 is a sample network configuration for a game system, according to certain exemplary embodiments.

FIG. 21 is a sample network configuration for a game system, according to certain non-limiting exemplary embodiments. FIG. 21 shows a plurality of game machines 2102 at a given location. The plurality of game machines 2102 are in operative communication with a hub 2104. Hub 2104 communicates with the electronic management servers (not shown in FIG. 21) through router 2106 or cable modem with VPN firewall like the ones provided by the Sonic Wall Corporation and the internet 2108. Network access can include but are not limited to dialup modem access, wireless-Win, Cellular, DSL, T1-T3, ISDN.

Figure 22:
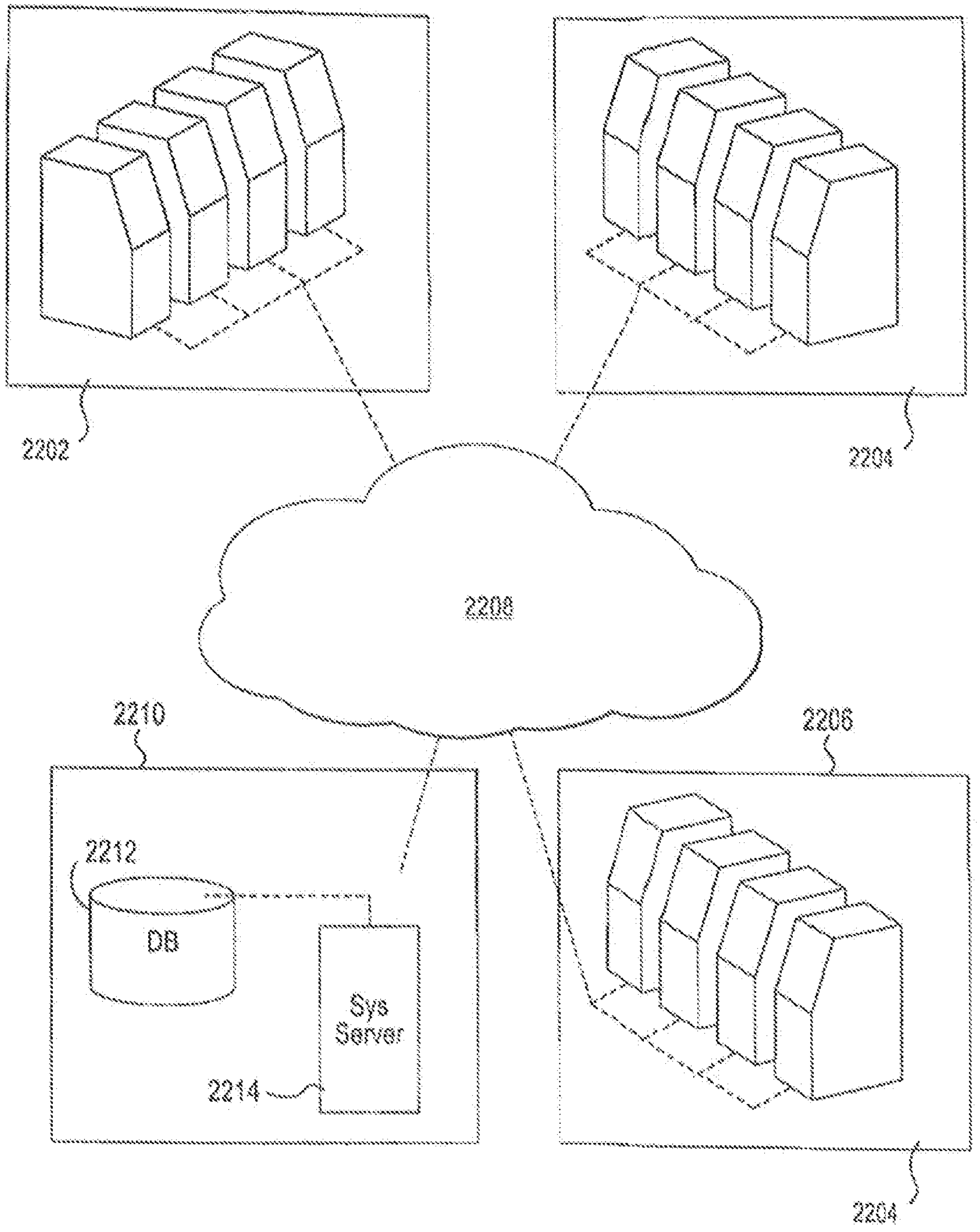
FIG. 22 shows a game network with multiple game locations, according to certain exemplary embodiments.

FIG. 22 shows a game network with multiple game locations, according to certain non-limiting exemplary embodiments. FIG. 22 shows a plurality of geographically distinct game locations 2202, 2204 and 2206. The plurality of geographically distinct game locations are in communication with a central management system 2210 via the internet 2208. Central management system 2210 includes a database 2212 and a system server 2214 interconnected on a private VPN or public network. The remote game machines that are at the plurality of geographically distinct game locations communicate with system game server 2214 by calling functions that interact with database 2212.

According to certain non-limiting exemplary embodiments, the remote game machines automatically receive the latest software updates and prize center updates. For example, system server 2214 automatically causes the latest software version to be downloaded to the remote game machines. Similarly, information from the remote game machines can be uploaded to system server 2214. For example, player information, prize point information, security information, error information, order information, ticket in/out information, player tracking information, game history, and accounting information may be uploaded to system server 2214. Every game played is sent to the system gaming server either real-time or periodically for server side audit purposes, and game tuning purposes. Players game play may be monitored to provide for remote "tuning" or improvement of the game from the download and configuration server. Game play may be authorized at the server for each game played and credits deducted in the server account or on client game credit meter.

Figure 36:
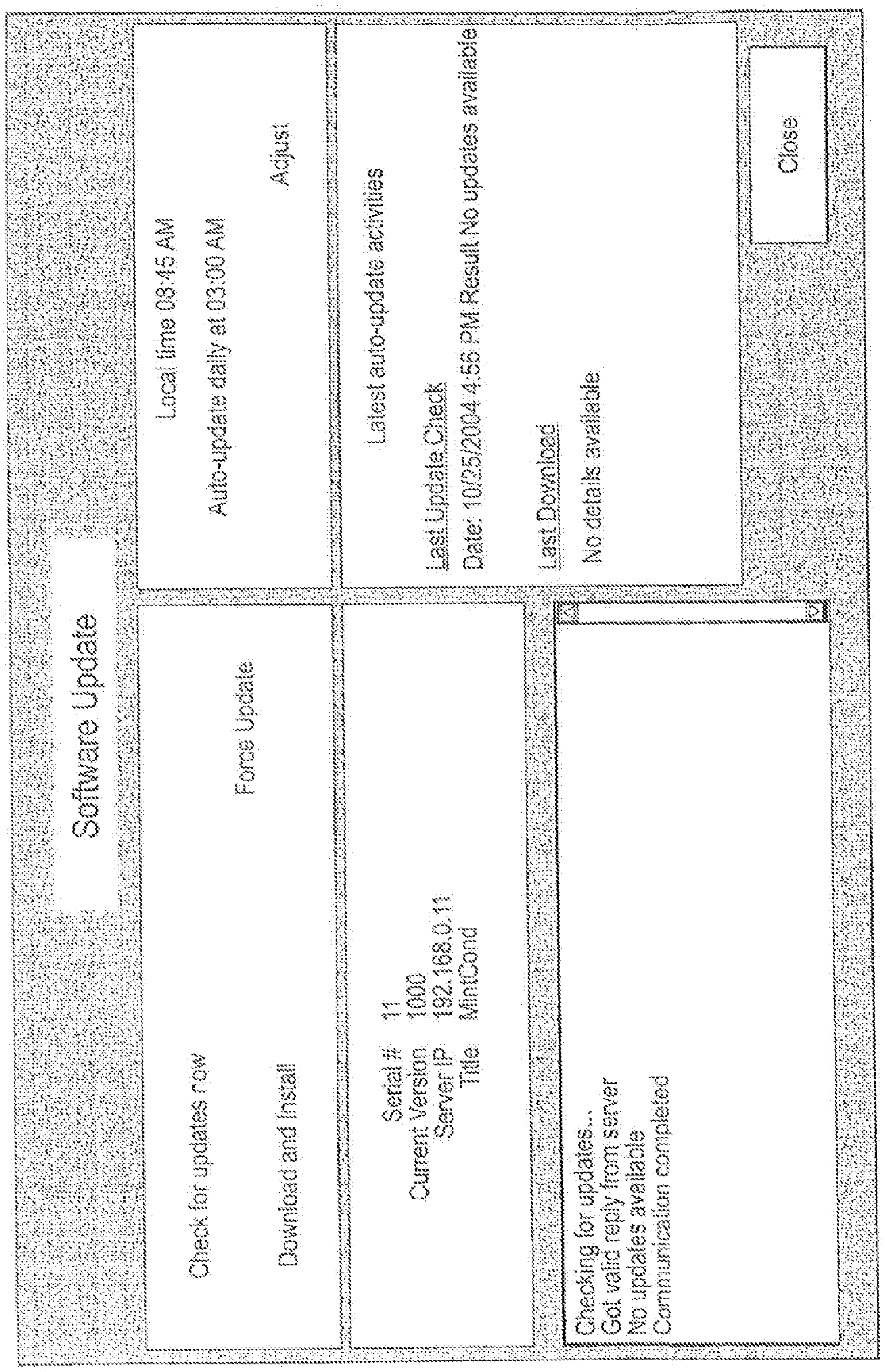
FIG. 36 is an exemplary screen display that illustrates a game operator checking for software updates and none being available.
Figure 37:
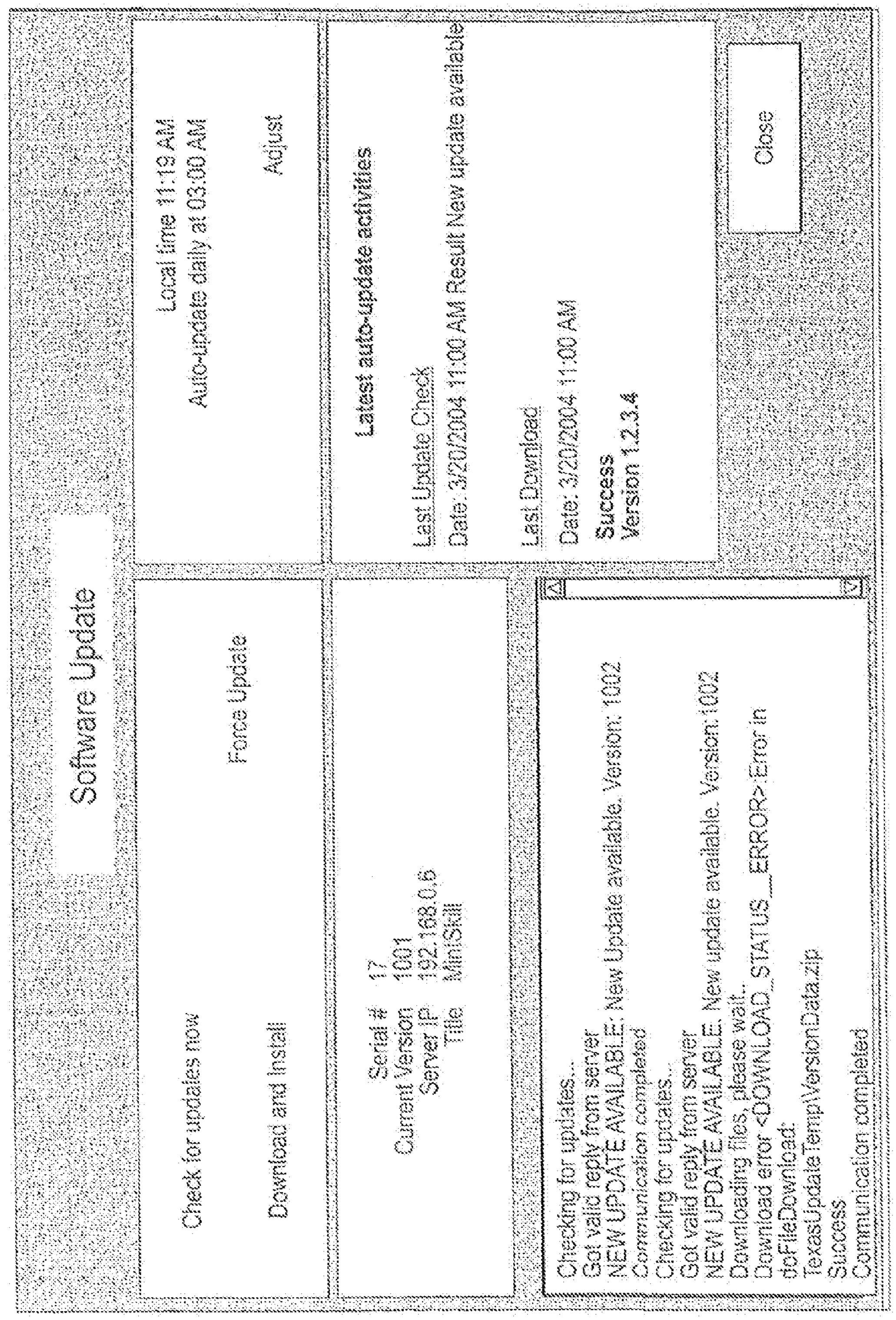
FIG. 37 is an exemplary screen display that illustrates a game operator checking for software updates and one successfully being downloaded to a game.

FIGS. 36 and 37 illustrate an operator determining if there are any updates for a particular game. In FIG. 36, an exemplary screen display illustrates that a game operator has checked for software updates and none were available. In FIG. 37, an exemplary screen display illustrates that a game operator has successfully downloaded a software update to a game.

According to certain non-limiting exemplary embodiments, an update server may be used to automatically download software updates either directly to remote game machines or to intermediate remote clients. The remote game machines and the intermediate remote clients will be referred to as remote clients. The update server can include a web server and a relational database server.

According to certain non-limiting exemplary embodiments, the update download server or RSM manages when changes to the version number take place in a scheduled fashion. This way a 1000 EGM's in a single facility will not get the download at the same time. The server would allow 10 EGM's for example to begin a large download and when done the next 10 EGM's would be enabled to do the download. This can be done automatically by the Server software or manually by personnel. Network bandwidth can be monitored so that the throttling of the number of simultaneous boxes that are downloading can be maintained.

According to certain non-limiting exemplary embodiments, the download server may initiate download to one or more of the EGM's and when that is complete it tells the other EGM's in the facility to get its download from those EGMs who got the download first. This is a form of Grid computing that allows for quicker downloads to many boxes at once because there quickly become many download servers in the casino or amusement location.

The responsibility of the update or download server includes responding to software-update requests, such as a "checking for updates" request. In a "checking for update" request, the requesting client machine provides the update server with the client machine's unique identifier, title and version of the software that is currently installed on the client machine or computer. A non-limiting example of a unique identifier may be the serial number of the client machine. Such a serial number can be stored on a USB device that is accessible by a module on the client computer that is associated with making request for software updates. Any client side unique code can be used to uniquely identify the client gaming device to the server. Non-limiting examples are; security dongle, OS unique code, motherboard unique codes, hard drive unique codes etc.

When the update server receives the unique identifier using HTTP/HTTP(s) communication from the client, the update server accesses an associated database to determine whether the requesting client has the correct software application title(s) and version #'s. If it is determined that the requesting client does not have the correct software title and version, the update server responds to the requesting client with a message indicating that a new update of the correct software is available for downloading from a given location on the network. For example, the new update of the software can be downloaded from the update server or from some other pre-determined server or computer. The client then downloads the new update from the disclosed location, and installs the new update on itself either in the background or by interrupting play as configured by the server and per jurisdictional requirements. The new update may be the correct version of the same software title or a different software title all together. Other cabinet monitors and processor boards can be updated with new software as well.

According to certain non-limiting exemplary embodiments, the remote client is configured to periodically cheek for updates based on a pre-determined schedule. In some non-limiting exemplary embodiments, the update server can notify the remote client through a remote site manager (RSM) server whenever a new update is available. The remote client has a two-way communication to the central administration/configuration server using pre-established socket based communication.

In the case where the remote client is configured to periodically check for updates based on a pre-determined schedule, an operator can schedule a "checking for updates" request for a specific time of day using the operator set-up functionality on the remote client, for example. At the scheduled time, the client makes the request to the update server and downloads the new update, if available, as a background process without interrupting the client's normal operation. Optionally the download in the background occurs throughout the day without any player notification. The switch over to the new settings and games may occur at a scheduled time assuming a player is not playing at this instant. Notification to the player is given prior to the install using various on screen and audio information to ensure compliance with applicable laws.

The client can also be configured to install any new updates only at specified times. For example, a convenient time to install new updates is when the client is in a user inactive mode. The client is said to be in an "inactivity mode" when there are no players playing a game on the client for more than a pre-determined period of time, one minute, for example. The client can also be in an "inactivity mode" when there are a fixed number game credits and/or prize credits on the client for more than a pre-determined period of time. When an "inactivity mode" is identified, the client begins installing the new updates. All of the bookkeeping meters are sent to the server prior to and after the installation for audit purposes. A history of software updates or configurations changes is logged on the client software and the server for each client gaming device.

In some non-limiting exemplary embodiments, in addition to having the ability to schedule automated request, the operator can also manually initiate a "Checking for updates" request at ant time by using the Operator Set-up functionality of the client computer. By using such a manual operation, the operator can identify if any new updates are available for downloading and can then immediately proceed to download and install such updates, if desired. In alternate non-limiting exemplary embodiments the software download and/or install must be manually initiated at the client gaming device.

According to certain non-limiting exemplary embodiments, the operator can perform a "Force update" request. The "Force update" request is similar to the "Checking for updates" request. In the case of a "Force update" request, the client is forced to download and install the latest version of available software update for this specific cabinet ID regardless of what software version is currently installed at the client. Thus, the "Force update" request can be used to install software on the client in the event of 1) a factory prime or first time installation, 2) a serious malfunction of the software that is currently installed, 3) security check of all applications and files failures, etc. Software version numbers and Security Hash codes are shown in the operator setup as an aid in security and compliance.

According to certain non-limiting exemplary embodiments, tracking of the software versions is implemented in a manner to allow for performing incremental updates using the software version directly. To explain, the version number is stored as an integer value on the client and is assigned as a directory name in the update server. The update server sorts the directories by name, which amounts to sorting the version numbers, in ascending order for example.

An appropriate version for the client is determined by identifying the next greater version number on the update server directory as compared to the current version that is on the client. If it is determined that there is not a greater version number, then the client has the most current version. If a greater number exists, then the version of software that is the next greater version than the current version on the client is downloaded and subsequently installed. During the next scheduled "Checking for updates" request, the next greater version is downloaded and installed at the client using an install script. The update process is performed in cycles until the current version of software on the client equals the greatest version on the update server. Such an implementation allows for small incremental updates to be efficiently downloaded and installed, thus avoiding lengthy transfers of bulky complete versions of the software that contain all the data for the installation. In contrast, the incremental updates contain only new content or content that needs to be modified.

Figure 23:
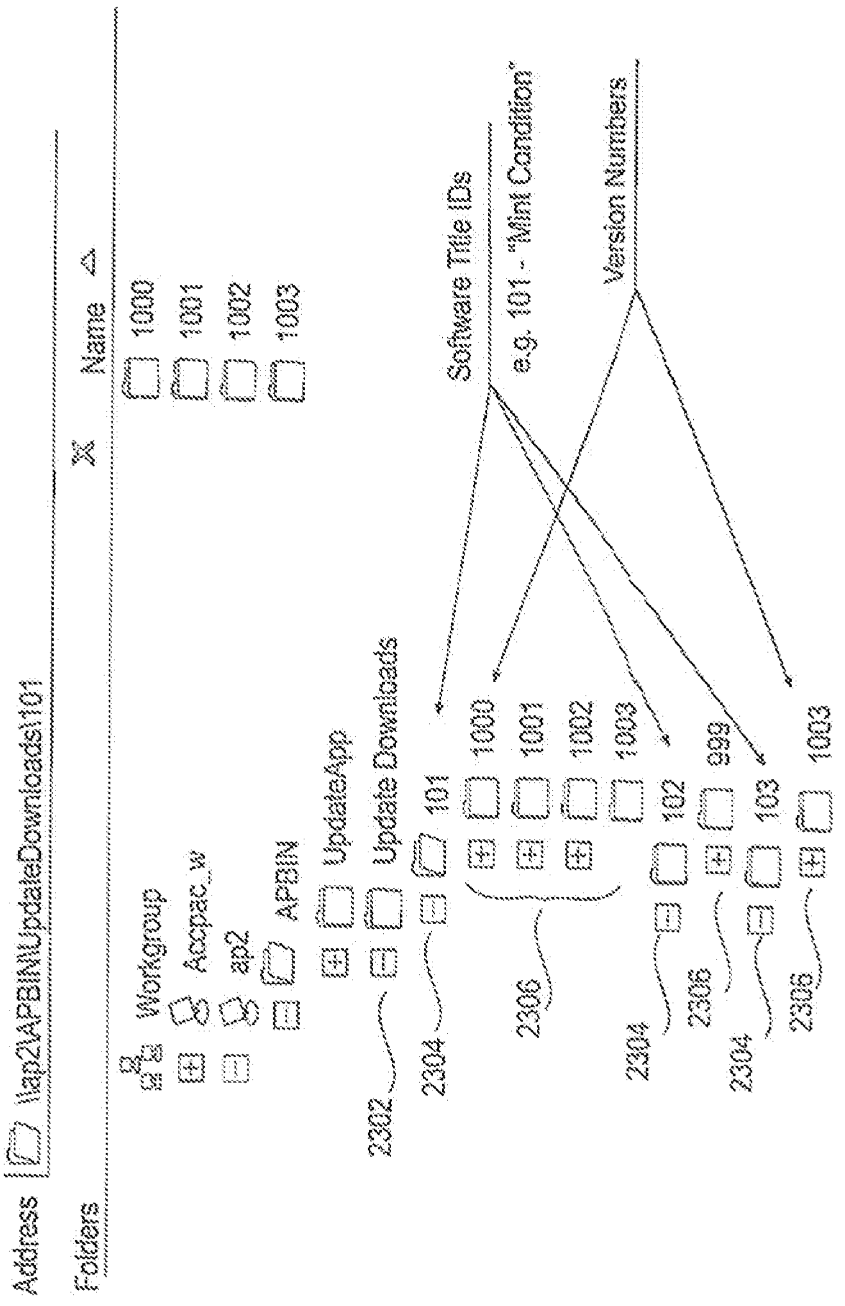
FIG. 23 is a non-limiting sample software version directory tree accessible by the update server.

FIG. 23 is a non-limiting sample software version directory tree accessible by the update server. The organization of the software version directory tree may vary form implementation to implementation. FIG. 23 shows an "Update Download" folder 2302. Folder 2302 stores subfolders 2304 corresponding to each software title ID. Subfolders 2304, in turn, store sub-folders 2306 that correspond to each version number for that particular software title.

Over the lifetime of software versions the following pattern may be observed:

- A complete version is created, size of 100 MB, e.g., Version number: 1000 as shown in FIG. 23.
- An incremental version is added subsequent to Version number 1000, size 40 KB, e.g., Version number: 1001 as shown in FIG. 23.
- Another incremental version is added subsequent to Version number 1001, size 80 KB, e.g., Version number: 1002 as shown in FIG. 23.
- Yet another incremental version is added subsequent to Version number 1002, size 80 KB, e.g., Version number: 1003 as shown in FIG. 23.

In the event that many changes are needed in a particular software title, then the numerous changes may warrant the creation of a complete new version. For example, if a complete new version is warranted for software title 101, then, all previous versions 1000, 1001,1002 and 1003 may be removed from the Update Server and a new complete Version is created, size 120 MB, Version number: 2000. Thenceforth, any client that requests for an update for software title 101 will get Version 2000 without having to cycle through the versions in the 1000 series. This will aid in shortening the install time because fewer install scripts, must be run thus fewer integrity checks and optional reboots.

Figure 24:
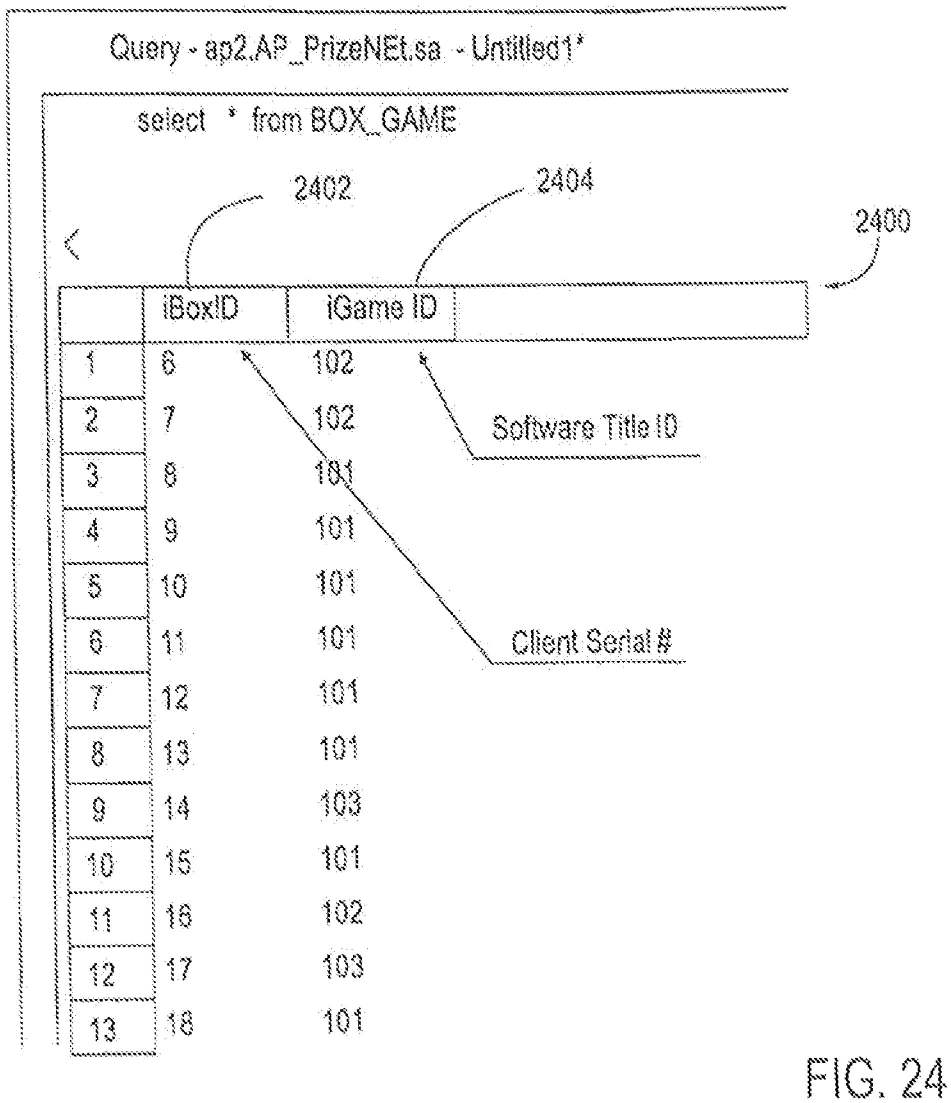
FIG. 24 is a non-limiting sample database table that maps client serial number with one or more software title IDs, according to certain exemplary embodiments.

The "Checking for updates" procedure not only verifies if the requesting client has the correct software version, the procedure also determines if the requesting client has the correct software title ID. A database associated with the Update server includes tables that associate a client serial number with one or more software title IDs. During a "Checking for updates" procedure, a mechanism on the update server determines if the client has the correct software title based on the client's serial number by referring to the appropriate database table that maps client serial number with one or more software title IDs. FIG. 24 is a non-limiting sample database table that maps client serial number with one or more software title IDs, according to certain non-limiting exemplary embodiments. In other non-limiting exemplary embodiments this table is player specific. FIG. 24 shows table 2400 that includes column 2402 and column 2404. Column 2402 stores client serial numbers corresponding to a plurality of clients on the system. Column 2404 stores software title IDs corresponding to each client.

The software update version directories may include files other than the designated version for a particular software title. The following types of files are non-limiting examples of files that can be stored located in the software version directory. One or more of the following types of files may be optional. The file names are merely illustrative and are not to be regarded as limiting.

- UpdateInstaller.exe—an executable file that installs updates.
- InstallScript.is—an installation script used by UpdateInstaller.exe.
- FlashResource.dll—a digitally signed resource containing MD5 hashes of files in the particular software update.

This file is digitally signed in Microsoft Visual Studio by compiling in a private signature into the executable Microsoft Development Environment provides a facility to digitally sign executables—assembly signing. Key-File is a file containing a key used for signing. To produce a KeyFile use a "Strong Name Utility" sn.exe provided by Microsoft.

HashResource.xml—an XML file with certain settings utilized by an AlphaLockdown.exe. An AlphaLockdown.exe is an executable file that runs as a shell on a client and is responsible for integrity checks, launching update checks, and launching and monitoring the software title when accessing HashResource.dll. This HashResource.xml contains and MD5 hash of every file in the download package or optionally after final install is complete.

OsData.zip—a compressed (zipped) file of the contents of Operating System directory on a client. Such a directory contains most of the important system utilities that are responsible for launching the game, maintaining system settings, performing updates, etc. In the preferred embodiment the OS is Windows XPembedded running Direct X 7, 8, 9 games. Other embodiments may use other operating systems including but not limited to Linux and OpenGL for graphics rendering.

VersionData.zip—a compressed (zipped) file of the contents of game and prize center application directory on a client. Such a directory contains all content and executables necessary for a given software title to run.

According to certain non-limiting exemplary embodiments, the building of the software update (referred to as a "build" herein) includes the following steps, of which some may be optional and/or may be replaced with other steps.

1. Working copies of client OS directory and client game application directory are copied to a standalone location.
2. OsData.zip and VersionData.zip files are created by compressing contents of client OS directory and client game application directory. Standard windows unzip or proprietary unzip utilities can be used to unpack these files.
3. Intermediate Hash Resource XML files are created. Such files contain names, locations and MD5 or SHA hashes of all files included in the client OS directory and client game application directory for the download package. As an example, the content of intermediate Hash Resource XML files may look like the following:

```
<?xml version="1.0" encoding="utf-8"?>
- <AP_FILE_HASH>
  - <FILE_ENTRY>
      <name>\SDGAPP\Games\art\gamesSymbol1.bmp</name>
      <MD5>hKr3F5j2ekk/vSYu6g2fjQ= =</MD5>
    </FILE_ENTRY>
  - <FILE_ENTRY>
      <name>\SDGAPP\prizecenter.dll</name>
      <MD5>eSpOgEVrZtWItEC1U4h7UA= =</MD5>
    </FILE_ENTRY>
  - </FILE_ENTRY>
      <name>\SDGAPP\ticketprinter.exe</name>
      <MD5>DSfQ5UXQ03OajAj3MTP2+A= =</MD5>
    </FILE_ENTRY>
  - </FILE_ENTRY>
      <name>\apreg\Hiddeneursor\normalcursor2.reg</name>
      <MD5>eSpOgEVrZtWItEC1U4h7UA= =</MD5>
    <FILE_ENTRY>
  - </FILE_ENTRY>
      <name>\SDGAPP\Games\sounds\funnysound.wav</name>
      </MD5>ojPtVL119dqoagtOIgeCMg= =</MD5>
    </FILE_ENTRY>
```

4. Intermediate Hash Resource XML file(s) are then linked to HashResource.dll as embedded resources. During the build, HashResource.dll is digitally signed with the same private key (located on removable media on a developer's, regulators, or compliance officers package build machine) as AlphaLockdown.exe (used as a shell on a client) that is normally located in the client OS directory.
5. If necessary, changes are made to UpdateInstaller.exe and InstallScript.is to reflect specific changes in step by step order for the particular installation.
6. The above files are copied into the appropriate Version directory on the update server. The update server automatically detects a change and builds a list of all resources in the version directory.

According to certain non-limiting exemplary embodiments, AlphaLockdown.exe is a shell on a client that is launched when client system boots. AlphaLockdown.exe loads HashResource.dll at runtime and performs integrity checks on the content of the client OS directory and client game application directory. If any files are determined to be missing or their MD5 hashes do not match with the ones in HashResource.dll, a "Force Update" is initiated and brand new content is downloaded to a client from the update server.

AlphaLockdown.exe is able to successfully load HashResource.dll at runtime because both AlphaLockdown.exe and HashResource.dll are digitally signed with the same Private Key. Such an arrangement ensures that only AlphaLockdown.exe can load HashResource.dll and that HashResource.dll cannot be modified by unauthorized personnel. Thus, the secure HashResource.dll guarantees proper integrity verification of the client.

The installer script allows for any executable to be run including but not limited to driver updates for all attached peripherals like the dollar bill acceptor, printer, card reader, iView Player tracking devices, game monitoring units, other display devices, and other computing devices inside and attached the gaining cabinet. Proper notification to the server occurs during and after peripheral updates. The installer script may be built in real time by the server that tracks what applications and files are to be installed on each remote device.

In alternate non-limiting exemplary embodiments a higher system security level can be achieved by computing MD5 hashes of files with the help of some hardware specific value. For instance, a specific hardware value saved in the BIOS or NVRAM can be used. In addition, the integrity check can be performed remotely from the system server. For example, the system server can randomly request the MD5 or SHA hash of any file on client and compares the result with a value stored in the server database. A list of authorized client processes, executables, or services can be sent down from the server. Thus only exe's are validated and not art and sounds files. These EXE's and processes are validated at launch or by periodically scanning the list of running processes.

In alternate non-limiting exemplary embodiments the software security can be enhanced by allowing the server to do a remote procedure call to the client to send the MD5 hash of each file to the server so the server can do the compare. The hash manifest file is not on the client whatsoever. If the files are fine then play is authorized. This can be done throughout the day to ensure files are not tampered with. Another method for this security is allowing the server to open any file directory on the client and compute the MD5 has of itself on each file. The MD5 hash would be compared against one the Download server or another server has in its storage device.

In alternate non-limiting exemplary embodiments the unique device specific ID is sent to the server prior to first software install on this client device. The server will take this unique code and digitally sign any current and future download package with this device specific ID. Automated tools would do this on the server. The client would then request a download. The server would return the uniquely digitally signed download package for this device only. This way there is only one device on earth that can validate the digital signature of the downloaded package prior to install and that is the one that originally registered with the server. Thus the server contains a download directory and/or package for each client gaming device containing a uniquely signed and encrypted download packaged.

According to certain non-limiting exemplary embodiments, the update installation procedure utilizes UpdateInstaller.exe with the help of a script file (InstallScript.is, a non-limiting example of an installation script file is as follows:

```
SHOWMSG=Installing Update: 1001 Mint Condition
PAUSE=5000
SHOWMSG=Please Wait...
DOCMD_ENDTASK=alphalockdown.exe
PAUSE=1000
DOCMD_ENDTASK=ppmon.exe
PAUSE=1000
DOCMD_ENDTASK=alphashell.exe
PAUSE=1000
SHOWMSG=Saving integrity files...
PAUSE=500
DOCMD_WAIT=cmd/C copy HashResource.* d:\
SHOWMSG=Removing Prior Application Install Files
DOCMD_WAIT=cmd /C rmdir /s /q data
PAUSE=500
VERIFYPACKAGE
SHOWMSG=Unzipping Application Archives
DOCMD_UNZIP=VersionData.zip
PAUSE=500
SHOWMSG=Clearing SDGAPP
DOCMD_WAIT=cmd /C rmdir /s /q \SDG_APP
PAUSE=500
SHOWMSG=Copying Data
DOCMD_XCOPY=data\*.*\
PAUSE=500
VERIFYALL
REBOOT
```

As seen in the above example, UpdateInstaller.exe is able to start and “kill” a program, unzip a compressed file, show a message for a user, start a program and wait until it’s completed, analyze the output of a MS-DOS script, etc. An installation script file such as InstallScript.is allows for a variety of actions to be performed during installation and allows for the customization of install procedure without modifying any code in UpdateInstaller.exe file.

The install script may include a reboot at anytime in the script and after reboot updateinstaller.exe will force the finish of the install script where it left off or run the script all over from the beginning. This way special drivers, dll’s, registry entries can be made and force a sequence of installs and reboots as needed.

According to certain non-limiting exemplary embodiments, software security on a client comprises:

1) Security Key (stored on a security dongle, for example) for normal day by day operations. Security Key is provided by Micro Computer Applications of Denver Colo.
2) Integrity verification for software integrity verification on each startup
3) Software authentication such as digital signing of startup software components.

The security dongle is a USB based authentication token attached to a client. The non-limiting exemplary embodiments are not limited to any particular authentication token. Any suitable authentication token may be used. The application requires a DLL and private key in a header file (.h) to be compiled into the application at build time. The software application will not run without successful access to the Security dongle.

According to certain non-limiting exemplary embodiments, the authentication token can only be accessed by the system software because of special security features built into the software such as certain header and object files unique to the system. Unless an attacker has access to the source code of such special features, the attacker cannot access the authentication token.

As a security feature, if a client boots without the authentication token attached to the client, or if authentication token is removed from the client, the software on the client becomes unusable (the software raises an irreparable tilt, for example). Furthermore, certain critical data such as client Serial number and a unique order counter can be stored on the authentication token. Without a Serial number, a client is unable to communicate with server. Without getting a correct value for unique order counter, no prize orders can be completed.

In some non-limiting exemplary embodiments NTFS file level encryption can be enabled for additional application and file level security. This prevents the storage device from being read by any other Operating system.

In some non-limiting exemplary embodiments Microsoft’s Enhanced Write Filter protects the Window XP embedded Operating system from modifications while the OS is powered up. This prevents accidental file writes that may prevent the OS from working properly or preventing rouge applications from tampering with the OS.

In some non-limiting exemplary embodiments, the Integrity verification procedure provides a facility for the software on the client to check on itself during startup. The Integrity verification procedure verities the MD5 hashes of virtually all resources installed for the current software title and storage devices.

In some non-limiting exemplary embodiments, other security features include clearing the windows Pagefile.sys file at bootup, and storing critical data and security keys and hash files in the Non-Volatile battery backup up NV RAM.

In some non-limiting exemplary embodiments, the AlphaLockdown.exe runs after a client system boots. The AlphaLockdown.exe determines if the OS drive on client has Enhanced Write Filtering (EWF) enabled. If it is determined that the OS drive on client is not EWF enabled, then AlphaLockdown.exe enables EWF and reboots the client. Enabling EWF on the client OS drive protects the operating system from any unauthorized modifications. Alphalockdown.exe can test the integrity of XPe using a similar MD5 hash or using Microsoft’s verify utility. After the EWF check is complete, AlphaLockdown.exe launches a software update that brings the most current version of a given software title to the client if the client does not have it already. Next, AlphaLockdown.exe loads HashResource.dll at runtime. HashResource.dll contains MD5 hashes of all the files for a current installation. AlphaLockdown.exe uses the HashResource.dll to verify that content of the client’s files has not been tempered with. Upon detecting a mismatch, AlphaLockdown.exe starts ForceUpdate.exe that downloads from Update Server the most recent version of a software title and installs it on the client. Thus, any unauthorized changes to client’s files can be detected and will cause a complete re-installation of a given software title by downloading a legitimate version from the update server. Optionally the scrub of the entire hard drive is optionally done prior to laying down the code again. The Non-Volatile battery backed ram may also be cleared at this time.

To further tighten the security for the whole system, the following actions are taken in some non-limiting exemplary embodiments:

Enable https protocol for communications with the Update Server and any potential future communications outside of RSM. All communication is using HTTP(s) POST or GET function calls supported by the OS.

Implement the same type of MD5 hash security with digital code signing for any update download to prevent an attacker from downloading an unauthorized software to the client.

According to certain non-limiting exemplary embodiments, a mechanism is provided for monitoring the player terminal or game cabinet (client machine). For example, the mechanism monitors events such as: opening of game cabinet door, rebooting, any activity of the currency acceptor including status and errors, any activity of the voucher printer including status and errors, revenue reporting, bill validator status and errors, statistics on each game played on the particular player terminal. The data on such events may be stored in persistent memory such as a battery backed RAM, for example. The data can be sent to the system database server when communications is established between the player terminal and the system servers.

100305) In certain non-limiting exemplary embodiments, a team of players may be provided with a combined skill score or skill meter for the team as well as individual ones per player. Handicaps may be determined by these skill scores or meters such that different groups or players can be evenly matched for competition. For example highly skilled players may only be allowed to compete against other highly skilled players. Other gaming sites group people to average game score or other game score calculation techniques. The skill score or skill meter can be used as an alternative to using the game score. It is a more accurate reflection of the players true skill.

In a non-limiting exemplary embodiment it is possible to adjust the session time of a game to any desired setting for any given amount of money played. One advantage of this is that the session time for a game that does not permit the replay of winnings as described herein could be made to match the session time for a game that does allow replay of winnings. For example, $20 is brought as an initial stake by each of two players, one of which is a player in Las Vegas where replay of winnings is allowed, and one of which is a player in Texas where replay of winnings is not allowed.

The game in Las Vegas is, in this example, a single spin game lasting approximately six seconds. The Texas game lasts on average thirty seconds with three to four spins per game on average. Both players will expectedly "spin" approximately the same number of times in thirty minutes, which is the expected amount of time it would take to play the $20 of this example down to zero on average. The Texas player will play far fewer games, but will get far more spins than the Las Vegas player.

Based on the mathematics of exponential decay, which is well known to those skilled in the art, it is possible to predict when a Las Vegas style game of chance will approach zero for a given initial stake, amount played per game iteration, and expectation of outcome. This kind of mathematics can be used to tune the Las Vegas style game to take a specified amount of time to consume the initial stake of $20. Similarly, a player of the Texas game consumes the initial stake at a roughly linear rate over the long haul, which can be tuned such that $20 will be consumed in the same amount of time. Thus, the two players of this example can have roughly the same experience, including play time for a given initial stake, even though they are playing in different markets with vastly differing laws governing gaming. In another non-limiting exemplary embodiment, an "extended spin" feature allows an increased number of spins, or alternatively, spins of extended duration to increase the total game play for markets that do not allow the replay of winnings in a manner that provides game play that approximates game play in markets where winnings can be replayed. These non-limiting exemplary embodiments are given by way of example and not limitation.

In yet another non-limiting exemplary embodiment, given by way of example and not limitation, a "Hold-Re-spin" feature is provided to increase player session time. The feature can be used to help provide a predominantly skill based game, which is desirable or necessary in some jurisdictions. As will be appreciated by those skilled in the art, players feel more bonded to a game where they can feel they can affect the outcome. For example, video poker games make up a large portion of Las Vegas casino revenue and this is in large part due to the fact the players believe they can materially affect the outcome of the game. Similarly the skill reels amusement machine of this non-limiting exemplary embodiment will also create this bonding effect and thus lengthen the game's earnings cycle. This non-limiting exemplary embodiment should not be construed in a limiting way.

In still another non-limiting exemplary embodiment, a "pay left to right" feature is provided to ease players' quick judgment time as to which reels to hold. This non-limiting exemplary embodiment is given by way of example and not limitation.

In a still further non-limiting exemplary embodiment, a "bonus round" feature is provided. The goal of the bonus round (or car wash round) is to allow the player to win a prize larger than would be allowed for any single game win for a certain wager amount. For example, this feature could allow a win of $25, or the equivalent thereof, for a 25 cent wager. This feature allows a player to "collect" the larger prize, but not all at once; the player must spend more money to go get the prize. This would allow the game to still comply with, for example, Texas state regulations which state a player can only win 10 times the wager amount or $5, whichever is less for a single game. To collect the $25 dollars the player would have to play 10 more games at 25 cents per game and then he would be able to collect his $2.50 per game for each of these 10 games. Thus, the game of this example would comply with prize award limitation laws, such as those of Texas. Similar methods can be adapted for virtually any jurisdiction. These non-limiting exemplary embodiments are given by way of example and should not be construed in a limiting way.

Figure 38A:
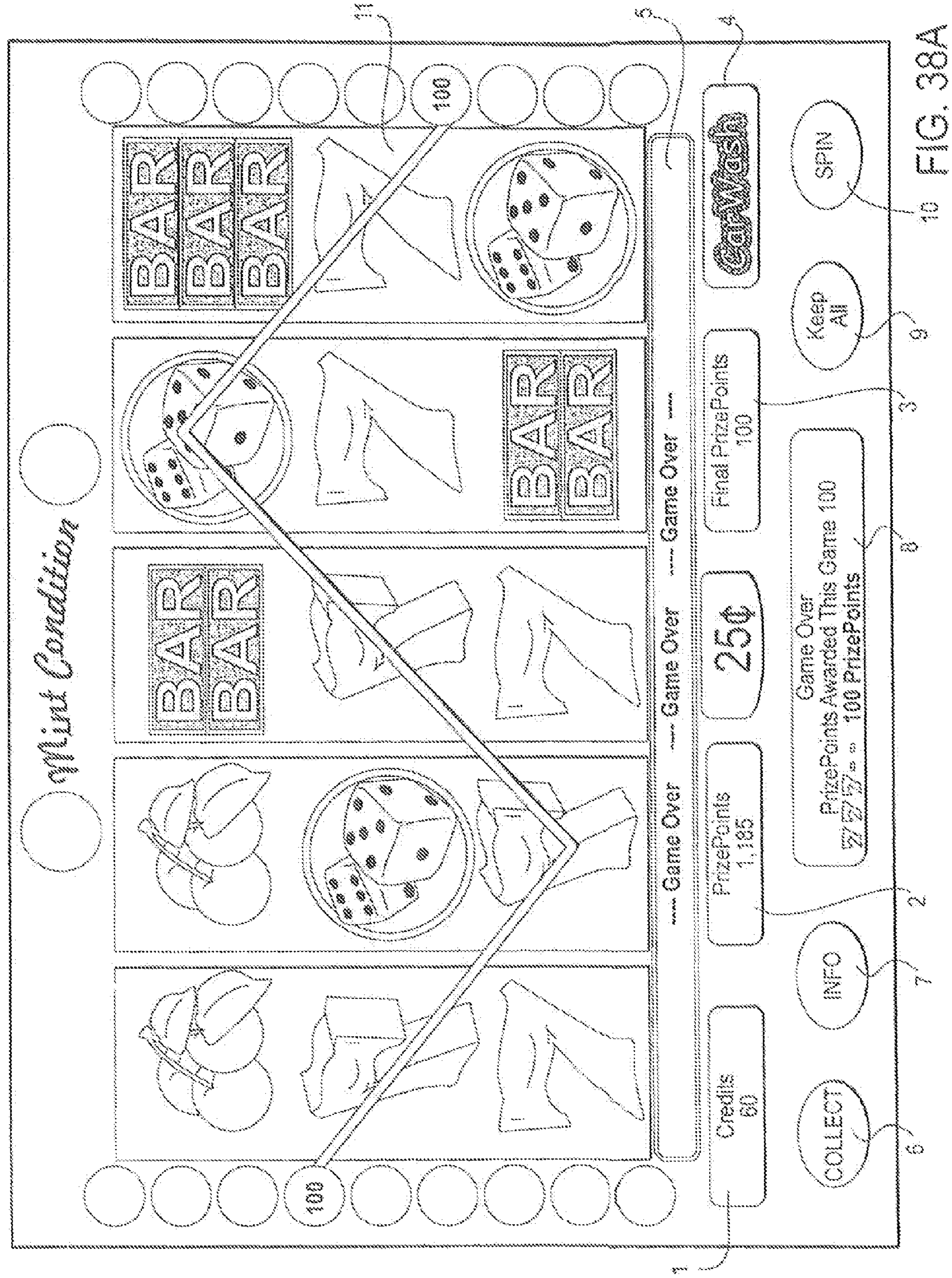
FIG. 38A is an illustration of a playfield of a multi-reel game showing bonus round car wash stamps that have been earned.
Figure 38B:
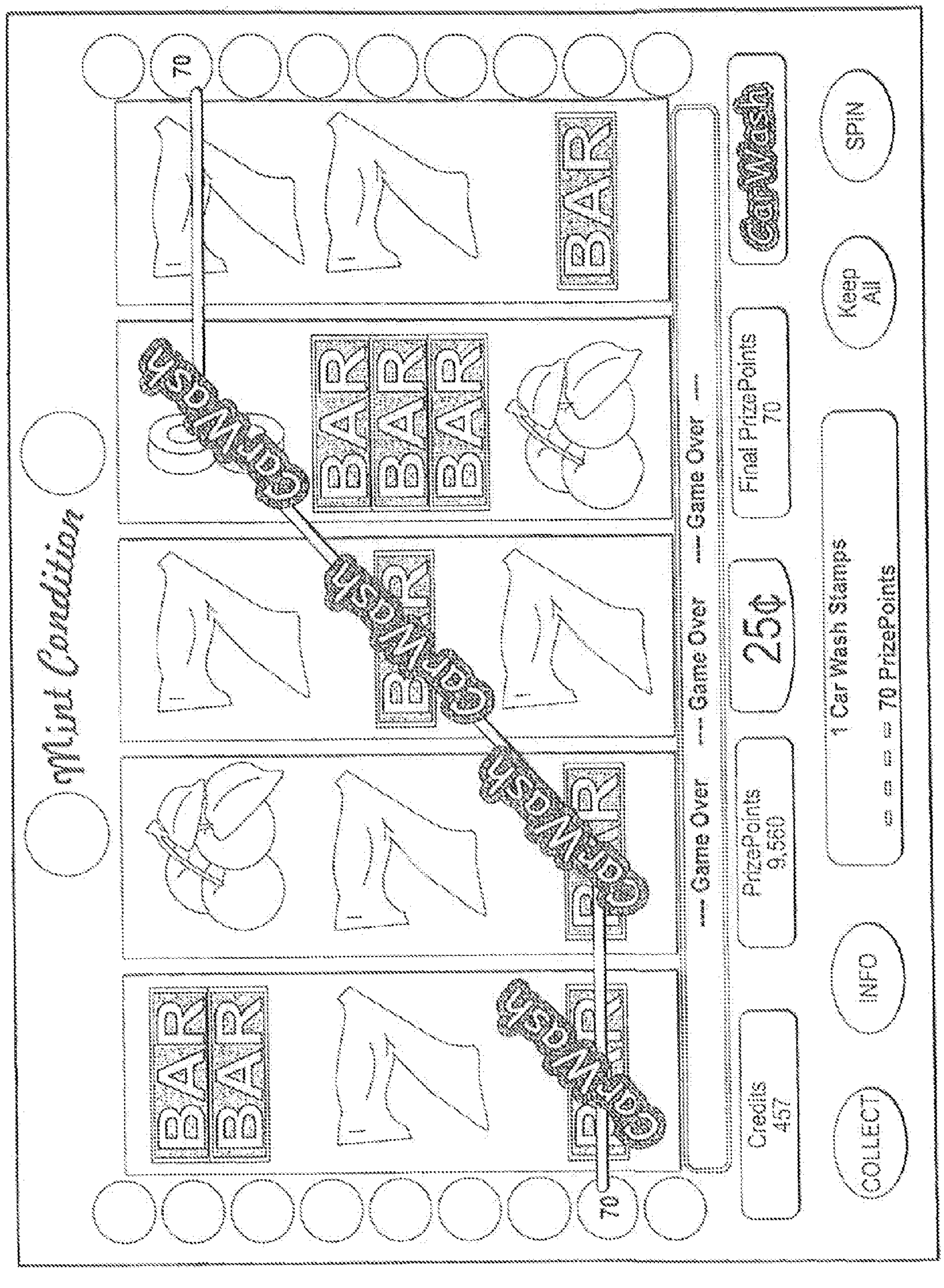
FIG. 38B is an illustration of a playfield of a multi-reel game showing bonus round car wash stamps being earned in a primary game in addition to a primary game prize award.

FIGS. 38A-38B illustrates a playfield of a multi-reel game with a "car wash" bonus round. More particularly, FIG. 38A is an illustration of a playfield of a multi-reel game showing bonus round ear wash stamps that have been earned, set forth by way of example and not limitation. FIG. 38B is an illustration of a playfield of a multi-reel game showing exemplary bonus round car wash stamps being earned in a primary game in addition to a primary game prize award.

Figure 38C:
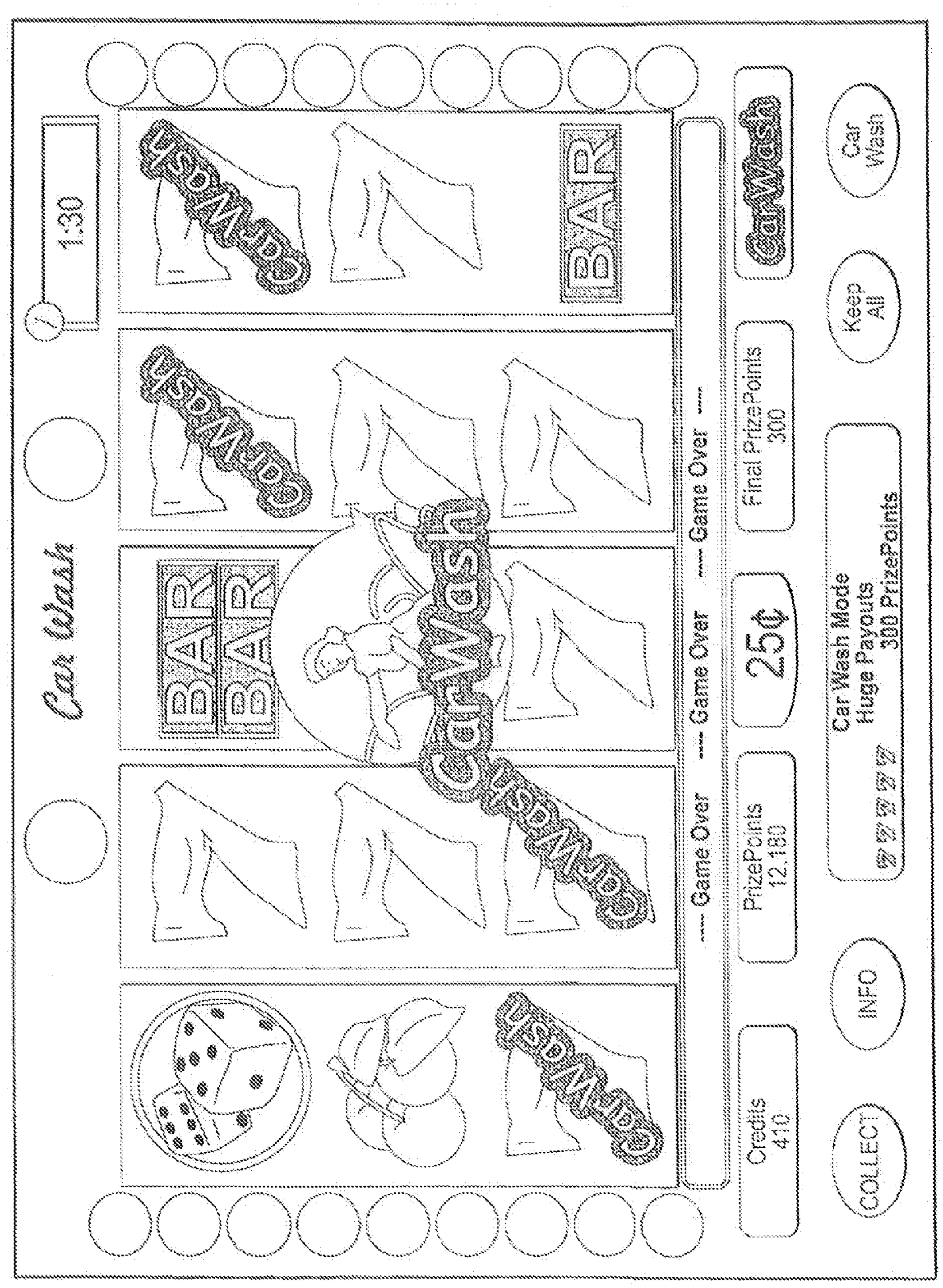
FIG. 38C is an illustration of a playfield of a multi-reel game showing a bonus round being earned by collecting all car wash stamps.
Figure 38D:
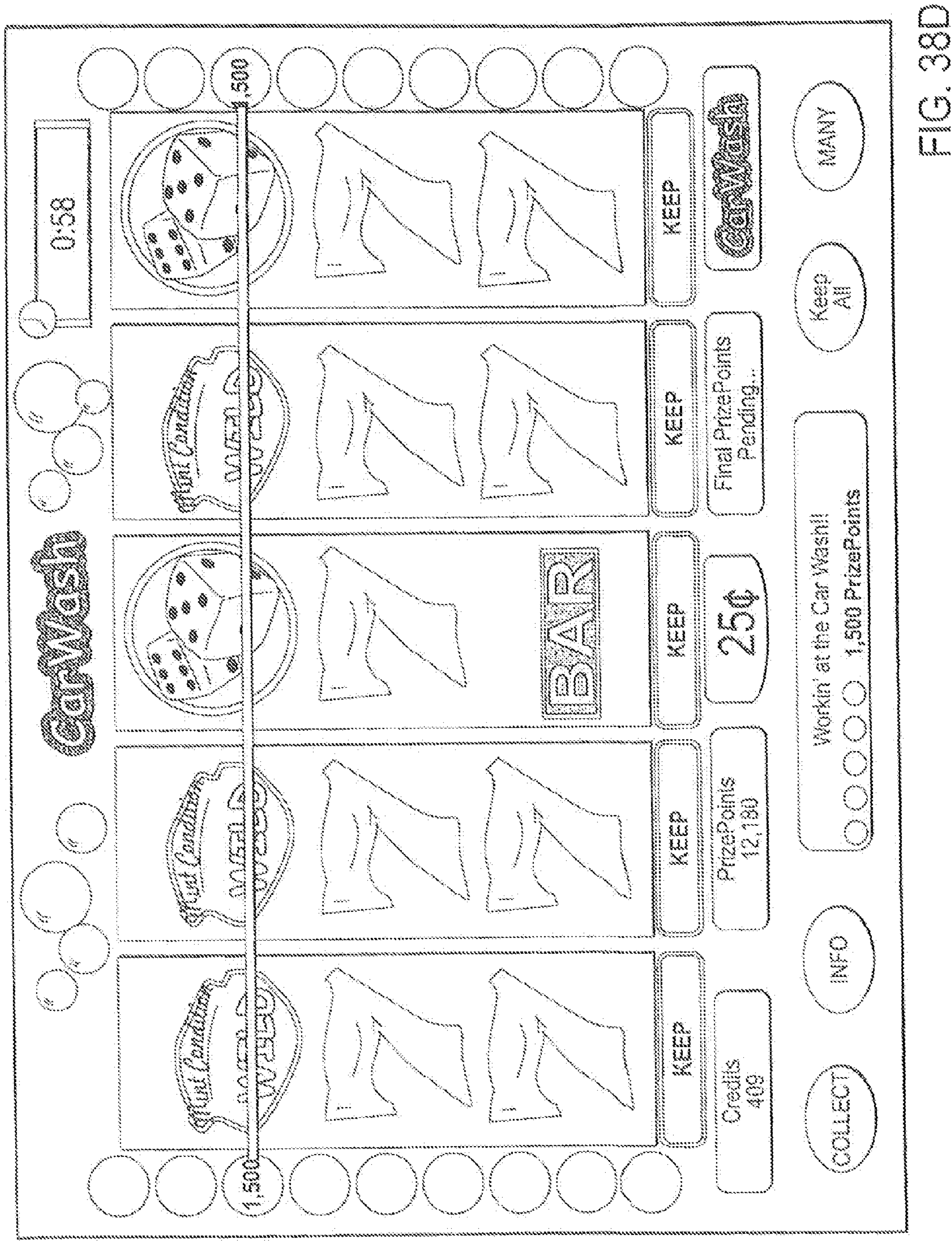
FIG. 38D is an illustration of a playfield of a multi-reel game showing a bonus round being played with a bonus round timer and unlimited re-spins button visible.

FIGS. 38C-38D is an illustration of a playfield of a multi-reel game showing a bonus round being earned by collecting all car wash stamps, by way of example but not limitation. FIG. 38D is an illustration of a playfield of a multi-reel game showing a bonus round being played with an exemplary bonus round timer and an exemplary unlimited re-spins button visible.

According to yet another non-limiting exemplary embodiment, given by way of example and not limitation, a "Touching the prize lines" feature is provided to give aid in remembering what the lines are in the game to help in the skillful play by a player.

Another non-limiting exemplary embodiment includes a "skill meter" which provides feedback as to a player's level of skill. The skill meter provides a form of entertainment, and as will be appreciated by those skilled in the art, it gives a game long term earnings potential. For example, by challenging the player to develop his skill to the point where he plays with optimal hold strategy, the player plays for player status in order to gain satisfaction and recognition as a skilled player as evidenced by a high skill meter reading. The time taken to improve one's skill represents profit potential for the game. This non-limiting exemplary embodiment is given by way of example and should not be construed as limiting.

In still another non-limiting exemplary embodiment, given by way of example and not limitation, "help pages" are included which contain information useful for a player to learn basic skills, or to refine one's skill level. For example, the help pages may contain the "symbol distribution" on each reel strip. This is an aid for advanced players to improve their skill. Based on this information, advanced players can calculate their own probability of the getting their desired symbol. An example of a table of symbol distributions can be found at FIG. 35.

In a still further non-limiting exemplary embodiment, a "pay highest line only" feature is included to provide a quick "poker" like experience in the context of a skill reel spinner game. A player can in just a few seconds find the best hold out of all of the available paylines or prizelines. He doesn't have to analyze multiple lines to build the best combination of lines to give the highest payout. This is extremely complex for a person to do and would burden the player too much. This non-limiting exemplary embodiment gives the advantage of is given by way of example and not limitation.

In certain non-limiting exemplary embodiments, it is possible to modify the game machine based upon player ID. After a player logs in successfully the games, the game settings, the available prizes, the available prize categories, and the advertisements that are appropriate for him may be changed. The gaming content may also be changed for the geographic location of the player, for location ID of the gaming facility, for players age, for the players demographic profile, for gaming legal jurisdiction, and for the special player preferences. In a further non-limiting exemplary embodiment, the system as described herein can be deployed on alternate gaming devices including but not limited to: cell phones, PDAs, home computers, browser base games sites, home game consoles from Microsoft, Nintendo, Sony, and others, arcade machines, casino games, in room gaming, WI-FI enabled devices, handheld game consoles, etc. . . .

According to certain non-limiting exemplary embodiments, a skill game is provided wherein each move or decision made by a player is sent to a server. The skill score corresponding to these moves or decisions can be calculated on the server. The game engine may execute on the server or on the client gaming device. Each individual skill score and the cumulative skill score may be sent back to the client for viewing. Server side artificial intelligence may be used to monitor the player's moves to determine if cheating by the player is occurring. If for example the player plays too skillfully then his play may be terminated, his score modified, his account frozen or other penalties detrimental to the player or his team. Cheat thresholds of the skill score may be used to determine if player cheating or automated bots are playing the skill game. For example if the player is always making the best choice out of 32 options and he makes this skillful choice every 3 seconds and he does this 30 times in a row then statistically he is too skillful. He may be using simulation tools or bots to automatically give him the optimal move or skill decision.

According to certain non-limiting alternate embodiments, a standard arcade style ticket eating device like those made by Deltronics and Smart Industries may be utilized in addition to or in lieu of the preferred embodiment for the prize redemption center. These devices may be supplemented with a video prize selection center. As bar coded arcade tickets are feed into the machine they are tallied into a prize point account that can be used to select prizes in the prize selection center or be saved into an anonymous or player specific online account for later use of prize selection, or the tallied prize point total can be printed out on a voucher. Web based prize selection may also be used. In another embodiment the arcade tickets are validated manually by arcade personnel and the quantity or value of them are manually entered into an administration screen and applied to a specific player or group of players account. The location where these tickets are entered is billed by the prize fulfillment company for the tickets uploaded or used for prize selection. The bar coded tickets are typically unique to a location or chain of locations. Non-authorized tickets for this location are typically rejected by the ticket eating mechanism.

Figure 25:
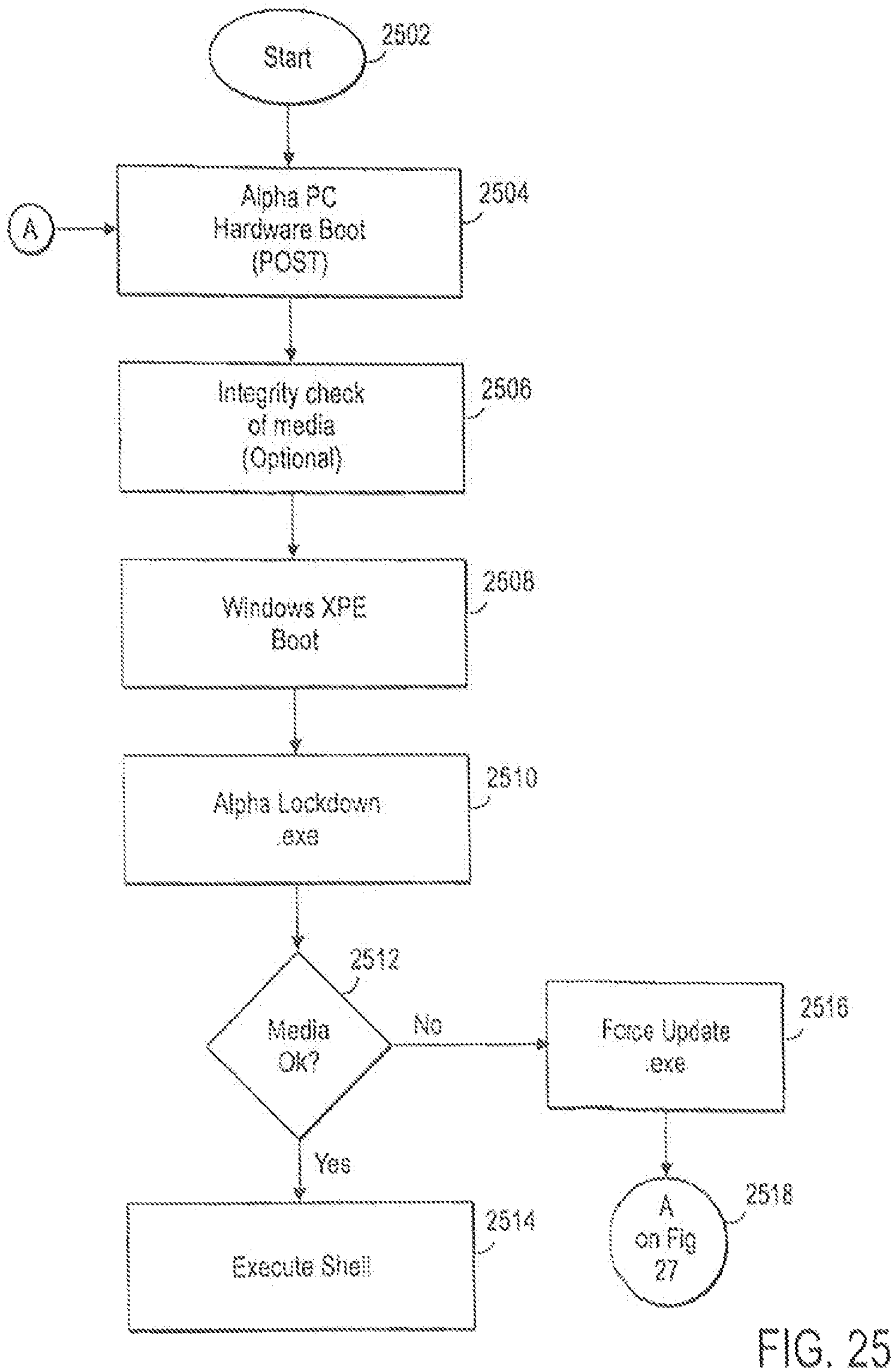
FIG. 25 is a flow diagram depicting an exemplary system process.

FIG. 25 is a flow diagram depicting an exemplary system process according to certain non-limiting embodiments. The process begins in an operation 2502 and continues with an operation 2504 which performs an Alpha PC hardware boot operation. Then, in an operation 2506, an integrity cheek of media is optionally performed. Then, in an operation 2508, an exemplary boot operation is performed. In one embodiment, Windows XPE is booted. Then, in an operation 2510, AlphaLockdown.exe is launched.

In certain non-limiting exemplary embodiments, AlphaLockdown.exe is digitally signed and has the same private key as HashResource.dll. In certain exemplary non-limiting embodiments, the following functions are performed: a hardware watchdog is pinged, the launch and process of AlphaShell.exe is monitored, the Windows Desktop is locked down with a replacement shell, backdoor access to the operating system is provided, digitally signed HashResource.dll is dynamically loaded, a Microsoft enhanced write filter management is performed, and a security dangle is read to obtain, for example, a device ID. Then, in a decision operation 2512, HashResource.dll performs an integrity check of media and verifies the OS hard drive files and NV RAM. If the integrity check of operation 2512 is successful, an operation 2514 is performed which executes a shell. If, however, the integrity check is unsuccessful, control passes to an operation 2516, which launches ForceUpdate.exe. Once ForceUpdate.exe is launched, control passes to an operation 2518, which passes control to an operation labeled as "A" on FIG. 27.

Figure 26:
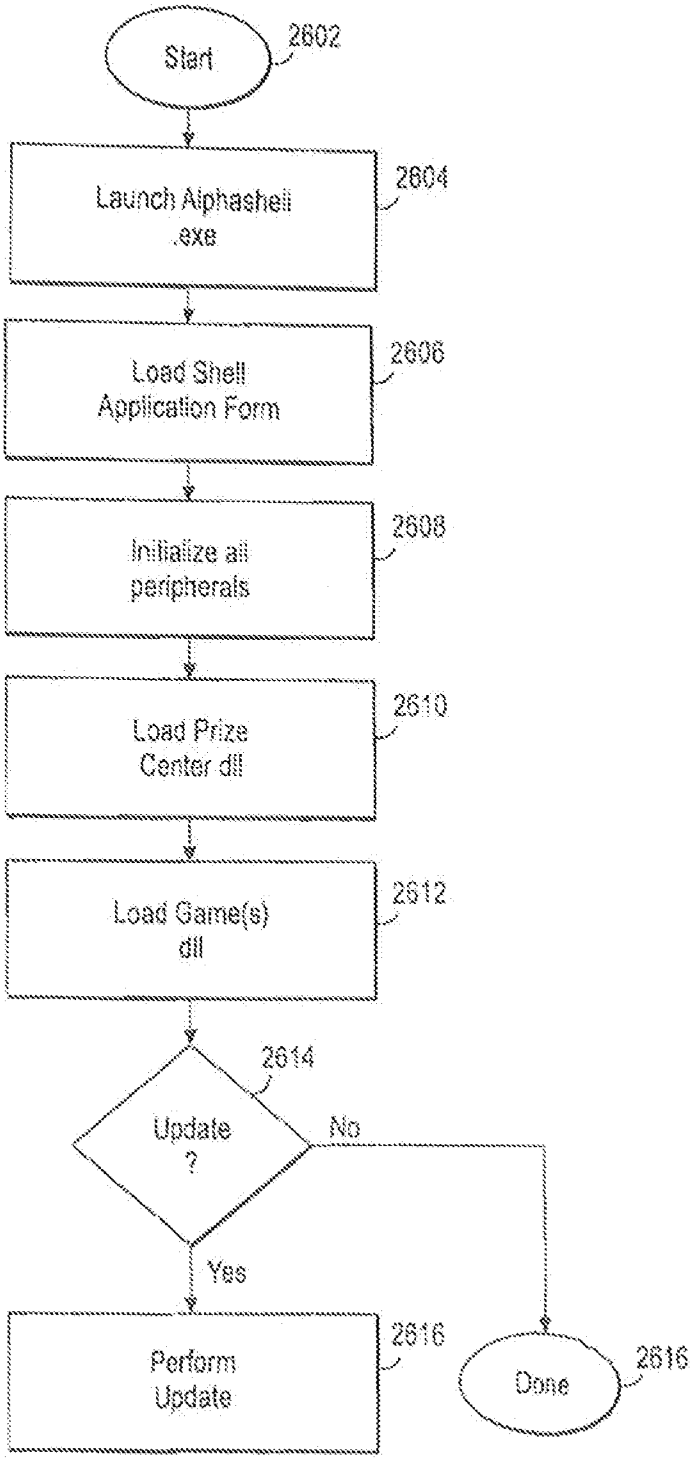
FIG. 26 is a flow diagram depicting an execute shell operation.

FIG. 26 is a flow diagram depicting an execute shell operation 2514 of FIG. 25 in greater detail. The operation begins in an operation 2602 and continues with an operation 2604 which launches Alphashell.exe. Once Alphashell.exe is launched in operation 2604, an operation 2606 loads a shell application form. Then, in operation 2608 an initialization is performed on all peripherals, such as, for example, IO, NV RAM, TITO, CARD READER, Bill Acceptor. Also various software management functions are initiated, such as, the scheduled update manager and the user inactivity manager. Then, in an operation 2610, PrizcCenter.dll is loaded. Then, in an operation 2612, one or more game DLLs is loaded. In a decision operation 2614, a check is performed to determine whether or not an update is available from a server. If an update is not available, the operation is concluded in an operation 2616. However, various processes launched up to this point continue to execute. In one exemplary embodiment, various updates are detected and downloaded by, for example, the scheduled update manager. If in operation 2614 an update is detected, then, an operation 2616 is performed to perform the update.

Figure 27:
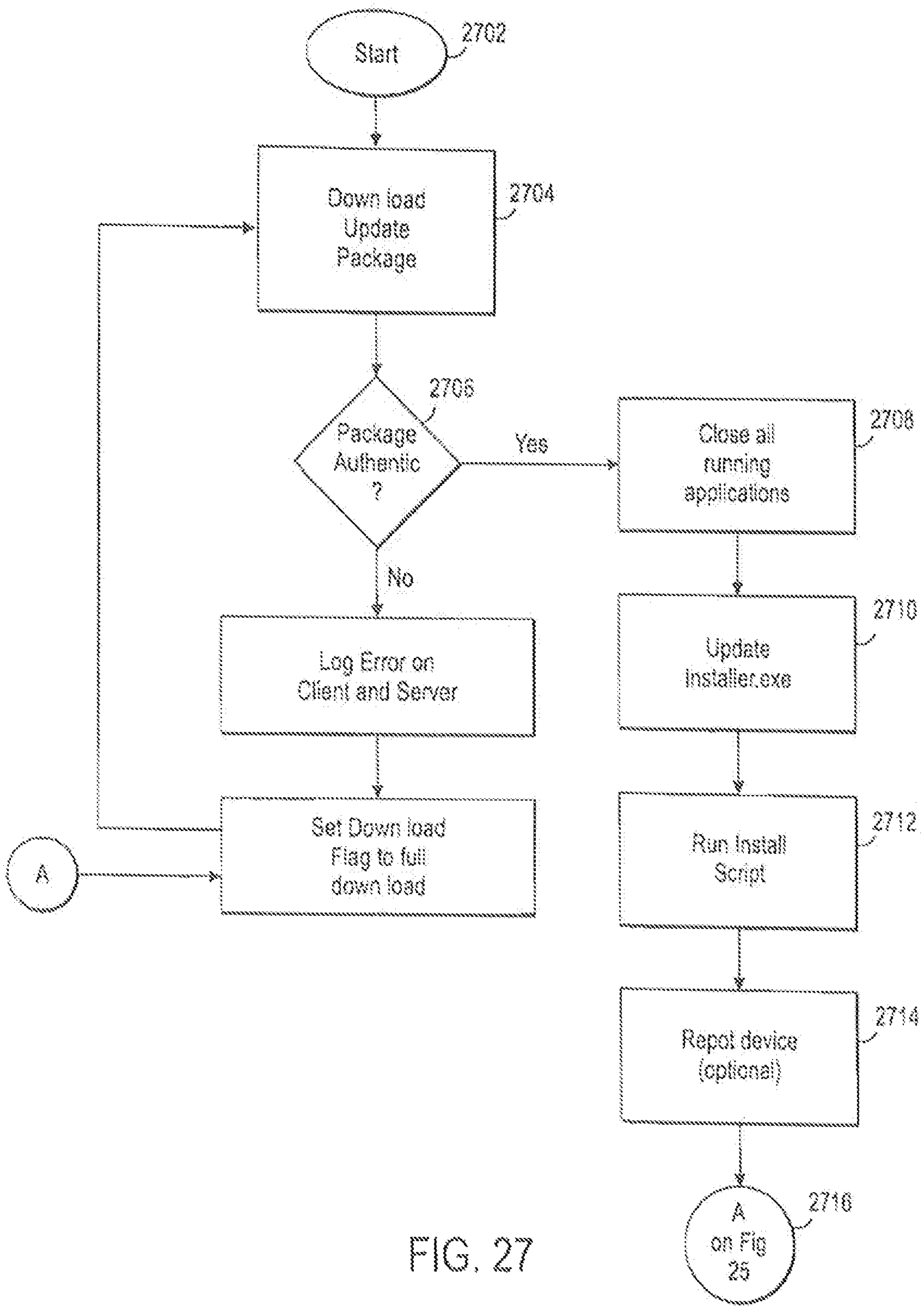
FIG. 27 is a flow diagram depicting an exemplary operation "perform update"

FIG. 27 is a flow diagram depicting an exemplary operation "perform update" 2616 of FIG. 26 in greater detail. The operation begins in an operation 2702 and continues in an operation 2704 in which an update package is downloaded. Then, in a decision operation 2706, a determination is made of whether or not the package downloaded is authentic. If it is determined in an operation 2706 that the package is authentic, control passes to operation 2708, which closes all running applications. Then, in an operation 2710. UpdateInstaller.exe is launched. Once UpdateInstaller.exe is launched in operation 2710, an install script is run in operation 2712. Then, in an operation 2714, an optional reboot of the device is performed. Other exemplary embodiments do not reboot the device. Then, in an operation 2716, control is passed to operation 2504 of FIG. 25.

Figure 28:
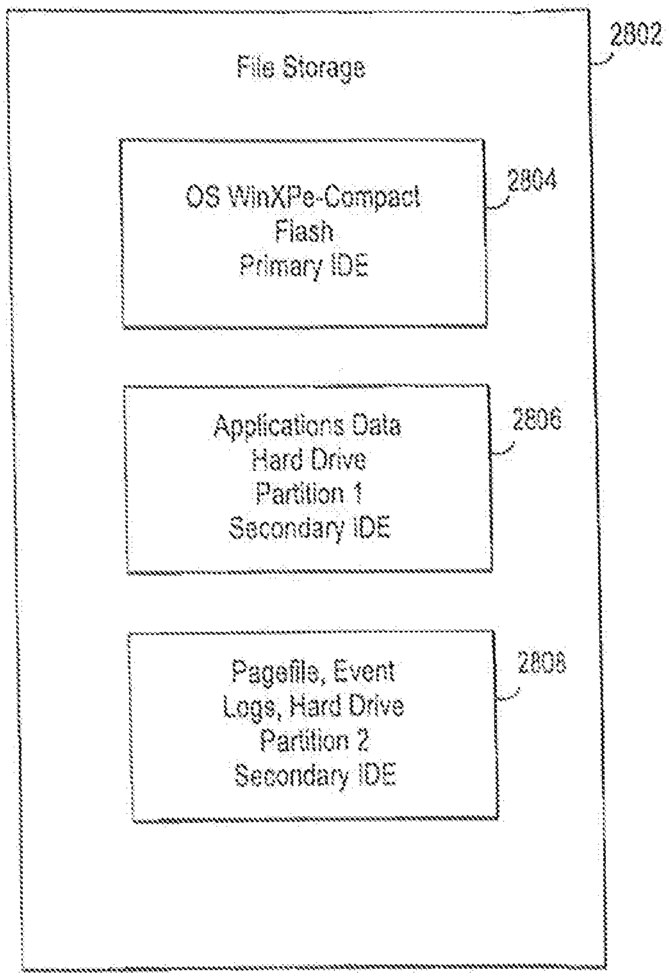
FIG. 28 is a block diagram depicting a file storage.

FIG. 28 is a block diagram depicting a file storage used in the processes of FIGS. 25, 26 and 27. Various files are stored in non-volatile file store 2802. One non-limiting example of files stored in file store 2802 is file group 2804, which stores, for example, OS WinXPe-Compact, Flash, Primary IDE. Another non-limiting example is file group 2806, which stores applications data, hard drive partition one, and secondary IDE. Yet another non-limiting example, is file group 2808, which stores, for example, a page file, event logs, hard drive partition two, and secondary IDE.

Figure 29:
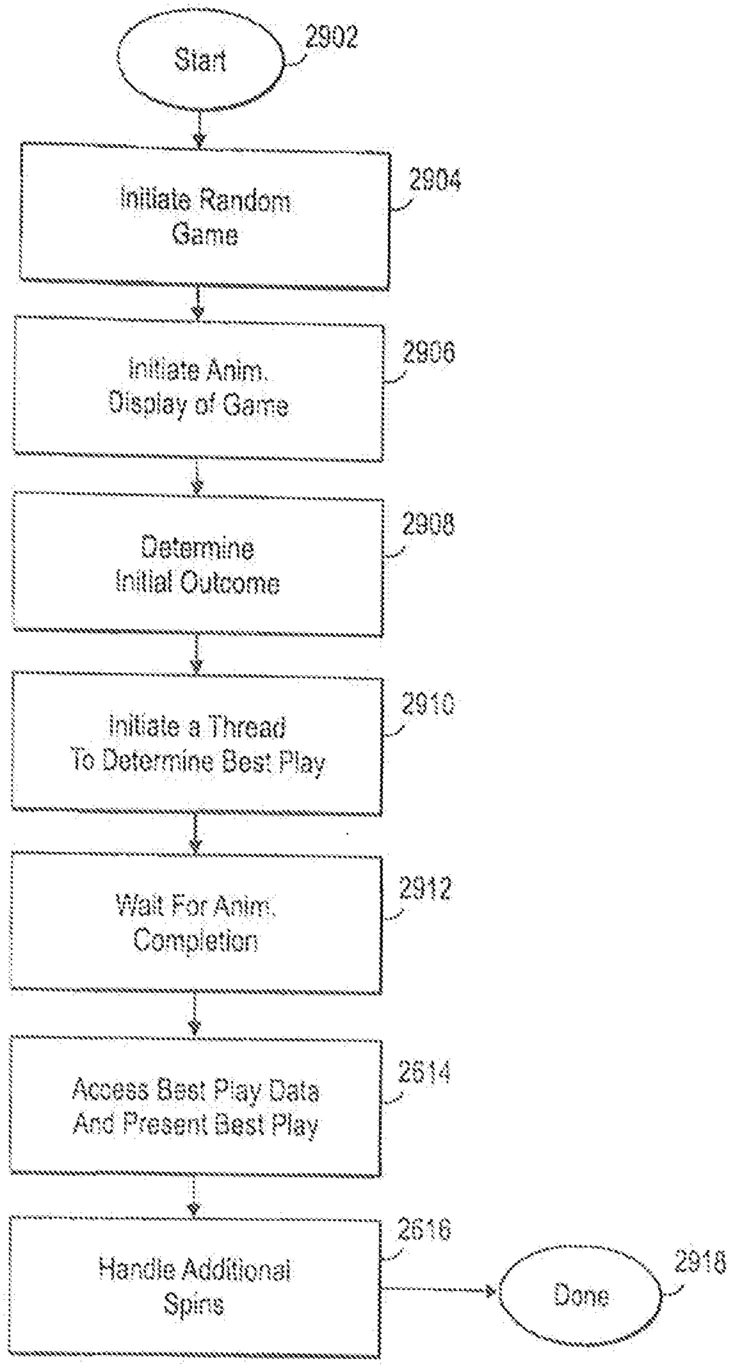
FIG. 29 is a flow diagram depicting a play recommendation operation.

FIG. 29 is a flow diagram depicting a play recommendation operation. The operation begins in an operation in 2902 and continues in an operation 2904, which initiates a random game, such as, for example, generating random values for the various symbols of multiple reels in a casino game. An operation 2906, initiates an animation display of the game. This operation could, for example, initiate a thread that handles the animation portion of presenting a game to a user. Alternative embodiments include the actual spinning of physical reels, An operation 2908 determines an initial outcome of the game initiated in operation 2904 and displayed in operation 2906. An operation 2910 initiates a thread to determine the best play given the initial outcome of operation 2908. This thread could, for example, communicate with a remote server to obtain best play data for this particular outcome or, in an alternative embodiment, perform a dynamic Monte Carlo simulation based on the initial outcome. If the best play is determined by communicating with a database it is possible to access a distributed database which may comprise multiple servers, or, alternatively, multiple game systems that are networked together, or, a combination of both. A federated search could be used to query the aggregate database stored in these distributed machines. Once operation 2910 has initiated a thread to determine the best play, control passes to operation 2912 which waits for the completion of the display initiated in operation 2906. It is contemplated that during the animation, the communications for dynamic simulation can be performed. Once the display of the game is completed, an operation 2914 accesses the best play data and presents the best play to the user. This is done by communicating with the thread initiated in operation 2910 which is either communicating with other servers, or dynamically simulating the game to determine the best play. These exemplary embodiments are given by way of example and not limitation. An operation 2916 handles additional spins by the user by allowing him to, for example, freeze certain reels and re-spin others. It should be noted that the user does not have to follow the best play presented in operation 2914. Once the additional spins are completed and any awards given, the operation is concluded in an operation 2918.

Figure 30:
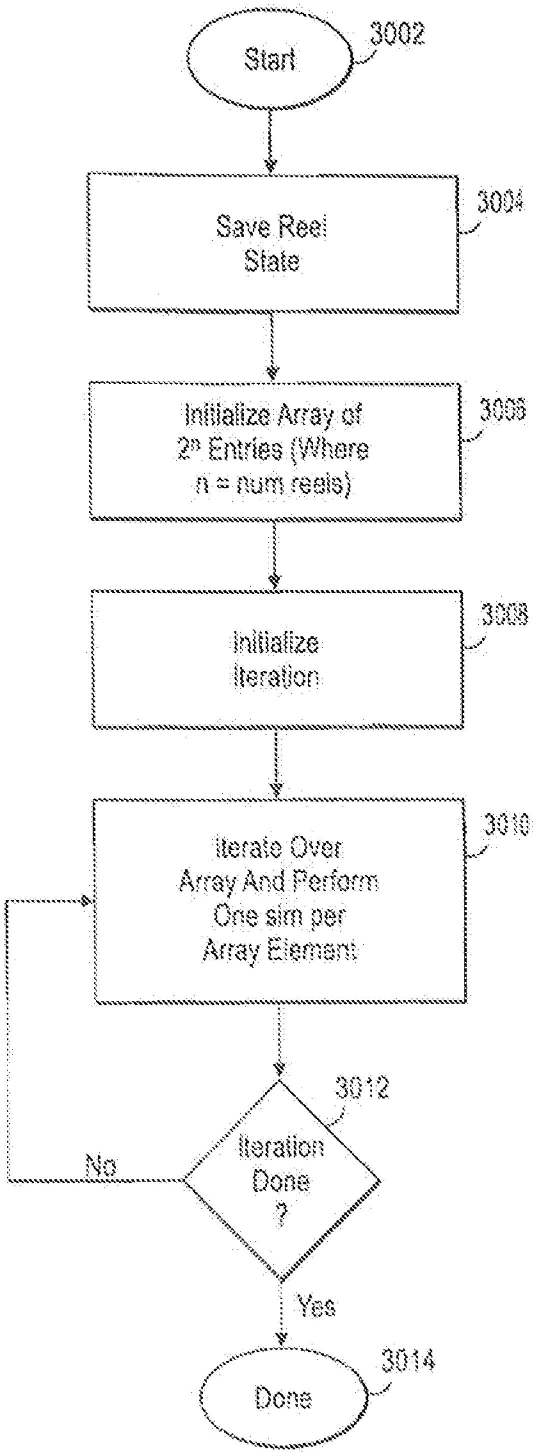
FIG. 30 is a flow diagram depicting an exemplary operation to determine best play.

FIG. 30 is a flow diagram depicting an exemplary operation to determine best play as depicted in operation 2910 of FIG. 29. The operation begins in an operation 3002 and continues in an operation 3004, wherein a reel state is saved for future reference. Then, in an operation 3006, an array of $2^n$ entries is initialized (where n is equal to the number of reels). These entries represent all possible hold decisions for the various reels of the game. The results of one or more Monte Carlo simulations for each entry are accumulated or stored in this array. An operation 3008 initializes an iteration to perform one or more Monte Carlo simulations for each element of the array. Then, in an operation 3010, a nested iteration over each element of the array is performed wherein a single game simulation is performed per each array element. Thus, in operation 3010 a single possible outcome is determined for each possible hold decision. Then, in a decision operation 3012, a determination is made as to whether the iteration initiated in operation 3008 is completed. In one non-limiting exemplary embodiment the determination of completion is made by determining whether or not a signal has been received from operation 2914 of FIG. 29. If such communication has been received, it indicates that no time remains to perform Monte Carlo simulation. If operation 3012 determines that the iteration is not completed, control passes back to operation 3010, which performs another simulation for each array element. If, however, it is determined in operation 3012 that the iteration is completed then, the operation is concluded in operation 3014.

Figure 31:
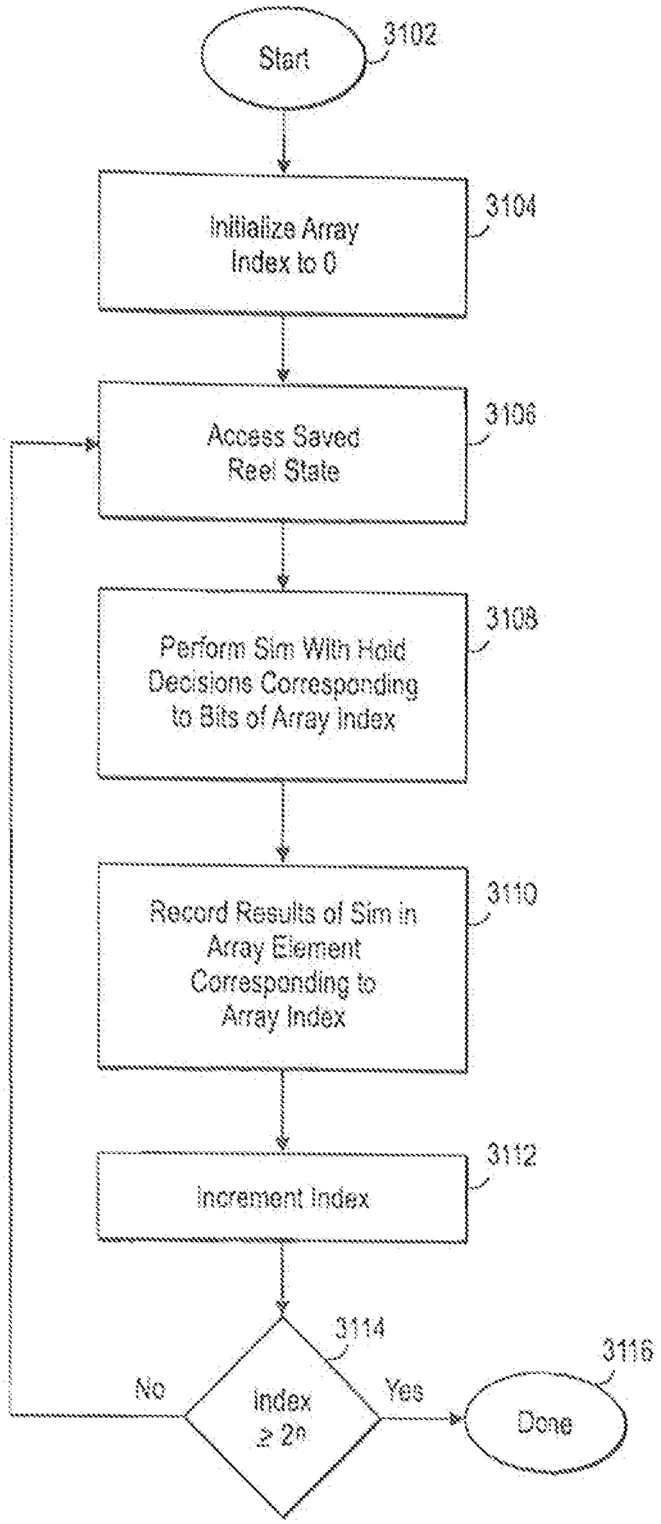
FIG. 31 is a flow diagram depicting an operation to iterate over an array and perform one simulation per array element.

FIG. 31 is a flow diagram depicting an operation to iterate over an array and perform one simulation per array element 3010 of FIG. 30 in greater detail. The operation begins in an operation 3102 and continues in an operation 3104 wherein an array index is initialized to zero. Then, in an operation 3106, the reel state saved in operation 3004 of FIG. 30 is accessed. Then, in an operation 3108, a simulation is performed with hold decisions corresponding to the bits of the array index. Since the number of elements in the array is a power of 2, the number of bits needed to store this number is equal to the number of reels. Naturally, in the device, more bits may be used than are needed. This operation simply converts the index into a series of Boolean values of true or false. A value of true would indicate, for example, a hold of the corresponding reel. A value of zero, on the other hand, would indicate a re-spin of that reel.

An operation 3110 records the results of this simulation in the array element corresponding to the current value of the array index. The recording of the results could be, for example, to add any simulated winnings to a counter present in said array index. Another example would be to record the actual value of the win in a sub-array contained in the array element corresponding to the value of the array index. Many other embodiments will be evident to persons of skill in the art. It is contemplated that the array, over time, becomes a statistically significant depiction of the distribution associated with the various hold decisions corresponding to the array elements. Thus, the best play corresponding to the saved reel state accessed in operation 3106 can be obtained by, for example, choosing the array element with the highest total award. An operation 3112 increments the array index, then a decision operation 3114 determines whether or not the index is greater than or equal to $2^n$. If it is determined that the index is not greater than or equal to 2$n$ control passes back to operation 3106. If, however, in operation 3114 it is determined that the index has reached $2^n$ then control is passed to operation 3116, which concludes the operation.

As will be appreciated by those of skill in the art, it is possible to perform similar calculations to those set out above to provide a measure of skill, or of luck. For example, the aforementioned array of simulation results could be sorted by award value, and then when a player chooses a set of reels to hold, his choices could be used to locate the corresponding choices in the sorted array. Thus, a linear measurement of the player's skill level is achieved. A similar measurement of a players luck can be provided. It is also contemplated that a non-linear adjustment be applied to the result so that a player is not unduly emotionally affected by being presented with a poor measurement of skill, luck, etc. These embodiments are given as non-limiting examples of a wide variety of ways in which these features may be provided.

Also it is possible to perform similar calculations in the background on one or more machines or servers in a distributed fashion. These calculations could, for example be broken into "work units" to be processed by the various machines and servers in a "grid" of computers. The work units are distributed among the computers, and the results are stored in either a centralized or distributed fashion. One example of a way in which the work units could be divided is to consider the "reels" to be a series of digits in a number. The number of symbols on a reel corresponds, in this example, to the "radix" of the number. Numbers in this set of numbers would then correspond to initial spin results. The number space could be subdivided into range segments, and distributed. The results of the calculations could then be analyzed as previously discussed.

Figure 32:
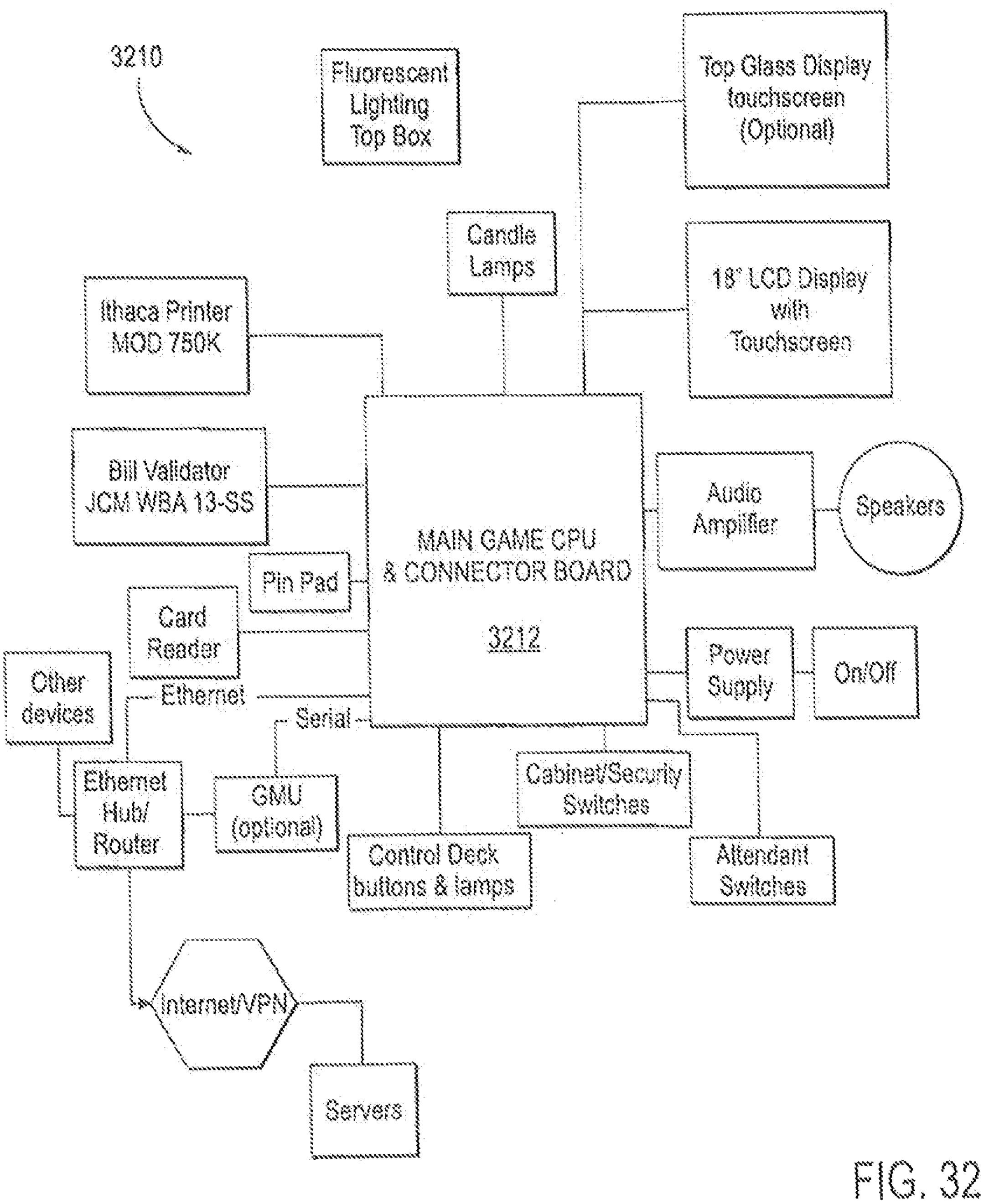
FIG. 32 is a block diagram of an exemplary digital processor for a game.

FIG. 32 is a block diagram of an exemplary digital processing system 3210 for a game. More particularly, the digital processing system includes a main game CPU and connector board 3212 to which a number of peripherals are coupled. It will be appreciated that the architecture of the main game CPU and connector board 3212 is very similar to the architecture for a personal computer motherboard. In many cases the CPU is an industry standard CPU provided by Intel Corporation, Advance Micro Devices (AMD), or others.

The peripherals illustrated in FIG. 32 are particularly selected for the game and gaming environment, but other peripherals can also be used, as will be appreciated by those skilled in the art. For example, read-only and read/write mass storage (e.g. optical disks, magnetic disks, flash memory, etc.) can also be coupled to the main game CPU and connector board. The illustrated peripherals (which are non-limiting as explained above) include a printer, a bill validator, a card reader, a PIN pad input device, candle lamps, florescent lighting, audio amplifier, speakers, LCD displays, power supplies, main game CPU or computer, cabinet security switches, attendant switches, control deck buttons and lamps, touch screen controller, Game Monitoring unit (GMU), Ethernet hub/router, other devices.

Figure 33:
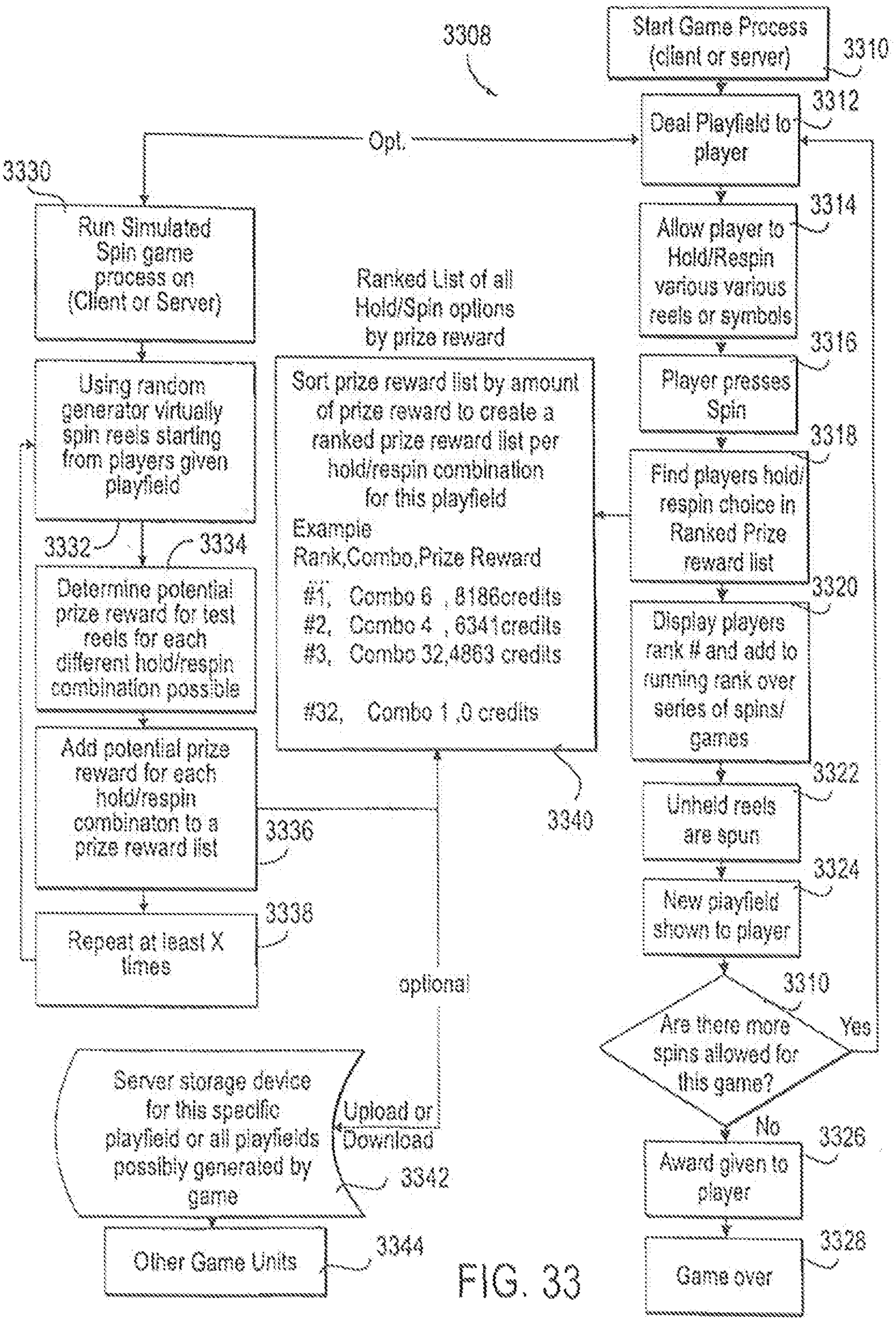
FIG. 33 is a flow diagram of an exemplary game process which can calculate a player's skill rank.

FIG. 33. is a flowchart of a game process in an exemplary embodiment. Briefly, in this exemplary embodiment, a player is given an initial playfield and is then allowed to make a skill determination or choice as to which reels to hold/spin. An optional simulated game process is running in a separate process and is preferably non-visible to the player. The simulated game process is building a ranked list of all hold/spin combinations by prize reward level starting with this initial playfield. A player's chosen hold/spin combination is found in the ranked list and the rank or index number is shown to the player as a skill rank. This shows the player how optimal the chosen hold/spin combination is as compared to the other options available prior to the spin.

In an optional embodiment the ranked list of all hold/spin options for given playfield may exist at the server and the players choice is compared at the server. In other embodiments the list may be downloaded from the server to the players gaming device for comparison on the device with the players choice.

More particularly, FIG. 33 is a flowchart of an exemplary game process which can calculate a player's skill rank. The process 3308 begins at 3310 and a playfield is dealt at 3312. At 3314, a player is allowed to hold and re-spin various reels or symbols. At 3316, the player presses the "Spin" button. Operation 3318 finds the player's hold/re-spin choice in a Ranked Prize reward list. An example of the Ranked Prize reward list can be seen at 3340. An operation 3320 displays the player's rank number and adds to his running rank over a series of spins and/or games. Unheld reels are spun at by act 3322. A new playfield is shown to the player at 3323, and a decision operation 3324 determines if there are more spins allowed for the current game. If yes, process control is transferred to operation 3312 and, if no, an award is given to a player at 3326, with the game being over at 3328.

Optionally, virtual games can be run in the background to obtain additional information concerning optimal game play. This option begins at 3330 where a simulated spin game is run on either the game unit or a server with which the game unit can communicate. In an operation 3332, a random generator (true random or pseudo-random) is used to virtually spin reels based upon the player's given playfield. The potential prize reward for test reels for each different hold/re-spin combination is determined in operation 3334, and the gathered information is added to the Ranked List 3340 by operation 3336. The process 3338 repeats operations 3332-3336 for a number of times.

Also optionally at 3342 a server storage device for the current playfield and/or all playfield that could possibly be generated by the current game is either uploaded or download to the Ranked List 3340. The database stored at the server can also be shared with other game unites by operation 3344.

FIG. 34A-34E are exemplary screen displays depicting a prize order fulfillment application which may be utilized to process prize orders that have been received after a player redeems prize points for merchandise or service related prizes. This application can, for example, can aggregate different orders from many players that came in throughout the day and optimally generate the fewest purchase orders with multiple prize vendors. The application, in an exemplary embodiment, may track the entire order process from beginning to end. Vendors can send package tracking information back into the application including vendor fulfillment status information.

In an exemplary embodiment, each item in every order is preferably uniquely tracked and can be shipped at different times from different vendors. When items are backordered alternate vendors can be chosen within this application. The player who placed the original prize order will be able to check on the order status information throughout the order cycle. This can be done at the gaming device, a web portal, a prize order kiosk, a 1-800 phone number, by e-mail or any other device capable of accessing the order status applications database. E-mails are, in an exemplary embodiment, automatically generated and sent to the player who placed the prize order as each item is shipped.

FIG. 35. is a chart showing an exemplary symbol distribution on each reel of the skill reel amusement machine. This is shown to the player in the help screens as an aid to help determine the optimal hold/re-spin strategy for the player. The player can calculate the probability of each symbol coming up in a specific reel to help decide which reels to spin or hold.

FIG. 36. is a diagram showing an operator setup menu on the amusement machine for checking for software updates. The operator can manually check for update to see if there is an available update and a schedule can be setup to automatically do the update at a specific time. The Force Update feature will force an update to occur with the latest software available for this game device even if the device believes it is up to date. In this example the check for updates button was pressed and no updates are available.

FIG. 37 is a diagram showing an operator setup menu on the amusement machine for checking for software updates. In this example a new version is available and is downloaded to the gaming device. The actual installation of the software can be done immediately or delayed until a scheduled time on the game device or as instructed from the download server.

FIG. 38A-38D are exemplary screen displays of a user interface associated with the timed bonus round. A player, by way of example and not limitation, can earn bonus round "car wash" stamps by playing a primary game. In the preferred embodiment if the player earns a winning combination that is of high enough level then the player also earns car wash stamps. When the player has achieved enough car wash stamps then they enter the timed bonus round (Car Wash round). The timed bonus round may have the same reel set as the game in normal mode or may have a completely new reel set with different probability of each winning combination appearing. Also the pay table for winning combinations may be different from the normal game.

Once in the Car Wash round a player is presented with a timer in the upper right corner of the screen. Once the player commences play by spending his first credit in the bonus round, the timer will begin to count down from its initial value. In an exemplary embodiment the player is given unlimited re-spins to continue to improve this playfield to get the highest possible reward. In other exemplary embodiments a player is given a fixed number of spins in the bonus round. The fixed number is normally larger than the amount given for a game in normal mode.

During play in the timed bonus round the player will have to decide when it is better to start with a new initial playfield by starting a new game or continue trying to improve the existing playfield. The clock running down creates a sense of urgency for the player to make a decision to either hang in their or to move on to the next game. Once the player decides to "Keep All" of the reels, that specific game concludes in the timed bonus round.

To begin the next game in the timed bonus round the player must use another game credit, in this exemplary embodiment. The player will continue to get unlimited spins in the timed bonus round as long as the timer is larger than zero. If the timer becomes zero while a spin is in progress the game is allowed to finish spinning the reels and the resulting playfield is judged for any prize award Once the timed bonus round concludes and after final prize awards are given then the game returns to the normal game mode of play.

Certain non-limiting exemplary embodiments include a method for playing a game comprising initiating a game play, displaying a first plurality of indicia arranged in a plurality of rows and a plurality of columns such that there are a plurality of paylines through a contiguous plurality of indicia, selecting a subset of the first plurality of indicia taken along one or more columns, displaying a second plurality of indicia which includes the selected subset of the first plurality of indicia, achieving an award at least as large as the largest award associated with the plurality of paylines. A payline can be selectively displayed to the user. Legal tender, a token, and a non-legal tender prize are non-limiting examples of the kinds of awards that may be awarded. The columns of indicia for the game are, for example, arranged as visually spinnable reels. In certain embodiments a video display may be utilized to display the indicia.

Further non-limiting exemplary embodiments include initiating a game in exchange for a monetary value wherein the monetary value may be derived from a legal tender, or derived from a token representing monetary value. Some examples of a token include a non-electronic token, or an electronic token.

In some cases, the display of a first plurality of indicia includes a randomization of indicia for their selection to be displayed, and may further include providing the randomization by either random selection or pseudorandom selection. Still further an inverse relationship between the size of an award associated with a payline and the likelihood of a selection of a set of indicia associated with the payline is disclosed. In certain embodiments, it is optional to select and display a second subset of indicia and an award may be achieved based on the first plurality of indicia, rather than on a subsequent subset.

An additional non-limiting exemplary embodiment includes a method for playing an enhanced game comprising, initiating a game play, displaying a plurality of indicia arranged in a plurality of rows and a plurality of columns such that there are a plurality of paylines through a contiguous plurality of indicia and providing a game enhancement when the indicia along at least one of the paylines are of a predetermined pattern. Some non-limiting examples of a game enhancement include a bonus award, extended play, additional play and a first award payable in a current game play, and an additional award payable in at least one additional subsequent game play.

Still further exemplary embodiments include a method for playing a game comprising initiating a game play, displaying a plurality of indicia arranged in a plurality of rows and a plurality of columns such that there are a plurality of paylines through a contiguous plurality of indicia, and providing feedback concerning the play of the game. Some non-limiting examples of feedback include an indication of a level of success in playing the game, advice on how to play the game, which may be derived from an analysis of previous game play, which may include background game play not visible to a user.

Certain non-limiting exemplary embodiments are taught which include a game comprising, a digital processor, digital storage coupled to the digital processor for storing instructions, a display coupled to the digital processor displaying a first plurality of indicia arranged in a plurality of rows and a plurality of columns such that there are a plurality of paylines through a contiguous plurality of indicia, a user interface coupled to the digital processor to select a subset of the first plurality of indicia taken along at least one column and to initiate a display of a second plurality of indicia which includes the selected subset of the first plurality of indicia on the display, and an award dispenser providing an award which is at least as large as the largest award associated with the plurality of paylines.

The digital processor may include a microprocessor, and wherein the digital storage includes a read-only memory. The user interface includes a monetary interface and a game play interface. The monetary interface accepts for example, legal tender or a token (which may be, for example, a non-electronic token, or an electronic token). In some embodiments, the token may be, for example, a ticket including printed indicia, or an electronic token. The award dispenser dispenses, for example, legal tender, a token, which may be, for example, a non-electronic token, a ticket including printed indicia or an electronic token.

Further non-limiting exemplary embodiments include a game comprising means for initiating a game play, means for displaying a first plurality of indicia arranged in a plurality of rows and a plurality of columns such that there are a plurality of paylines through a contiguous plurality of indicia, means for selecting a subset of the first plurality of indicia taken along one or more columns, means for displaying a second plurality of indicia which includes the selected subset of the first plurality of indicia, and means for achieving an award at least as large as the largest award associated with the plurality of paylines.

In some embodiments, the game may be initiated in exchange for a monetary value. The columns of indicia may be arranged as visually spinnable reels. The display may be, for example, a video display or a mechanical display. Some embodiments provide means for selectively displaying a playline. The means for displaying of a first plurality of indicia may include means for a randomization of indicia for their selection to be displayed. The randomization may be, for example, provided by at least one of random selection and pseudorandom selection.

Still further exemplary embodiments disclosed herein include an enhanced game comprising means for initiating a game play, means for displaying a plurality of indicia arranged in a plurality of rows and a plurality of columns such that there are a plurality of paylines through a contiguous plurality of indicia, and means for providing a game enhancement when the indicia along at least one of the paylines are of a predetermined pattern. The game enhancement may include, for example, a bonus award, extended play, or additional play, means for paying a first award in a current game play, and means for paying an additional award in at least one additional subsequent game play. These examples are given by way of non-limiting example.

Certain embodiments include a game comprising means initiating a game play, means displaying a plurality of indicia arranged in a plurality of rows and a plurality of columns such that there are a plurality of paylines through a contiguous plurality of indicia, and means providing feedback concerning the play of the game, which may include an indication of a level of success in playing the game or advice on how to play the game. The advice may be derived from an analysis of previous game play. The previous game play may include background game play not discernable to a user.

Certain non-limiting exemplary embodiments include a game system comprising a wide area network, a game unit coupled to the wide area network and capable of uploading game data concerning game play, and a server coupled to the wide area network and capable of receiving the game data and storing the game data in a database with other game data. According to certain non-limiting exemplary embodiments, the wide area network is the Internet. Encryption may be used to protect game data before it is uploaded. The game unit may be, for example, directly coupled to the Internet via an Internet Service Provider, or coupled to a local area network which may be coupled to the wide area network.

In some exemplary embodiments, the server performs an analysis of the game data stored in the database. The server may download, according to certain non-limiting exemplary embodiments, at least one of data and executable code to the game unit as a result of the analysis. The game unit may be one of a plurality of game units, each of which may be coupled to the wide area network and capable of uploading game data concerning game play to be stored in the database of the server.

In further non-limiting exemplary embodiments, the plurality of game units may be coupled to a local area network, which may be coupled to a wide area network. The local area network may be one of a plurality of local area networks which are coupled to the wide area network, where each of the local area networks includes a plurality of game units. The server may perform an analysis of the game data stored in the database.

According to certain embodiments, the server downloads at least one of data and executable code to at least one of the plurality of game units as a result of the analysis. The server may download game software updates to at least one of the plurality of game units. The server may download, for example, award information related to game play to at least one of the plurality of game units, game data to at least one of the plurality of game units, game parameters to at least one of the plurality of game units. The server may be one of a plurality of servers. The database may be a distributed database. The game play may be, for example an actual game play with a user of the game unit or a virtual game play independent of a user of the game unit.

Further non-limiting exemplary embodiments include a method for providing feedback to multiple game system comprising, accumulating game data concerning game play from a plurality of game systems to create a game data database, analyzing the game data database and updating at least one of the plurality of game systems based upon the analyzing the game data database.

Still further non limiting exemplary embodiments include a game system comprising means for accumulating game data concerning game play from a plurality of game systems to create a game data database means for analyzing the game data database, and means for updating at least one of the plurality of game systems based upon the analyzing the game data database.

Exemplary Methods

It will be appreciated from the foregoing that there are a number of explicit and implicit methods disclosed herein. The following examples are set forth to by way of illustration of exemplary embodiments, and not for the purpose of limitation.

Method 1—A Method for Playing a Game

In an exemplary embodiment, a method for playing a game includes: initiating a game play; displaying a first number of indicia arranged in a number of rows and a number of columns such that there are a number of paylines through a contiguous number of indicia; detecting the selection of a subset of the first number of indicia taken along one or more columns by a player; displaying a second number of indicia which includes the selected subset of the first number of indicia; and achieving an award equal to the largest award associated with a single payline of the number of paylines to limit the award to a predetermined maximum value.

As used herein, a "game play" includes the interaction of a player with an apparatus or system related to playing a game. Indicia can come in many varieties and forms, including numbers, words, symbols (e.g. fruit symbols), and others. By way of example and not limitation, in FIG. 6 a number of indicia are shown including "Wild", 7, 77, BAR/BAR, cherry, etc. A "payline" is a straight or crooked line associated with adjacent indicia (whether it be horizontal, vertical, diagonal or other) which is used to indicate a pattern of indicia, including a pattern of indicia which allows for a prize or award. For example, FIG. 6 shows a "V" shaped payline. By "subset" of indicia it is meant a set of indicia (second number of indicia) selected from another set of indicia. The selected "subset" can have none, some or all of the indicia from the first set. By "plurality" it is meant more than one, i.e. two or more.

In certain exemplary embodiments the game is initiated in exchange for a promotional credit, while in others it is initiated in exchange for a monetary value, e.g. legal tender or a token representing monetary value. For example, the token can be a non-electronic token, such a paper ticket or a chip. The token can also be an electronic token.

In certain exemplary embodiments, the columns of indicia are arranged as visually spinnable reels. This can be accomplished with physical wheels spun, by example, stepper motors, or can be accomplished with a video display. By way of example and not limitation, the columns of indicia shown on the playfield of FIG. 6 can be considered virtual reels. As used herein, "reels" can be physical reels and/or images of reels displayed on a video screen.

In certain exemplary embodiments, there is the functionality of selectively displaying a playline. In other exemplary embodiments, the first number of indicia includes a randomization of indicia for their selection to be displayed, e.g. the randomization is provided by at least one of random selection and pseudorandom selection.

By "random" it is meant that a non-repeatable random selection is made. In contrast, a pseudorandom selection is repeatable if the starting states and randomization algorithm are known. Truly random events can be monitored (e.g. sunspot activity, monitoring ambient noise or temperature fluctuations, etc.) to provide a basis for true random selection. Sometimes, both random and pseudorandom techniques are used to generate random selection.

Embodiments of the game can include at least an element of skill. In other embodiments the game can include at least an element of chance. In many embodiments, both an element of chance and an element are present. In certain embodiments, awards and/or prizes can be won by a player for skillful play. While "awards" and "prizes" can overlap, as used herein an "awards" is some type of non-merchandize, such a game play, a token, a ticket, money, etc. A "prize" will be referred to as physical merchandize. However, at times the terms may be used interchangeably.

In certain embodiments, there is an inverse relationship between the size of an award associated with a payline and a likelihood of a selection of a set of indicia associated with the payline. In various embodiments, award is a legal tender, token, non-legal tender, merchandize credit. In other embodiments, multiple paylines are funded from a single wager.

Method 2—A Method for Playing a Reel-Spinning Game.

In an embodiment, set forth by way of example and not limitation, a method for playing a reel-spinning game includes: (a) initiating a reel-spinning game; (b) analyzing a skilled play by a player of the reel-spinning game; and (c) providing feedback to aid in the skilled play of the reel-spinning game to the player.

Ordinary and customary meaning is attributed to a "reel-spinning game." Depending upon the level of skill, these games may be characterized as gambling and/or non-gambling skill-games depending upon the jurisdiction. In either case, in such games a number of side-by-side wheels or "reels" were spun in a random and/or pseudorandom fashion to display different sets of indicia. In some games, the player, after an initial spin of all of the reels to create a first set of indicia, can selectively hold a reel or otherwise hold a subset of the first set of indicia before re-spinning the reels. The reels can be real (e.g. mechanical reels) and/or virtual (e.g. images on a video display).

In certain embodiments, the feedback includes an indication of a level of success to the player who is playing the game. In other embodiments, the feedback includes advice on how to play the game. In some instances, the advice is derived from an analysis of previous game play. The "previous game play" can be actual previous games played by a player and/or a "background game play" not visible to a user, i.e. run as a background process on the game and/or a game system.

In some embodiments, the feedback is context sensitive. For example, in some embodiments the feedback is tailored to the current playfield and/or game state. In other embodiments, the feedback can be selectively at least one of turned on and off by the player. This can be important to prevent player annoyance in receiving unwanted and potentially distracting feedback when they prefer to play the game without feedback.

In another embodiment, the reel-spinning game includes a credit meter. In certain embodiments, the feedback can be automatically shown after the credit meter registers a non-zero value. In another embodiment, the feedback is automatically turned off after at least one of a period of time and number of games played. In another embodiment, the feedback is based upon a rule-set.

In an embodiment, the reel-spinning game includes a video monitor having a normal game screen, and wherein the feedback is an image which overlays the normal game screen and is associated with a portion of the normal game screen related to the feedback. The feedback window may be translucent so as to not completely obscure the game field beneath it. In other embodiments, a normal game screen may be formed within a window and the feedback can be formed within another window. The feedback window can separate from, overlap, or be within the game field window. Alternatively, the game filed window can be within the feedback window.

Method 3—A Method for Playing a Casino Game with a Tip Mode

In an exemplary embodiment, a method for playing a casino game including: providing a game with a context-sensitive tip mode; providing context-sensitive tips to a player based upon a rule-set when the tip mode is on; and allowing a player turn the tip mode off. The context-sensitive tips are at least partially based upon at least one of past and current player actions.

By "casino game" it is meant that is it is a gambling device of the type regulated for use in gambling casinos. There are various Federal and State regulations with respect to gambling devices such that the types of games which qualify as "casino games" can vary from jurisdiction. In general, a "casino game" is one which provides an award of monetary value due to game play of a game in which chance predominates. Also, in general, "casino games" must randomly and/or pseudo randomly provide payouts which do not, on the average, exceed the sum of the wagers. With some "casino games" such as multi-reel "skill" games (e.g. wherein the skill resides in the choice of reels to hold) and video poker games (e.g. wherein the skill resides in the choice of cards to hold), the payout is given as a range which is determined by the most skillful play and the least skillful play. However, the awards given for even the upper end of the skill range must still be less that the total average "wager" (e.g. the money or credits input into the casino game in order to play.

By "tips" it is meant information provided to the player which is meant to be useful advice for continuing and future game play. The tips, for example, earl be verbal and/or graphic in nature. "Context-sensitive", consistently with the discussions above, means that the tips relate to the context of the game and, for this example, past and/or current player actions.

Method 4—A Method for Playing a Game Having an Element of Skill

In an exemplary embodiment, a method for playing a game having an element of skill includes: receiving a skilled input from a player of a game; determining an actual result of the skilled input; determining a set of possible results from a set of possible inputs which were available to the player; and providing feedback to the player concerning the player's skill level based, at least in part, upon a comparison of the actual result to the set of possible results.

By having "at least an element of skill", it is meant that the game is either a skill-based game (e.g. where skill predominates over chance in the play of the game) or a game of chance (e.g. where chance predominates over skill in the play of the game) which still includes an element of skill. Examples include, but are not limited to, certain multi-reel systems, video poker systems, and the like. By "skilled input" it is meant that a player can affect game play based upon his skill level, which can be physical and/or mental skill. In general, skill level increases with practice, allowing a player to get better at playing the game.

In an embodiment, the feedback is provided wherein providing feedback includes providing feedback on a visual display. By way of non-limiting example, the visual display can include a skill meter indicating a player's skill level. FIG. 7 illustrates by way of example, but not limitation, a possible skill meter configuration. Generally speaking, a "skill meter" it is meant a user feedback device which can indicate a level of skill at which a player is playing. The skill meter can be analog, digital, alphanumeric and/or graphical.

In an embodiment, the possible results correspond to a number of different prizes. Generally, the better the result, the more valuable the prize. For example, a prize can be provided to the player corresponding to the actual result. Determining the set of possible results, in certain embodiments, includes calculating the set of possible results prior to the commencement of the game. In another embodiment, determining the set of possible results includes calculating the set of possible results after the commencement of the game.

In certain embodiments, the set of possible results are ranked. In other embodiments, the ranked set of possible results corresponds to a list of prizes ranked by value. In still further exemplary embodiments, the comparison of the actual result to the set of possible results in a ranking of the actual result. In certain embodiments the feedback is cumulative over a number of skilled inputs, e.g. within a single game and/or within multiple games.

In certain exemplary embodiments, the game is a multi-reel type game including a number of reels and wherein providing feedback includes a skill-meter. In certain embodiments, the skilled input is the decision to hold one of none, some and all of the reels after a first spin of the reels and before a second spin of the reels and/or wherein the set of possible results is the set of all possibilities to hold none, some and all of the reels after a first spin of the reels.

In certain exemplary embodiments, the multiple reels are at least one of a mechanical, light and video display. In certain embodiments displaying a skill meter is at least one of a mechanical, light and video display. In exemplary embodiments, the actual result and the set of possible results are determined from at least one of random numbers and pseudo-random numbers.

In certain other embodiments, the game is a video-poker type game including a number of cards and wherein providing feedback includes a skill-meter. The term "video-poker game" is to have its ordinary and customary meaning, which is casino-type or "gaming" machine which allows a player to play hands of poker that are displayed on a video screen. The hands of poker are represented by cards (comprising a form of "indicia") that are generally located at predetermined positions.

In certain embodiments, the skilled input is the decision to hold one of none, some and all of the card after a first deal of the cards and before a second deal of the cards. In certain embodiments, the set of possible results is the set of all possibilities to hold none, some and all of the cards after a first deal of the cards.

Method 5—A Method for Playing a Game

In certain embodiments, set forth by way of example and not limitation, a method for playing a game includes: displaying multiple reels to a player of a multi-reel game; displaying a skill meter related to the play of the multi-reel game to the player; and implementing a game process on a computer system. The game process may, for example: a) control the display of the multiple reels in response to input by the player; b) determine a skill rank for the player based upon the input; and c) display the skill rank on the skill meter. This method works for both casino type games and for games of skill ("arcade type games").

In certain embodiments, the displaying multiple reels is at least one of a mechanical, light and video display. In certain embodiments, the displaying a skill meter is at least one of a mechanical, light and video display. In certain embodiments the skill rank is determined over multiple games and in certain embodiments a prize award is given based upon the skill rank. In certain embodiments, the controlling of the display is a least partially driven by at least one of a random number generator and a pseudorandom number generator.

Method 6—A Method for Providing Feedback to Multiple Game Systems

In certain embodiments, set forth by way of example and not limitation, a method for providing feedback to multiple game systems includes: accumulating game data concerning game play from a number of game systems to create a game data database; analyzing the game data database; and providing a player at a game system with at least one of a playing option and feedback based upon the analyzing the game data database.

In this method, as systems-based game and/or gaming system is provided. That is, there are multiple (e.g. a plurality) of game systems that can be used by multiple players. Game data is gathered at the multiple game systems concerning game play, which are accumulated to create a game data database. This database can be stored by a server and/or can be stored on one or more of the game systems, and may he distributed to storage locations located on a network. The game data database is analyzed to provide a player at a game system with at least one of a playing option and feedback.

Method 7—A Method for Displaying Prize Information in a Multi-Reel Game

In an exemplary embodiment, a method for displaying prize information in a multi-reel game includes: displaying a number of laterally arranged rotatable reels provided with a number of indicia such that when the number of reels are not in rotation indicia of the number of reels are arranged in a matrix including rows and columns, wherein a number of paylines are defined between an indicia of a leftmost column of the matrix and an indicia of a rightmost column of the matrix; detecting a player input selecting at least one of the paylines; and displaying the at least one payline. FIG. 6 illustrates, by way of example and not limitation, a playfield including a number of reels where the indicia, when the reels are at rest, are arranged in a matrix including rows and columns. A "V" shaped payline extending from an indicia of the rightmost column of the matrix to an indicia of the leftmost column of the matrix. This payline is associated with the selection "L1."

A payline is a line, straight or crooked (e.g. zigzag), which connects a number of adjacent indicia. The indicia can be at least one of horizontally, vertically and diagonally adjacent. A payline defines a sub-set of the indicia displayed by the reels.

In an embodiment, detecting a player input includes detecting the pressing of a button by a user ("player") which is associated with the at least one payline. In certain embodiments the rotatable reels are mechanical, and in other embodiments they are images on a video display. In embodiments with a video display, the at least one payline can be displayed, for example, on the video display. Also, in certain embodiments the video display is part of a touch-screen video display, and the player input can be, for example, on the touch-screen video display.

In certain embodiments, a number of touch-sensitive "buttons" (e.g. images of buttons) are displayed on the video screen for the player input which are separate from the indicia of the matrix. In certain embodiments, the user input is made on indicia of the matrix, and all paylines, for example, that are associated with the indicia are displayed. In certain embodiments, the payline overlays the matrix. In certain embodiments, the at least one payline can be removed after displaying the at least one payline, e.g. after a period of time, or when game play resumes with a spin of the reels.

Method 8—A Method for Playing a Multi-Reel Game

In an embodiment, set forth by way of example and not limitation, a method for playing a multi-reel game includes: displaying a number of laterally arranged rotatable reels provided with a number of indicia such that when the number of reels are not in rotation indicia of the number of reels are arranged in a matrix including rows and columns; wherein a number of paylines are defined between an indicia of a leftmost column of the matrix and an indicia of a rightmost column of the matrix; and entering a timed play period of finite duration, wherein a player may play any number of games within the timed play period. In this exemplary embodiment, each game play within the timed play period includes: a) an initial spin of all of the number of laterally arranged rotatable reels; b) at least one hold and re-spin; and c) a take score when the player desires to conclude the game.

In certain embodiments, there is no preset maximum number of holds and re-spins in a game. In certain embodiments there is a preset maximum number of holds and re-spins in a game. In certain embodiments, each game play within the timed play period is associated with a cost. In certain embodiments the cost is at least one game credit.

In certain embodiments each game further includes providing a prize award, if any, after the take score. In certain embodiments, the prize award is at least one prize credit. In certain embodiments the prize award can be, by non-limiting examples, additional time added to the timed play period, a token, a physical prize, and/or money. In certain embodiments, a number of paylines can be played within a game. In certain embodiments, the play period is a bonus to a previously played game.

Method 9—A Method for Playing a Video Poker Game

In an embodiment, set forth by way of example and not limitation, a method for playing a video poker game includes: displaying a number cards; and entering a timed play period of finite duration, wherein a player may play any number of games within the timed play period. In this exemplary embodiment, each game play within the timed play period includes: a) displaying a number of cards; b) at least one hold and redeal; and c) a take score when the player desires to conclude the game.

In certain embodiments, the timed play period is associated with a cost. In certain embodiments cost is at least one game credit (e.g. a credit displayed on the game which allows at least one additional game to be played).

In certain embodiments, each game further includes providing a prize award, if any, after the take score. In certain embodiments the prize award is at least one prize credit and in certain embodiments the prize award is additional time added to the timed play period. In certain embodiments the prize award is one or more of a token of monetary value (e.g. for money, a physical prize, etc.), merchandize and money.

Method 10—A Method for Association Indicia with Pre-Defined Positions

In an embodiment, set forth by way of example and not limitation, game method includes: at least one of randomly and pseudo-randomly associating indicia with pre-defined positions; and providing a player with an opportunity to at least one of: a) receive an award based upon the present state of the playfield; b) selectively fix one or more indicia on the playfield and repeat the randomly associating step with respect to indicia that were not fixed; and c) repeat the randomly associating step without fixing one or more indicia.

This method of associating indicia is applicable to a variety of games, as will be appreciated by those skilled in the art. By way of example, but not limitation, the exemplary method can be used with multi-reel games and video poker games. With multi-reel games, the predefined positions correspond to the indicia on the reels when the reels are at rest. This typically is a matrix of rows and columns. The "playfield" for such an embodiment includes indicia at the pre-defined positions. Some, none, or all of the indicia on the playfield can be "fixed" in place, allowing new randomized indicia to appear in the predefined positions that have not been fixed. With video poker games, the predefined positions correspond to the positions for the dealt cards of a poker hand, and the playfield includes the poker hand. After an initial "deal", certain cards can be "held" (e.g. a player caused a "selective fix" of the cards that he wants to hold). Then new cards may be dealt where there hasn't been a "selective fix." Other examples of games will be apparent to those skilled in the art.

In an embodiment a value of one or more position subsets is associated in accordance with a value of the indicia associated with the respective subsets and an award or prize is offered based upon possible position subset outcomes. In certain embodiments, the award or prize for a position subset with the highest value is provided as compared to all the position subsets of the game state. In certain embodiments, a wager is required to initiate game play. In certain embodiments the wagering of any portion of a provided award or prize is prevented. In an embodiment a listing of possible position subsets and associated awards or prizes is provided.

In an exemplary embodiment a timed bonus period is provided during which the player can repeat the opportunity step continuously. In certain embodiments, the player is required to place a wager each time the player elects the opportunity step and/or elects to repeat the randomly associating step.

In an exemplary embodiment, 108 the player is provided with an additional opportunity to elect step (c) (e.g. repeat the randomly associating step without fixing one or more indicia upon the occurrence of a pre-determined criterion). In certain embodiments, player's kick is measured over a series of game plays based upon actual as compared to possible outcomes. In an embodiment, a player's skill is measured over a series of game plays based on a running average rank corresponding to a pre-determined number of games played by the player. In certain embodiments, a recommended selection is provided to the player.

Method 11—A Computer-Implemented Method for Providing an Amusement

An embodiment, set forth by way of example and not limitation, of a computer-implemented method for providing an amusement system includes: providing a multi-reel game having a number (e.g. a plurality) of prize-lines; allowing a player of the game to play all of the number of prize-lines with a single wager; spinning all of the reels of the multi-reel game; allowing the player to hold one or more reels of the multi-reel game; spinning all reels of the multi-reel game except those that have been held by the player; and awarding the player based on a highest winning prize-line.

By "computer-implemented" it is meant that the method is implemented on a digital processor using program instructions (software, firmware, etc.) stored in some tangible form (e.g. magnetic memory, optical memory, semiconductor memory, etc.). By "highest winning prize-line" it is meant that for the plurality of prize lines, the award is only based upon the prize-line which is associated with an award and/or prize of the highest monetary value.

In certain embodiments, the reels of the multi-reel game include a number of indicia and wherein subsets of the indicia weighted with different prize values to vary a skill variable. By "vary a skill level" it is meant that, using a skilled action, a skilled player can cause a subset of indicia to align with at least one payline that is of a higher value than that which might be achieved by an unskilled player.

Method 12—A Reel Gamin Method

In an embodiment, set forth by way of example and not limitation, a gaming method includes the steps of: randomly or pseudo-randomly selecting an initial playfield of reel indicia; selectively fixing one or more indicia on the playfield; a subsequent random or pseudo-random selection of a subsequent playfield including the one or more fixed indicia; and providing an award for the best outcome.

By "gaming method" it is meant that the method is for a game of chance (e.g. where the result of game play is predominantly due to chance rather than skill). By "best outcome" it is meant that the award is the highest award value chosen taken from a set of possible award values for that player.

Method 13—A Computer-Implemented Method for Providing an Amusement System

In an embodiment, a computer-implemented method for providing an amusement system includes: providing a multi-reel type game; and displaying to a player of the multi-reel type game a specific prize line combination of a number of prize line combinations when the player interacts with a user interface corresponding to the multi-reel type game in a manner to indicate the player's desire to view the prize line; wherein the prize line is shown together with the multi-reel game.

By allowing the display of a selected prize line, a player can make skilled decisions as to the strategy for completing and/or finishing a game. For example, allowing the display of selected prize-line(s) can assist a player as to which indicia to "fix" or "hold" for a subsequent randomization of the remaining indicia.

Exemplary Apparatus

It will be appreciated from the foregoing that there are a number of explicit and implicit apparatus disclosed herein. The following examples are set forth to by way of illustration of exemplary embodiments, and not for the purpose of limitation.

Apparatus 1—A Game

In an embodiment, set forth by way of example and not limitation, a game includes: a digital processor; digital storage coupled to the digital processor for storing instructions; a display coupled to the digital processor displaying a first number of indicia arranged in a number of rows and a number of columns such that there are a number of paylines through a contiguous number of indicia; a user interface coupled to the digital processor to select a subset of the first number of indicia taken along at least one column and to initiate a display of a second number of indicia which includes the selected subset of the first number of indicia on the display; and an award dispenser providing an award equal to the largest award associated with a single payline of the number of paylines to limit the award to a predetermined maximum value. In an exemplary embodiment, the digital processor includes a microprocessor and wherein the digital storage includes a read-only memory. See, for example, FIG. 32 for non-limiting examples of a digital processor, digital storage, a display and a user interface. See also, for example. FIG. 6 for non-limiting examples of indicia, rows, columns and paylines.

In certain exemplary embodiments the user interface includes a monetary interface and a game play interface. In exemplary embodiments, the monetary interface accepts at least one of legal tender and a token. In exemplary embodiments the token is a non-electronic token, e.g. a ticket including printed indicia. In an embodiment the token is an electronic token. In an embodiment, the award dispenser dispenses legal tender.

Apparatus 2—A Game

In an embodiment, set forth by way of example and not limitation, a game includes means for initiating a game play; means for displaying a first number of indicia arranged in a number of rows and a number of columns such that there are a number of paylines through a contiguous number of indicia; means for selecting a subset of the first number of indicia taken along one or more columns; means for displaying a second number of indicia which includes the selected subset of the first number of indicia; and means for achieving an award equal to the largest award associated with a single payline of the number of paylines to limit the award to a predetermined maximum value. As used herein, the term "means" invokes the provisions of 35 U.S.C. §112, §6 to include the structure(s) as set forth herein and equivalents thereof.

In an embodiment, the game is initiated in exchange for a monetary value. In an embodiment, columns of indicia are arranged as visually spinnable reels. By "spinnable reels" it is meant that they reels are mechanically spinning or have the visual appearance of spinning (e.g. on a video screen). In a further embodiment, the game further includes means for selectively displaying a playline.

In an embodiment, the means for displaying of a first number of indicia includes means for a randomization of indicia for their selection to be displayed. In certain embodiments, the randomization is provided by at least one of random selection and pseudorandom selection.

Apparatus 3—A Game

In an embodiment, set forth by way of example and not limitation, a game includes: (a) means initiating a game play; (b) means for analyzing game play; and means indicating a level of success with regards to the game play. As used herein, the term "means" invokes the provisions of 35 U.S.C. §112, §6 to include the structure(s) as set forth herein and equivalents thereof. Therefore, a non-limiting example of a means for indicating a level of success is a skill-meter as disclosed here and equivalents thereof.

In an embodiment, the indication of a level of success is derived, at least in part, from an analysis of previous game play. In an embodiment, the previous game play includes background game play not discernable to a user.

Apparatus 4—A Game

In an embodiment, set forth by way of example and not limitation, a game includes: (a) means initiating a game play; (b) means for analyzing game play; and (c) means providing advice on how to play the game. As used herein, the term "means" invokes the provisions of 35 U.S.C. §112, §6 to include the structure(s) as set forth herein and equivalents thereof. Therefore, a non-limiting example of a means for providing advice on how to play the games are the tips provided to a player as disclosed here and equivalents thereof.

In an embodiment, the advice is derived from an analysis of previous game play. In an embodiment, the previous game play includes background game play not discernable to a user.

Apparatus 4—A Game Having an Element of Skill

In an embodiment, set forth by way of example and not limitation, a game having an element of skill includes: a game display; a player game input; and a game processor responsive to the player game input and operative to control the game display. The game processor, at least in part, determines an actual result of a player input and a set of possible results from a set of possible inputs which were available to the player, and provides a display of the player's skill level based, at least in part, upon a comparison of the actual result to the set of possible results.

In an embodiment the game display is a video display. In another embodiment the game display is a mechanical display. In certain embodiments, the player game input includes a number of input sensors. In an embodiment, the game processor includes a computer. In an embodiment, the display of the player's skill level is displayed on a video display. In an embodiment, the display of the player's skill level is a skill-meter indicating a skill rank.

In an exemplary embodiment, a game includes a multi-reel type game including a number of reels, and wherein the number of input sensors are used to selectively hold one or more of the reels after a first spin and before a second spin. In an embodiment, the first spin and the second spin are at least one of random and pseudorandom.

In an exemplary embodiment, a game includes a video-poker type game including a number of cards and wherein a number of input sensors are used to selectively hold one of none, some and all of the cards after a first deal and before a second deal. In an embodiment, the first deal and the second deal are at least one of random and pseudorandom.

Apparatus 5—A Multi-Reel Game

In an embodiment, set forth by way of example and not limitation, a multi-reel game includes: a game processor; a display coupled to the game processor and including a number of laterally arranged rotatable reels provided with a number of indicia such that when the number of reels are not in rotation indicia of the number of reels are arranged in a matrix including rows and columns, wherein a number of paylines are defined between an indicia of a leftmost column of the matrix and an indicia of a rightmost column of the matrix; a player input device coupled to the game processor to allow a player to select at least one of the paylines; and a number of payline indicators controlled by the game processor and associated with the matrix such that the at least one payline selected by the player is displayed.

In an embodiment each of the paylines is one of a horizontal, diagonal and zigzag payline. By "zigzag" it is meant that the payline is not linear but, rather, created by a number of non-linear segments. For one non-limiting example, a "zigzag" payline can be "V" shaped.

In an embodiment, the player input device is at least one of a button and an indicia. For example, the display can be a touch-screen video display, and the indicia themselves can serve as input devices. Alternatively, "buttons" can be displayed on the touch-screen video display.

In an embodiment, the rotatable wheels are mechanical. In an embodiment, the rotatable reels are images on a video display. In an embodiment, the at least one payline is displayed on the video display, e.g. it overlies the matrix.

In an embodiment, the game processor removes the at least one payline after displaying the at least one payline. By way of non-limiting examples, the at least one payline is removed after a period of time and before at least one reel begins to rotate.

Apparatus 5—A Game

In an embodiment, set forth by way of example and not limitation, a game includes: a number of pre-defined positions including pre-determined position subsets; a set of indicia, each of the indicia associable with one or more of the number of positions; each of the position subsets having a value determined by the indicia associated therewith; a player interface enabling a player to initiate a first random or pseudo random selection of indicia from the set of indicia corresponding to each of the number of positions; wherein the player interface includes an indicia selector enabling a player to select one or more indicia associated with respective of the positions; and wherein the player interface further enables the initiation of a second random or pseudo random selection of indicia corresponding to one or more positions unassociated with the indicia selector.

Again, taking multi-reel games and video poker games as non-limiting examples, predefined positions can be the intersection of the rows and columns (aka "matrix") displayed by a multi-reel game or the card position for a video poker game. Subsets are derived from the total number of indicia displayed, and different subsets can be associated with different values.

A player interface typically includes physical or "soft" buttons on a touch-sensitive screen. It may also include pointing devices, such as joysticks and/or trackballs, by way of non-limiting examples.

Pseudo-random numbers can be generated algorithmically or can be provided from look-up tables of pseudo-random numbers. Random number can also be generated using random occurrences, as will be appreciated by those skilled in the art. The main difference between random numbers and pseudo-random number is repeatability. Random and/or pseudo random number can be generated or stored locally on a game or may be generated or stored remotely, e.g. on a server.

In an embodiment, the game further includes an award or prize payable to a player for the position subset with the highest value. In an embodiment, at least one of an award and a prize payable to a player in accordance with the value associated with each position subset. In an embodiment the at least one of an award and a prize includes at least one of money and a redeemable receipt exchangeable for at least one of money and a gift.

In an embodiment the game is activated by a wager. This wager may be an accrued value (e.g. previous winnings or balance) or a new value based upon new input of monetary value (e.g. money, token, credit card) to the game. In an embodiment, the wager enables a player to initiate the first and the second random or pseudo random selection of indicia.

In an embodiment, an award or prize is payable to a player for the position subset with the highest value; wherein the wager provides an opportunity for a player to win an award from any position subset. In an embodiment, a set of indicia include pre-determined numbers of identical indicia in accordance with a probability chart that is skewed to increase the likelihood of a lower value outcome as compared to a higher value outcome. In an embodiment, the random or pseudo random selection is skewed to increase the likelihood of obtaining a position subset with a lower value outcome as compared to the likelihood of obtaining a higher value outcome.

In an embodiment, two or more of the position subsets include common positions. In an embodiment, the indicia selector includes a position subset selector for selecting one or more position subsets. In an embodiment, the indicia are identifiable with each grid position.

In an embodiment, an award table includes a listing of subsets of indicia and corresponding values, the subsets of indicia being associable with one or more of the position subsets. In an embodiment, the game further includes an award or prize payable to a player for the position subset with the highest value, the game configurable to accept one or more denominations of currency. In an embodiment, the at least one of an award and a prize is adjustable to correspond to the denomination of currency.

In an embodiment, the game further includes at least one of an award and a prize payable to a player for obtaining one or more outcomes; wherein the wager being of a first form of currency and the at least one of an award and a prize being of a second form of currency which can be redeemed for merchandise prizes. In an embodiment, the game further includes: at least one of an award and a prize payable to a player for obtaining at least one outcome; wherein the at least one of an award and a prize not being useable to play the game. In an embodiment, the second form of currency is storable electronically through at least one of a smart card, player account, and a bar coded ticket.

Apparatus 6—A Game

In an embodiment, set forth by way of example and not limitation, a game includes: a number of positions including pre-determined position subsets; a set of indicia, each of the indicia associable with one or more of the number of positions, wherein each of the position subsets has a value determined by the indicia associated therewith; a player interface enabling a player to initiate a first random or pseudo random selection of indicia from the set of indicia corresponding to each of the number of positions; wherein the player interface includes an indicia selector enabling a player to select one or more indicia associated with respective of the positions and enables initiation of a second random or pseudo random selection of indicia corresponding to one or more positions unassociated with the indicia selector; and a bonus mode activatable upon the occurrence of a pre-determined event or sequence of events.

The indicia can be of many forms, as will be appreciated by those skilled in the art. For example, the indicia can be numbers. For another example, the indicia can be drawings, e.g. fruit, etc. The player can select indicia in a variety of patterns, including individually, by rows or columns, by paylines, all of the same type (e.g. all "cherries"), etc.

In an embodiment, the player interface is enabled to permit the player to select indicia corresponding to associated positions and initiate random or pseudo random selection of indicia corresponding to positions not associated with selected indicia, an unlimited number of times during a pre-determined period. In an embodiment, the player interface includes an award or prize payable to the player for the position subset with the highest value. In an embodiment, the game includes an award election interface enabling the player to elect to accept the award or prize for the current game state. In an embodiment, a further wager is required to enable the player interface and permit the player to initiate a subsequent first random or pseudo random selection of indicia corresponding to each of the positions.

In an embodiment, the set of indicia includes an extended play indicia such that in the event that one or more positions is associated with the extended play indicia, then the player interface is enabled to permit one or more additional player opportunities to select indicia corresponding to associated positions and to initiate random or pseudo random selection of indicia corresponding to positions not associated with selected indicia. In an embodiment, the game further includes a chance meter to indicate a measure of the player's success based upon a series of games played, the measure of the player's success being based at least in part upon the best position subset obtained during each game.

In an embodiment, the game further includes a skill meter to indicate a measure of the player's performance based on a running average rank corresponding to a pre-determined number of games played by the player.

In an embodiment, the bonus mode increases the value of the award or prize payable to the player. In an embodiment, the bonus mode activates a secondary game. In an embodiment, the secondary game includes a wheel game including a virtual or physical wheel and award selector, the wheel and award selector operable together to identify a secondary game award or prize. In an embodiment, the secondary game includes a sphere game including a virtual or physical spheroid and award selector, the spheroid and award selector operable together to identify a secondary game award or prize.

In an embodiment, the game further includes a tip mode providing an informative input to the player. In an embodiment, the informative input includes a suggested indicia selection.

In an embodiment set of virtual or physical reels, each reel including a subset of the set of indicia, the reels randomly or pseudo randomly spun either physically or virtually in accordance with the player interface, the indicia selector connecting to selectively hold each reel in position after the first random or pseudo random selection. In an embodiment, each position subset includes a pre-defined position from each reel.

Apparatus 7—A Gaming Machine

In an embodiment, set forth by way of example and not limitation, a gaming machine includes: a player selectable game including a set of play segments; a playing field including display indicia randomly or pseudo randomly selected during each play segment; selected indicia being fixable on the playing field; a display showing aspects of the game; and a player interface enabling a player to selectively lock indicia on playfield.

In an embodiment, a gaming machine further includes a currency acceptor for receiving a wager, and an award or prize payable based upon pre-defined outcomes.

Apparatus 8—A Game

In an embodiment, set forth by way of example and not limitation, a game includes: a playing area including a set of positions and a set of paths, each path being associated with a subset of the set of positions; a set of indicia, each of a subset of the set of indicia associable with each of the set of positions on or about the playing area; and a player interactive portion enabling a player to identify one or more paths and the indicia associated therewith.

By "playing area" it is meant an area of a display (e.g. a mechanical display, a video display, etc.) that is at least primarily used for game play. The playing area includes a set of positions and a set of paths associated with subsets of the set of position. Indicia can be associated with each of the set of positions. The player interactive portion can comprise, for example, any suitable human/computer interface to allow the player to provide inputs to the game. The game may be a game predominantly of chance or predominantly of skill.

Apparatus 9—A Gaming Machine

An embodiment, set forth by way of example and not limitation, of a gaming machine includes: a number of reels including a number of indicia arranged such that there are a number of potential outcomes along a number of paths through the indicia; a reel spinner; a selectable reel locker; where the outcome from each spin is ranked according to the amount of potential award taken along the number of paths; and an award determiner which determines the award to be the most highly ranked outcome. The gaming machine is of the type regulated by a governmental agency as a gambling device. In certain embodiments, the gaming machine includes at least one of a spinning-reel game and a video poker game.

In an embodiment, the gaming machine includes a currency acceptor for receiving a wager. By "currency acceptor", it is meant a device which can be used to input a monetary value into the gaming machine. For example, a paper currency acceptor, a scrip acceptor, a token acceptor, a coin acceptor, a credit/debit card reader, etc. are all non-limiting examples of currency acceptors as set forth herein.

Apparatus 10—A Game

In a embodiment, set forth by way of example and not limitation, a game includes a playing area including a set of positions and a set of paths, each path being associated with a subset of the set of positions; a set of indicia, each of a subset of the set of indicia associable with each of the set of positions on or about the playing area; one or more awards being associated with one or more potential groups of indicia along any of the set of paths, each potential group of indicia being ranked according to a value of an associated award; a player interactive portion enabling a player to select one or more of the indicia associated with the set of positions and to request/command another set of indicia to randomly or pseudo-randomly replace unselected of the indicia associated with the positions; and a skill meter measuring the skill level of the player selection as compared to possible selections and potential awards. In an embodiment the skill meter includes an averager to measure the average skill of the player selections over two or more games.

In an embodiment, the game is a game of skill. In an embodiment, the game is a game of chance. In an embodiment, the game is a video poker game. In an embodiment, the game is a multi-reel game. In an embodiment, the game further includes a currency acceptor for receiving a wager.

Apparatus 11—A Skill Game

In an embodiment, set forth by way of example and not limitation, a skill game includes a playfield with a number of potential outcomes; selectable elements associated with the playfield; and a game-generated informational portal having a message mode for providing information concerning game play.

By "skill game" it is meant a game of the type that is often played in arcades, where the outcome is more dependent upon skill than chance. While definitions for a "skill game" and a "gambling device" can vary from jurisdiction to jurisdiction, most "skill games" are not regulated as gambling devices in most jurisdictions.

In an embodiment, the game-generated informational portal provides a skillful play suggestion. That is, "tips" are provided which help a player play better. This portal can be displayed, for example, on a video display. In an embodiment, the game includes a portal switch controlling activation and/or de-activation of the message mode. In an embodiment, the game includes a set of rules for generating a message through the portal.

By "portal" it is meant an overlay, and underlay, or adjacent display for information. By way of non-limiting example, a portal may be a window displayed on the same video display as that used for game play and/or it can be displayed on a video display separate from that used for the game play. By way of non-limiting example, the portal may be an Internet portal for information delivered, at least partially, by the Internet.

Apparatus 12—A Gaming Machine

In an embodiment, set forth by way of example and not limitation, a gaming machine includes: a number of reels; a selectable reel locking mechanism; one or more of the reels being lockable for at least one spin; the outcome from each spin is ranked according to the amount of potential award; and an award determined by the most highly ranked outcome.

In one method of operation, set forth by way of example and not limitation, the gaming machine accepts a wager and permits a first spin of the reels. The player then locks some, none or all of the reels before re-spinning. The payout is determined by the highest possible outcome for that game play.

Apparatus 13—A Skill Game

In an embodiment, set forth by way of example and not limitation, a skill game includes: a playfield with a number of potential outcomes; one or more selectable elements associated with the playfield to obtain a favorable outcome; and a timed game play feature enabling a player to play repeatedly to obtain one or more favorable outcomes during a timed period.

In an embodiment, the game includes one or more awards associated with one or more of the number of potential outcomes. In an embodiment, the game includes a take score player interface enabling a player to complete a game, accept an award based upon a favorable outcome, and initiate a subsequent game.

Apparatus 14—A Game

In an embodiment, set forth by way of example and not limitation, a game includes: a playfield with a number of potential outcomes; one or more awards associated with one or more potential outcomes; and a prize redemption portion with one or more prizes exchangeable for a portion of any received of the one or more awards.

In embodiment, the game includes a virtual shopping cart for identifying and collecting selected of the one or more prizes and a checkout portion for providing delivery information and exchanging an identified amount of the received awards. In an embodiment, the game includes a check order status portion enabling a player or prize recipient to obtain an update on delivery status. In an embodiment, the check order status portion is remotely accessible.

Exemplary Systems

It will be appreciated from the foregoing that there are a number of explicit and implicit systems disclosed herein. The following examples are set forth to by way of illustration of exemplary embodiments, and not for the purpose of limitation.

System 1—A Game System

In an embodiment, set forth by way of example and not limitation, a game system includes: a wide area network; a number of game units coupled to the wide area network of computers and each capable of uploading game data concerning game play to form the basis of a historical knowledge base; and a server system coupled to the wide area network and capable of receiving the game data and storing the game data in a database with other game data to form the historical knowledge base. The server system is capable of processing the historical knowledge database and selectively downloading at least one of data and commands to a game unit to enhance the game-play experience for a player playing a game.

By "historical knowledge database" it is meant a database including information about past game plays and the results of the past game plays. Preferably, these are provided from multiple game units and multiple players of the game units. The historical knowledge database may optionally include information concerning identified players and groups of players.

By "server system" it is meant one or more computers which communicate with the game units via the wide area network of computers, e.g. via the Internet.

In an embodiment, the at least one of data and commands is related to the game data. In an embodiment, the at least one of data and commands is essentially unrelated to the game data. In an embodiment, the game unit is a casino-type game machine. In an embodiment, the game unit includes an element of skill.

In an embodiment, the at least one of data and commands is tailored for an identified player of a game unit. In an embodiment, the at least one of data and commands can be used to provide feedback of a skill level of the player. In an embodiment, the at least one of data and commands can be used to modify the game for the game player. In an embodiment the at least one of data and commands can be used to aid a game unit in game-play calculations.

In an embodiment, the at least one of data and commands can be used to provide advice including at least one of tips and game strategy to the player. In an embodiment, the at least one of data and commands can be used to provide optimal hold combinations for a given playfield. In an embodiment, the at least one of data and commands can be used to provide a player rank.

In an embodiment, the server system tracks whether a player accepted the advice. In an embodiment, new advice for the player is affected by the tracking of whether the player accepted previous advice. In an embodiment, the game data includes the identity of a player of a game unit, such that the knowledge database can be used to ascertain both player-centric information and aggregate information.

In an embodiment, the wide area network includes the Internet. In an embodiment, the game data is encrypted prior to being uploaded over the Internet. In an embodiment, the game unit is directly coupled to the Internet via an Internet Service Provider. In an embodiment, the game unit is coupled to a local area network which is coupled to the wide area network.

In an embodiment, the server performs an analysis of the game data stored in the database. In an embodiment, the server downloads at least one of data and executable code to the game unit as a result of the analysis. In an embodiment, the server downloads game software updates to at least one of the number of game units. In an embodiment, the server downloads award information related to game play to at least one of the number of game units. In an embodiment, the server downloads game data to at least one of the number of game units. In an embodiment, the server downloads game parameters to at least one of the number of game units.

In an embodiment, the game unit is one of a number of game units, each of which is coupled to the wide area network and capable of uploading game data concerning game play to be stored in the database of the server. In an embodiment, the game units are coupled to a local area network which is coupled to the wide area network. In an embodiment, the local area network is one of a number of local area networks which are coupled to the wide area network, where each of the local area networks includes a number of game units.

In an embodiment, the server is one of a number of servers. In an embodiment, the database is a distributed database. In an embodiment, the game play is an actual game play with a user of the game unit. In an embodiment, game play is a virtual game play independent of a user of the game unit.

System 2—A Game System

In an exemplary embodiment, set forth by way of example an not limitation, a game system includes: means for accumulating game data concerning game play from a number of game systems to create a game data database; means for analyzing the game data database; and means for updating at least one of the number of game systems based upon the analyzing the game data database. As used herein, the term "means" invokes the provisions of 35 U.S.C. §112, §6 to include the structure(s) as set forth herein and equivalents thereof.

In an embodiment, the game data database is on a server separate from the game systems. The server, which may include one or more computers or other processing equipment, is, in an embodiment, coupled to the game systems, at least in part, by the Internet. The game data database may be localized on a single computer or other equipment, or may be distributed. The game data database may also reside, at least in part, on one or more of the game systems.

System 3—A Game System

An embodiment, set forth by way of example and not limitation, of a game system includes: a network; a game server coupled to the network; and a number of games. Each of the games includes a game display, a player game input, and a game processor responsive to the player game input and operative to control the game display. The game processor is coupled to the network for communication with the game server and determines, at least in part, an actual result of a player input and a set of possible results from a set of possible inputs which were available to the player, and provides a display of the player's skill level based, at least in part, upon a comparison of the actual result to the set of possible results.

In an embodiment, the game server receives information concerning at least the actual result from the number of games. In an embodiment, the game server includes a data store accessible by the number of games to aide in the determination of the set of possible results. In an embodiment, the data store includes contributions from the number of games.

System 4—An Order Fulfillment System for a Game

In an embodiment, set forth by way of example and not limitation, an order fulfillment system for a game includes: an order fulfillment system including at least one server coupled to a network; and a game including: a) processor; b) a video screen coupled to the processor; c) a dispenser coupled to the processor capable of dispensing a physical order confirmation receipt; d) an acceptor coupled to the processor capable of accepting an order confirmation receipt; and e) a network interface coupling the processor to the network to permit communication between the game and the order fulfillment system.

In operation the dispenser dispenses a physical order confirmation receipt to a player after an order for redemption merchandize has been placed with the order fulfillment system. The insertion of a physical order confirmation receipt into the acceptor initiates an inquiry to the order fulfillment system and a display of order status on the video screen.

In an embodiment, the physical order confirmation receipt is a paper ticket. In an embodiment, the paper ticket has printed indicia concerning an order. In an embodiment, the printed indicia include a bar code.

In an embodiment, the acceptor includes a bar code reader. In an embodiment, the acceptor is a ticket acceptor. In an embodiment, the acceptor is a currency acceptor. In an embodiment, the physical order confirmation receipt is a card. In an embodiment, the card includes a magnetic stripe.

In an embodiment, the order fulfillment system further includes a player input device coupled to the processor. In an embodiment, a player, using the player input device, redeems merchandise via the order fulfillment system. In an embodiment, the player can fill a shopping cart with a number of items to be redeemed. In an embodiment, the sum total of the number of items in the shopping cart does not exceed the player's number of prize credits.

In an embodiment, an order fulfillment system for a game has a screen which supports game play, order fulfillment and order status. In an embodiment, the screen is a first screen, and further including a second screen for game play. In an embodiment wherein the screen includes a browser window.

System 5—An Order Fulfillment System

In an embodiment, set forth by way of example and not limitation, an order fulfillment system includes: an order fulfillment system including at least one server coupled to a network; and a fulfillment apparatus including: a) processor; b) a video screen coupled to the processor; c) a dispenser coupled to the processor capable of dispensing a physical order confirmation receipt; d) an acceptor coupled to the processor capable of accepting an order confirmation receipt; and e) a network interface coupling the processor to the network to permit communication between the game and the order fulfillment system. The dispenser dispenses a physical order confirmation receipt to a player after an order for merchandise has been placed with the order fulfillment system. The insertion of a physical order confirmation receipt into the acceptor initiates an inquiry to the order fulfillment system and a display of order status on the video screen.

In this embodiment, the order fulfillment system is not limited to order fulfillment from a game system but, rather, is a generalized system to fulfill orders for, for example, merchandise or services. The order fulfillment system can be, by way of non-limiting example, a kiosk in a shopping mall or store.

In an embodiment, the physical order confirmation receipt is a paper ticket. In an embodiment, the paper ticket has printed indicia concerning an order. In an embodiment, the printed indicia includes a bar code. In an embodiment, the acceptor includes a bar code reader. In an embodiment, the acceptor is a ticket acceptor. In an embodiment, the acceptor is a currency acceptor. In an embodiment, the physical order confirmation receipt is a card. In an embodiment, the card includes a magnetic stripe.

System 6—A Gaming System

An embodiment, set forth by way or example and not limitation, of a gaming system includes: a host; a gaming machine connected to the host; a player selectable skill game playable at the gaming machine; the skill game including a set of indicia; a random or pseudo random indicia generator for generating one or more displayed indicia from the set of indicia during a cycle; and a playfield displayable on the gaming machine together with the displayed indicia, where one or more of the displayed indicia being selectable by a player to be retained during a subsequent cycle.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A skill game including:

a video monitor;

a digital processor coupled to the video monitor to provide a display;

a playfield provided with a plurality of spinning reels to provide a plurality of potential outcomes, wherein the playfield comprises a normal game screen of the video monitor; and a game-generated informational portal having a message mode for providing information concerning game play by overlaying an image on the normal game screen that includes information associated with a portion of the normal game screen.

2. A skill game as recited in claim 1 wherein the game-generated informational portal provides a skillful play suggestion.

3. A skill game as recited in claim 1 including a set of rules for generating a message through the portal.

4. A gaming machine comprising:

a video monitor;

a digital processor coupled to the video monitor to provide a display;

a plurality of reels comprising a normal game screen; and an informational portal operative to develop an overlying image on the normal game screen that includes information concerning game play with respect to an associated portion of the normal game screen.

5. A skill game comprising:

a digital processor;

a video monitor coupled to the digital processor and displaying a plurality of spinning reels on a normal game screen;

one or more selectable elements associated with the playfield to obtain a favorable outcome; and an overlying image on the normal game screen that includes information concerning game play with respect to an associated portion of the normal game screen.

6. A skill game as recited in claim 5 further comprising a take score player interface enabling a player to complete a game, accept an award based upon a favorable outcome, and initiate a subsequent game.

7. A skill game as recited in claim 5 further comprising:

one or more awards associated with one or more potential outcomes; and a prize redemption portion with one or more prizes exchangeable for a portion of any received of the one or more awards.

8. A skill game as recited in claim 7 wherein the prize redemption portion includes:

a virtual shopping cart for identifying and collecting selected of the one or more prizes; and a checkout portion for providing delivery information and exchanging an identified amount of the received awards.

9. A skill game as recited in claim 7 further comprising a check order status portion enabling a player or prize recipient to obtain an update on delivery status.

10. A method for playing a game comprising:

(a) initiating a reel-spinning game including a digital processor, wherein the reel-spinning game includes a video monitor coupled to the digital processor and having a normal game screen;

(b) analyzing a skilled play by a player of the reel-spinning game on the digital processor; and (c) providing feedback to aid in the skilled play of the reel-spinning game to the player, wherein the feedback is an image which overlays the normal game screen and which is associated with a portion of the normal game screen related to the feedback.

11. A method for playing a game as recited in claim 10 wherein the feedback includes an indication of a level of success in playing the game.

12. A method for playing a game as recited in claim 10 wherein the feedback includes advice on how to play the game.

13. A method for playing a game as recited in claim 12 wherein the advice is derived from an analysis of previous game play.

14. A method for playing a game as recited in claim 13 wherein the previous game play includes background game play not visible to a user.

15. A method for playing a game as recited in claim 10 wherein the feedback is context sensitive.

16. A method for playing a game as recited in claim 10 wherein the feedback can be selectively at least one of turned on and off by the player.

17. A method for playing a game as recited in claim 10 wherein the reel-spinning game includes a credit meter, and wherein the feedback is automatically shown after the credit meter registers a non-zero value.

18. A method for playing a game as recited in claim 10 wherein the feedback is automatically turned off after at least one of a period of time and number of games played.

19. A method for playing a game as recited in claim 10 wherein the feedback is based on a rule-set.

* * * * *